US012750272B1

(12) United States Patent
Kakadia

(10) Patent No.: US 12,750,272 B1
(45) Date of Patent: Sep. 29, 2026

(54) AUTOMATED RECONSTRUCTION SYSTEM AND METHOD FOR SEQUENCES OF EVENTS ARISING FROM A ROOT CAUSE IMPACT IN NETWORK ENVIRONMENTS

(71) Applicant: Deepak Kakadia, San Jose, CA (US)

(72) Inventor: Deepak Kakadia, San Jose, CA (US)

( * ) Notice: Subject to any disclaimer, the term of this patent is extended or adjusted under 35 U.S.C. 154(b) by 0 days.

(21) Appl. No.: 18/666,673

(22) Filed: May 16, 2024

Related U.S. Application Data

(60) Provisional application No. 63/636,826, filed on Apr. 21, 2024, provisional application No. 63/623,313, filed on Jan. 21, 2024, provisional application No. 63/620,872, filed on Jan. 14, 2024, provisional application No. 63/620,818, filed on Jan. 13, 2024, provisional application No. 63/616,189, filed on Dec. 29, 2023, provisional application No. 63/615,623, filed on Dec. 28, 2023.

(51) Int. Cl.
*H04L 41/0631* (2022.01)
*H04L 43/065* (2022.01)

(52) U.S. Cl.
CPC ........ *H04L 41/0631* (2013.01); *H04L 43/065* (2013.01)

(58) Field of Classification Search
CPC .......................... H04L 41/0631; H04L 43/065
See application file for complete search history.

(56) References Cited

U.S. PATENT DOCUMENTS

| | | | | |
|---|---|---|---|---|
| 10,742,483 | B2 * | 8/2020 | Li | H04L 43/0811 |
| 2017/0310546 | A1 * | 10/2017 | Nair | H04W 24/08 |
| 2018/0039776 | A1 * | 2/2018 | Loman | G06F 21/566 |
| 2022/0078199 | A1 * | 3/2022 | Willebeek-LeMair | H04L 63/1416 |
| 2024/0168857 | A1 * | 5/2024 | Ahuja | G06F 11/3409 |
| 2024/0354225 | A1 * | 10/2024 | Chavan | G06F 11/0721 |
| 2025/0085672 | A1 * | 3/2025 | ElBarbir | G05B 13/0265 |

FOREIGN PATENT DOCUMENTS

WO WO-2024057069 A1 * 3/2024 ......... H04L 41/0654

* cited by examiner

*Primary Examiner* — Philip C Lee

(57) ABSTRACT

Systems and methods are disclosed for automatically reconstructing sequences of correlated events that arise from a root cause impact in a network environment. The method involves collecting and storing network data, detecting a root cause event, analyzing the network situation at various timings, and using artificial intelligence algorithms to diagnose the root cause, identify impacted network elements, and determine the sequence of state changes. The method maintains a NSE to track real-time network states and a NIE that manages the data collection and the reconstruction process. The resulting sequences can be presented visually and used to understand network impacts and suggest remedy actions. This method can be applied to a wide range of network environments, is scalable, and can handle complex network issues.

20 Claims, 31 Drawing Sheets

Machine Learning Based Anomaly Detection
Fit Model on "Normal Data" and Classify new data if Normal or Not

REACTIVE - URGENT ISSUES (PRIORITIZED)

| Serverity | Time | Host | Count | Details | DESCRIPTION | ID |
|---|---|---|---|---|---|---|
| 1 | 12:00 | R2 | 536 | R2 DOWN | POWER SUPPLY R2 | 392 |
| 1 | 12:00 | Link R2-R3 | 530 | Link DOWN R2-R3 | Link DOWN R2-R3 | 491 |
| 1 | 12:00 | Link R1-R2 | 499 | Link DOWN R1-R2 | | |
| | | | | | | |

Details R2-R3 Link DOWN

Time Slot - 12:00
ENGINEER - Dave Smith@dsmith
STEPS: Replace Power Supply EST 1 HR
CUSTOMBERS
IMPACTED SLA
VIOLATION PRIORITY 1 -336 Subscibers attached R1-R3

FIG. 6C

PROACTIVE - ANOMALY DETECTION THRESHOLD VIOLATION (PRIORITIZED)

| Serverity | Time | Host | METRIC | Details | DESCRIPTION | ID |
|---|---|---|---|---|---|---|
| 4 | 12:05 | R2 | CPU | CPU 95: UTI | Routers CPU list utilized OSPF Router Calculate90 : CPU | 621 |
| 4 | 1:30 | Link R2-R3 | Inoctets | LinK Congested | Link Utilization 99:0 | |
| 5 | 6:45 | Link R2-R3 | out octets | LinK Congested | | |
| 5 | 9:03 | Link R2-R3 | out octets | LinK Congested | | |

Details R2-R3 Link Congested
Time Slot - 12:00
ENGINEER - Dave Smith@dsmith
STEPS - Upgrade link R2-R3 to 100 GPS link EST 6 HRS
CUSTOMBERS
IMPACTED SLA
VIOLATION PRIORITY 4 - 12 Subscribers

FIG. 6E

AUTOMATED RECONSTRUCTION SYSTEM AND METHOD FOR SEQUENCES OF EVENTS ARISING FROM A ROOT CAUSE IMPACT IN NETWORK ENVIRONMENTS

BACKGROUND OF THE INVENTION

Network operations involve managing, troubleshooting, diagnosing problems, and monitoring the performance, security, and reliability of a network, which is a system of interconnected devices that communicate data. Network operations require skilled and experienced network engineers who are familiar with the physical network infrastructure, architecture, design, and operations, as well as with various tools that perform different functions, such as data collection, analysis, visualization, and troubleshooting. Network operations desire to keep the network up and running as much as possible but network impairments always occur, examples include misconfigurations, complex intermittent network issues, equipment degradation, such as fiber or optics, there are signals or combinations of signals that could be used to predict failures.

With the increasing complexity and scale of today's network environments, accurately identifying and addressing network issues has become a challenging task. Traditional network management and monitoring tools often rely on manual investigation and analysis, which can be time-consuming, error-prone, and lack scalability. Furthermore, these tools usually focus on individual network elements and events, making it difficult to unravel complex network issues involving multiple interdependent events and their cascading effects.

Anomaly detection, Alarm Correlation and root cause analysis in complex systems such as computer networks, cloud, on prem, SDN, hybrid further increase complexity and is a challenging task. Traditional methods often fail to accurately identify anomalies, correlate alarms and their root causes due to the complexity and high dimensionality of these systems. Current manual methods are very time consuming and require highly experienced, skilled network engineers to investigate step by step to reconstruct a sequence of events that estimate what occurred as a result of an impact or disturbance to the network.

The current process first involves knowing a problem exists, and navigating current tools are simple data stores, requiring an experienced engineer to know not only how to navigate the tool but also know what to look for and knowledge to understand what is normal or abnormal. This involves a time-consuming manual approach to investigate devices, traffic, transport states, routing protocols state, instrument packet traces, followed by additional manual efforts to gather and understand the data from remote devices, collate, correlate, and analyze. The complexity of these manual procedures makes it extremely challenging to identify anomalies, correlate alarms, and identify root causes or errors, diagnose issues, and determine problem resolution for corrective action.

In practical terms, the actual packets on the network, captured at the interfaces of each router along the path, carry timestamps and protocol information. Stitching these packets together provides valuable information for network engineers attempting to diagnose issues. However, as modern networks evolve, becoming increasingly complex with elements like SDN WAN, cloud, and VPN tunnels, decoding and troubleshooting transactions manually become formidable tasks. In such scenarios, intermittent network problems may persist for days, requiring the capture and processing of large volumes of data (Terabytes) to pinpoint the right packets revealing the root cause.

To illustrate, solving complex intermittent network issues using packet traces is a common task for network engineers. Packet traces are records of the data packets that travel through a network. They can reveal useful information about the network performance, behavior, and problems. Typically, network engineers use tcpdump and other packet trace tools to solve network issues to perform the following tasks: Instrument packet trace: Network engineers use tools like tcpdump, Wireshark, or Nmap to capture and analyze packet traces from different network devices. These tools can filter, display, and save packet traces in various formats. They can also perform advanced functions like decoding protocols, generating statistics, and detecting anomalies. Network engineers can instrument packet trace tools using command-line options, configuration files, or graphical interfaces.

Troubleshoot and diagnose network issues: Network engineers use packet traces to troubleshoot and diagnose network issues, such as latency, congestion, packet loss, misconfiguration, or security breaches. They can examine the packet headers, payloads, and timestamps to identify the source and destination of the packets, the protocols and services involved, and the network conditions and events. They can also compare packet traces from different network devices or time periods to isolate the root cause of the problem.

Correlate and collate packet traces from multiple devices: Network engineers use packet traces from multiple devices to get a comprehensive view of the network. They can correlate and collate packet traces from different sources using tools like mergecap, tcpslice, or tcptrace. These tools can merge, split, or slice packet traces based on various criteria, such as time, IP address, port, or protocol. They can also generate reports and graphs to visualize the network traffic and performance.

Detecting anomalies and determining root causes: Network engineers use packet traces to detect anomalies and determine root causes of network issues. They can use tools like Snort, Suricata, or Bro to perform network intrusion detection and prevention. These tools can analyze packet traces and alert network engineers of any suspicious or malicious activity, such as scans, attacks, or exploits. They can also use tools like tcpflow, Chaosreader, or NetworkMiner to perform network forensics and reconstruct the network sessions, files, and users involved in the incident. Take corrective action to resolve network issues: Network engineers use packet traces to take corrective action to resolve network issues. They can use tools like tcpreplay, tcprewrite, or bit wise to modify and replay packet traces to test or simulate network scenarios. They can also use tools like iptables, iproute2, or tc to configure and manipulate the network devices, such as firewalls, routers, or switches. They can also use tools like ping, traceroute, or mtr to monitor and verify the network connectivity and performance.

FIG. 1A shows an exemplary diagram illustrating the rerouting of network traffic from R1 through R2 to R3 when the direct link between R1 and R3 fails, while FIG. 1B shows a schematic diagram showing network routers R1, R2, and R3 with altered routing paths and tables as a result of a failure in the eR1R3 link. Turning now to FIG. 1A, an example scenario that has an edge from R1 to R3 fails at T=0. This causes traffic that was going from R1 to R3 directly now to be rerouted from R1, to R2, R3. The problem is that there was already traffic flowing from R1 to R2 to R3 and the links may not be designed to handle the additional load arising from the failure of eR1R3. FIG. 1B shows the Correlated Events and State changes as a direct result of the Root Cause event of eR1R3 failing. The route changes from T=0 to T=1 when traffic R1R3 has been rerouted to R1R2R3.

FIG. 1C shows a conventional way to detect a network anomaly where areas with extreme values over time are marked as 'Anomaly'. Anomalies are broadly defined as data points that are outliers from the dataset population's normal behavior. Computer Networks Systems are composed of networking devices, traffic and transport links where time series measurements of health, throughput, capacity and other performance indicators are the data from which normal and anomalies are computed. This is limited in accuracy and actionable value to the operator because it lacks context. Current anomaly detection approaches yield many false positives because anomalies are just anomalies in the data, but does not mean there is a problem in the system that needs attention or a predictor of a problem. FIG. 1C shows anomalies or outliers but that doesn't mean there is something broken, it just means data has a high or low value compared to the rest of the distributions, no actionable insight to improve the customer experience is provided. Even fixed thresholds have proven more useful however limited to the operator, such as disk utilization reaching 90% when usually it is 50% or lower. The current approach relies on the notion of classifying normal and outliers becoming a problem, but in reality just because it is an outlier, does not necessarily mean there is a problem and what is the root cause of the problem such that if fixed, the system is again stable and running normally.

In short, a significant industry challenge revolves around resolving complex, intermittent network problems. Skilled network engineers find it time-consuming to instrument, collect and analyze packet traces effectively, especially when dealing with large data volumes. For instance, a 100 Gbps link can generate a 7.5 TB capture in 10 minutes, demanding extensive manual sifting. This challenge intensifies with multiple suspect network points and intermittent issues, such as troubleshooting streaming performance problems where congestion points can vary at different times along the streaming paths from server to subscribers. Even when only packets of interest are captured using filtered, significant manual efforts and time are required to go packet by packet, interpreting transactions and discerning anomalies which additionally requires substantial expertise for each protocol. For instance, anomalies like a shrinking server TCP receive window indicating congestion may elude junior engineers. Determining the next steps to confirm hypotheses, such as logging into servers for additional data, poses another layer of complexity. Moreover, implementing corrective actions involves considerable risk in production networks.

SUMMARY OF THE INVENTION

In a first aspect, a method for automated anomaly detection and root cause determination in a network system includes representing the network system as a multi-layer graph, where each layer corresponds to a different network protocol or technology; training a graph neural network (GNN) on the multi-layer graph to learn a predetermined behavior of the network system; detecting anomalies by comparing the current state of the network system to the predetermined behavior learned by the GNN; and determining root causes of detected anomalies by analyzing learned node and edge weights in the GNN to identify responsible components and interactions.

In a second aspect, a method for providing a user interface for automated network operations using artificial intelligence (AI) includes providing a junior engineer with network engineering work already completed and simple review of what network issues impacting user experience, service degradations or faults were detected, summary of diagnosis, alarms correlated, root causes and steps to fix as well as an explanation of what happened and sequences of reconstruction before and after the issues. This automates the work of network engineers and provides the junior engineer everything needed to simply cut and paste the commands to remediate the issue or dispatch a technician or order a part. All relevant information for both the Network Engineer and manager on who is working on what tasks, as well as performance metrics on how many tickets, average time to resolve and other analytics is displayed with dashboards and other visualizations of the network status; displaying a list of network issues; the substantiation and explanation of the diagnosis, root causes and sequence of events leading to the event as well as verification of fixes completed are shown within the tool, displaying a menu of network operations; receiving a user selection of a network issue from the list; displaying details of the selected network issue, including affected devices, root cause, impact, and suggested actions; receiving a user request to perform a network operation; invoking one or more software agents to execute the requested network operation using AI techniques; displaying the results of the network operation to the user; and updating the dashboard and the list of network issues accordingly.

In a third aspect, a method for anomaly detection in a network including determining one or more root causes of faults or performance degradations in the network using network data from various sources; training a mixture of different machine learning models to detect anomalies associated with the determined root causes, wherein the training uses labeled data from the root cause determination;

selecting the best performing anomaly detection models based on criteria such as accuracy, computation time, and cost; processing real-time network telemetry data using the selected mixture of anomaly detection models to identify anomalies; and determining the root cause and required corrective action for the identified anomalies.

In a fourth aspect, a method for enhancing network fault detection and resolution using Graph Neural Networks (GNNs includes constructing a dynamic graph where nodes represent network devices, telemetry metrics, alarms, and commands executed by engineers; determining edges between nodes capture dependencies between the network components; processing the graph using a GNN to learn node embeddings that encode contextual information; identifying anomalous patterns by comparing node embeddings against historical norms; tracing the anomaly back through the graph to identify the root cause.

In a fifth aspect, a method is disclosed for automated distributed multi network packet trace analysis, iterative enhanced data collection and corrective action for resolution using digital twins and artificial intelligence. The method includes instructing a plurality of agents running on remote nodes to collect packet trace data of interest using filters, and send the collected data to a master server via batch or real-time streaming; on the master server, collating the received packet data from the different source devices, correlating the packets to remove duplicates, and sending the correlated packets to a Packet Analysis Engine; using the Packet Analysis Engine (PAE) to diagnose issues, gather more data if needed based on the diagnosis, identify anomalies and root causes, iterate based on the diagnosis and anomalies, and provide corrective action recommendations with commands to execute; and verifying configuration change commands on a digital twin of the production network before executing on the production network to reduce risk of adverse effects.

In a sixth aspect, a method is disclosed for automatically reconstructing sequences of correlated events that arise from a root cause impact in a network environment. The method involves collecting and storing network data, detecting a root cause event, analyzing the network situation at various timings, and using artificial intelligence algorithms to diagnose the root cause, identify impacted network elements, and determine the sequence of state changes. The method maintains a Network Inference Engine (NSE) to track real-time network states and a Network Inference Engine (NIE) that manages the data collection and the reconstruction process. The resulting sequences can be presented visually and used to understand network impacts and suggest remedy actions. This method can be applied to a wide range of network environments, is scalable, and can handle complex network issues.

Advantages of the above aspects may include one or more of the following. The ability to automatically reconstruct sequences of correlated events arising from a root cause impact in a network environment could significantly improve the efficiency and effectiveness of network troubleshooting and remediation. It can provide valuable insights into the root cause, the impacted network elements, the state changes of the network, and the appropriate remediation actions, thus facilitating a comprehensive solution for network operations. To achieve these benefits, it is desirable to have a method that can gather network data in a continuous and comprehensive manner, diagnose the root cause and impacts using artificial intelligence techniques, present the results in an intuitive format, and be scalable to large network environments. The system can automatically identify the root cause of an event and its associated effects on network elements describing the impacted changes to the network state and visualize in a simple, easy way to consume by a network engineer.

Other advantages may include one or more of the following. The multi-layer, multi-model graph neural network approach provides a unified representation and analysis of the complex network system, eliminating the need for siloed and disparate tools. This integrated approach enables seamless monitoring, anomaly detection, and root cause analysis across different network layers and technologies. The graph neural network models learn the normal behavior of the network system, enabling automated anomaly detection and root cause determination. This intelligent approach reduces the complexity and manual effort required by network engineers, providing proactive and automated solutions. By leveraging the power of graph neural networks and machine learning, the invention can quickly analyze massive amounts of network data and pinpoint anomalies and root causes, significantly reducing the time and effort required for troubleshooting and resolution. The invention provides clear and actionable insights into the root causes of network issues, eliminating the need for network engineers to have extensive domain knowledge and expertise. The multi-layer, multi-model approach captures the complexity of the network system, enabling comprehensive analysis and recommendations. The graph neural network approach can effectively represent and analyze complex network systems, including cloud, 5G, and Internet of Things (IoT) networks. This scalability and adaptability ensure that the invention can address the increasing complexity and diversity of modern network environments. The invention offers a more efficient, cost-effective, and reliable solution for network operations, reducing the reliance on scarce and expensive network engineering expertise while improving the quality and reliability of network services.

Yet another advantage of this method is its ability to handle complex network issues. By continuously monitoring and analyzing network data, the NIE can detect and reconstruct sequences of correlated events that may involve multiple interdependent events and their cascading effects. This provides a more comprehensive understanding of the network situation and facilitates a more effective solution.

A further advantage of this method is its scalability. The process further includes that the method is integrated with existing network management and monitoring tools (66) to provide a comprehensive solution (57) for network operations (46). The method integrates with existing network management and monitoring tools to provide a comprehensive solution for network operations. This integration allows the method to gather network data from multiple sources, such as network devices, logs, alarms, and performance metrics, in a continuous and comprehensive manner. The collected data is stored in a centralized repository for easy access and analysis.

The method then utilizes artificial intelligence algorithms, such as machine learning and pattern recognition, to analyze the network data and detect a root cause event. The root cause event can be identified based on its impact on the network, such as a significant change in network state or performance. The method also takes into account the timing of events and their correlations to accurately identify the root cause. Once the root cause event is detected, the method proceeds to analyze the network situation at various timings to determine the sequence of correlated events that led to the root cause. This analysis involves tracking the state changes of network elements, such as devices, links, and protocols, and their interactions with each other. The method maintains a NSE to track the real-time states of network elements and a NIE to manage the data collection and reconstruction process. The resulting sequence of events is presented visually, such as in a timeline or network topology diagram, to provide a clear understanding of the root cause and its impacts on the network.

The system is capable of handling complex network issues, the method described herein is capable of handling complex network issues, such as those involving multiple interdependent events and cascading effects. This is achieved through the use of artificial intelligence algorithms, which can analyze a large amount of network data and identify patterns and correlations between different events. This allows the method to accurately reconstruct the sequence of events that lead to a root cause impact in the network. For example, if there is a network outage that affects multiple devices, the method can analyze the network data to determine the root cause event. It can then trace back the sequence of events that led to this root cause, including any secondary or cascading effects. This can include events such as a hardware failure, a software bug, or a configuration change that caused a domino effect in the network.

Furthermore, the method is scalable and can handle large network environments. This is achieved through the use of a NSE, which continuously tracks and stores real-time network data, and a NIE, which manages the data collection and reconstruction process. These components allow the method to efficiently gather and analyze data from a large number of network elements, making it suitable for use in complex and expansive network environments.

Overall, the method provides a comprehensive solution for network operations, allowing for quick and accurate identification of root causes, impacted network elements, and appropriate remediation actions. This can significantly improve the efficiency and effectiveness of network troubleshooting and maintenance, making it a valuable tool for managing modern networks.

BRIEF DESCRIPTION OF DRAWINGS

FIG. 6C shows an exemplary diagram of reactive issues and a reactive component for network event sequence reconstruction.

FIG. 6E shows an exemplary handwritten notes on a printed table with columns for recording network anomalies and their proactive measures.

DETAILED DESCRIPTION OF THE INVENTION

Figure 1A:
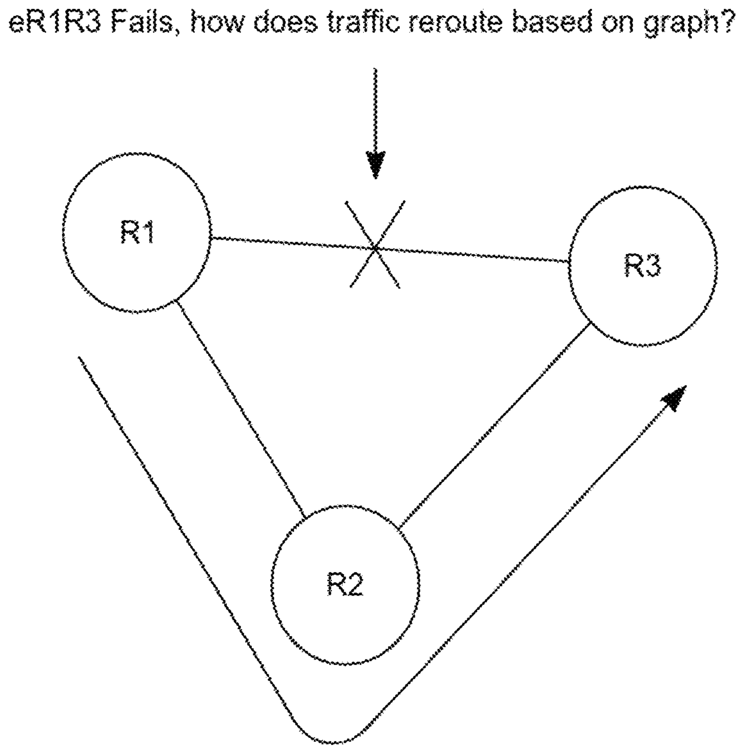
FIG. 1A shows a diagram illustrating the rerouting of network traffic from R1 through R2 to R3 when the direct link between R1 and R3 fails.
Figure 1B:
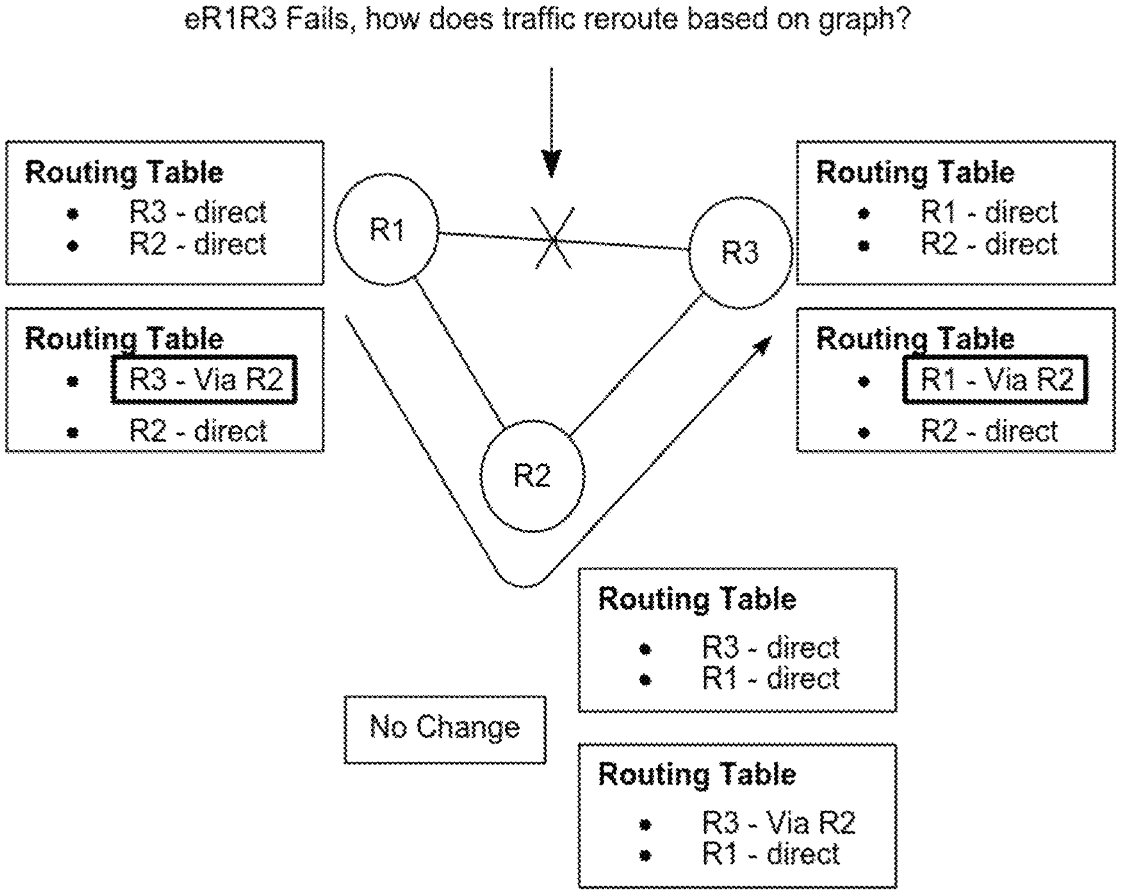
FIG. 1B shows a schematic diagram showing root causes associated with the failure shown in FIG. 1A.

In the following paragraphs, the present invention will be described in detail by way of example with reference to the attached drawings. Throughout this description, the preferred embodiment and examples shown should be considered as exemplars, rather than as limitations on the present invention. As used herein, the "present invention" refers to any one of the embodiments of the invention described herein, and any equivalents. Furthermore, reference to various feature(s) of the "present invention" throughout this document does not mean that all claimed embodiments or methods must include the referenced feature(s).

This invention now will be described more fully hereinafter with reference to the accompanying drawings, in which exemplary embodiments are shown. Various embodiments are now described with reference to the drawings, wherein such as reference numerals are used to refer to such as elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

This invention may, however, be embodied in many different forms and should not be construed as limited to the embodiments set forth herein. These embodiments are provided so that this disclosure will be thorough and complete and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the such as represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named manufacturer.

In one aspect, a method and system perform anomaly detection and root cause analysis using Graph Neural Networks (GNNs). The method involves representing the complex system as a graph, where nodes represent system components and edges represent interactions between them. The GNN is trained to learn the normal behavior of the system from the graph representation. When a new graph representing the current state of the system is input to the GNN, it can identify nodes (system components) that behave anomalously and infer the root causes of these anomalies.

Figure 2A:
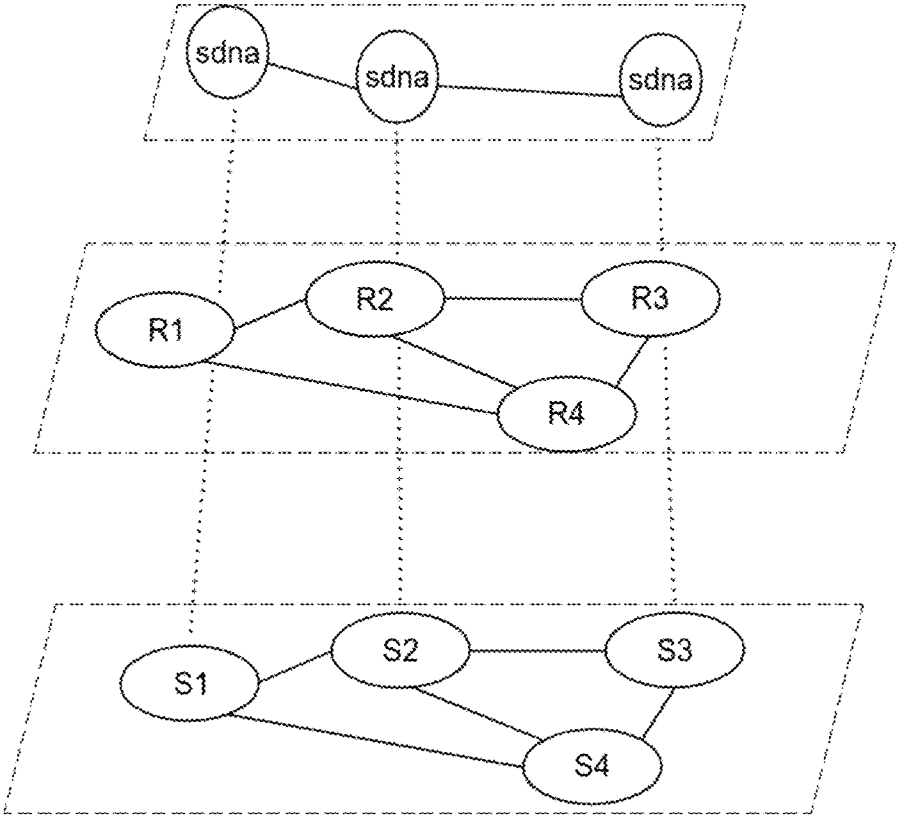
FIG. 2A shows an exemplary diagram of a network layer graph representation of a network.

FIG. 2A shows diagram of a network layer graph with nodes labeled R1 to R4 and S1 to S4 representing network devices, and edges indicating communication links, with dashed lines suggesting connections between different network layers. A multi-dimensional approach is used where a normal Graph based model based on a particular network layer such as Software Defined Network (SDN), SD Wan, MPLS, BGP, OSPF, ISIS, TCP, IP, UDP are graphs on per layer basis, where normal correct behavior is learned by the graph which can be composed of any suitable graph neural network or derivative such as GAT. This forms the multi layer and current states are continuously modeled as a subset graph which is constructed based on events or faults at that particular layer. This current state per layer graph is compared against normal behavior graph, using message passing approach were features of the nodes (Routers or any network device) and features of edges (Network Communication link which can be optical, ethernet, 5G, 4G, Wifi 6/6E etc) are used to determine root causes as well as associated anomalies from prior samples that are then used to fit another model to determine the predictors of these network issues, hence constructed a highly accurate unsupervised machine learning training approach.

The method begins by representing the complex system as a graph. Each node in the graph represents a component of the system, and each edge represents an interaction between two components. Node and edge attributes can be used to represent various properties of the components and their interactions.

A GNN is trained on this graph under normal operating conditions of the system. The GNN learns to predict the next state of the system given its current state. Once the GNN is trained, it can be used to monitor the system in real-time. When the system state deviates from the prediction of the GNN, an anomaly is detected.

Furthermore, the GNN can be used to infer the root causes of the detected anomalies. By analyzing the learned node and edge weights, the GNN can identify which components (nodes) and interactions (edges) are most responsible for the anomaly. This provides valuable insights for system operators, allowing them to quickly address the root causes and prevent further anomalies.

In one embodiment, a multi-dimensional approach is detailed for anomaly detection and root cause analysis in network systems. The system is represented as a multi-layer graph, where each layer corresponds to a different network layer such as Software Defined Network (SDN), SD Wan, MPLS, BGP, OSPF, ISIS, TCP, IP, UDP, etc.

In each layer, nodes represent network devices (like routers) and edges represent network communication links (like optical, ethernet, 5G, 4G, Wifi 6, 6E, etc.). The normal behavior of the system is learned by a Graph Neural Network (GNN) or its derivative (like Graph Attention Network-GAT) from this graph representation.

When an event or fault occurs at a particular layer, a subset graph representing the current state of the system is constructed. This current state graph is then compared against the normal behavior graph using a message passing approach. The features of the nodes and edges are used to determine the root causes of the anomalies. There are two types of structural relationships:

East West {EW)—this refers to the structural relationships between nodes on a per layer basis. For example BGP peers that directly peer with each other. IP direct connect neighbors refer to routers and interfaces that are directly connected on an IP layer basis, ignoring that fact there may be multiple sub layer devices in between such as is the case with PPP or switches, or MPLS VPN tunnels.

North South (NS)—this refers to the structural relationships between nodes or edges to other nodes or edges in an adjacent layer. For example a Layer 3 router be attached to Layer 2 network switch so the router will have a NS edge to its connected Layer 2 switch device.

The associated anomalies from prior samples are then used to fit another model to determine the predictors of these network issues, constructing a highly accurate unsupervised machine learning training approach for predicting network issues based on past history of the root causes and associated predictor anomalies.

The GNN is trained on network data such as recorded samples of network traffic that flows through a particular location in the network. They can provide a detailed picture of the conditions on the network at a given time, including the types of traffic that were present, their sources and destinations, their volume, and other properties. Packet traces play a crucial role in understanding network performance and detecting anomalies. The system collects these packet traces over time and in a time-series manner, storing them in a database, which forms a comprehensive source of historical network data and can contain settings for the various components that make up the network, such as routers, switches, and servers. They dictate how these components should behave under normal conditions and during times of network stress. By examining these configuration files, the system can better understand the intended operation of the network, which helps identify when and where deviations from the norm have occurred, by comparing them against current and historical state data. The system processes these files to extract useful information which is then stored for future analysis. The data can also offer a chronological record of events regarding a particular system, detailing the various actions and changes that have taken place over time. This includes but is not limited to, login activities, system errors, or changes in the system's state. In the case of the present one embodiment, logs collected from each network element offer a detailed timeline of their operation and are used in tandem with other data types to provide a fuller understanding of network events. The system collects and parses these logs continuously, storing and categorizing them for future retrieval and analysis. Collectively, these three types of data-packet traces, configuration files, and logs-provide rich, detailed, and granular insights into the status and behavior of the network, both historically and in real-time. When combined with the capabilities of the proposed system's AI-driven NIE, they enable efficient and effective diagnosis and resolution of networking issues by constructing a comprehensive picture of correlated network events before and after a root cause event.

Data is collected using a framework that automates processes such as data collection, collation, correlation, diagnosis of network issues associated with root causes of network issues, and the final reconstruction of sequences of events that occurred, thus supporting a visualization of what happened and what was impacted and when. This automation and visualization greatly improve the productivity of network operation teams and provide a comprehensive understanding of the impact and scope of a network outage event. The full information provided by the Invention assists the network engineer in determining if the root cause network issue is completely resolved or if it has lingering side effects.

The system, designed for real-time monitoring and rectification of network discrepancies, continuously stores and organizes network data from multiple sources. The data, necessary for the investigation of issues arising out of a root cause at a later time point, is conserved in databases in a time-series manner. This approach facilitates the easy retrieval of the data sequence to efficiently reconstruct the incidence of events.

Furthermore, the iterative approach of data gathering and analysis by the system embodies the proficiency of experienced engineers, ensuring a comprehensive understanding of the cascading impacts inducing the root cause. By automating these tasks, the one embodiment empowers network engineers to shift their focus to higher-level activities.

The system's state-of-the-art technology streamlines its functionality, allowing it to function in wide-ranging network environments, from large-scale enterprises and service providers to cloud-based networks. Regardless of the network's extensive nature or complex configurations, the system can adapt and operate efficiently, providing an innovative solution to intricate network issues that often entail a multitude of iterative steps involving data gathering, data analysis, and decision-making.

Additionally, the system presents the findings from the automated analysis to network engineers in a clear, comprehensible, and visual manner, which aids in making informed decisions to resolve network issues. It not only identifies the root cause but also demonstrates the impact visually, displaying how events transformed due to recovery actions or further degradation depending on the data.

Figure 2B:
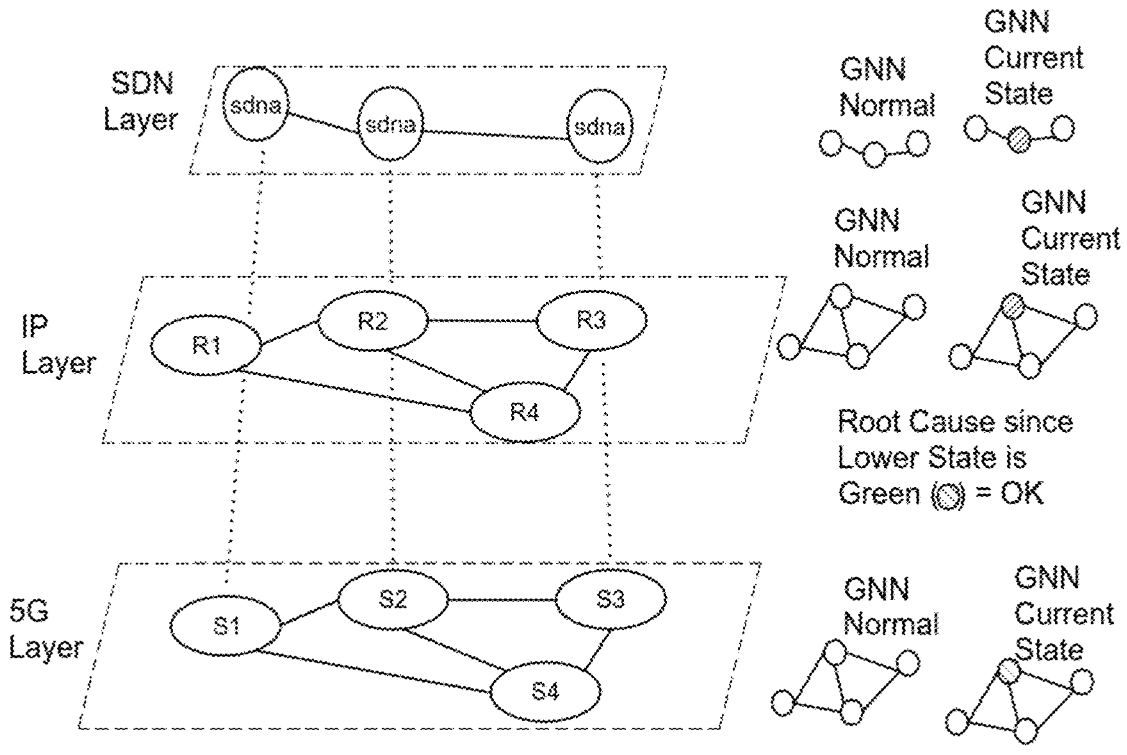
FIG. 2B shows an exemplary diagram illustrating a network topology across SDN, IP, and 5G layers for root cause analysis within a graphical neural network (GNN) context.

FIG. 2B shows diagram illustrating a network topology across SDN, IP, and 5G layers with notations for normal and current states, highlighting a root cause analysis within a graphical neural network context. The GNN (or derivates such as GAT) can compute anomalies and root causes by first training the normal state and then continuously computing the difference between current state constructed based on network events at that layer and the normal graph state. It would include input layers (representing the nodes and edges of the graph), hidden layers (representing the learning process), and output layers (representing the identified anomalies and root causes) are not shown for simplification purposes. The NS relations are shown in dashed lines. The lowest layer where a node has a fault shown in red is the root cause since the upper layer nodes that support it are down and the lower layer nodes are working shown in Green, hence the root cause in this simplified example is shown in the Root Cause shown as dashed lines.

Figure 2C:
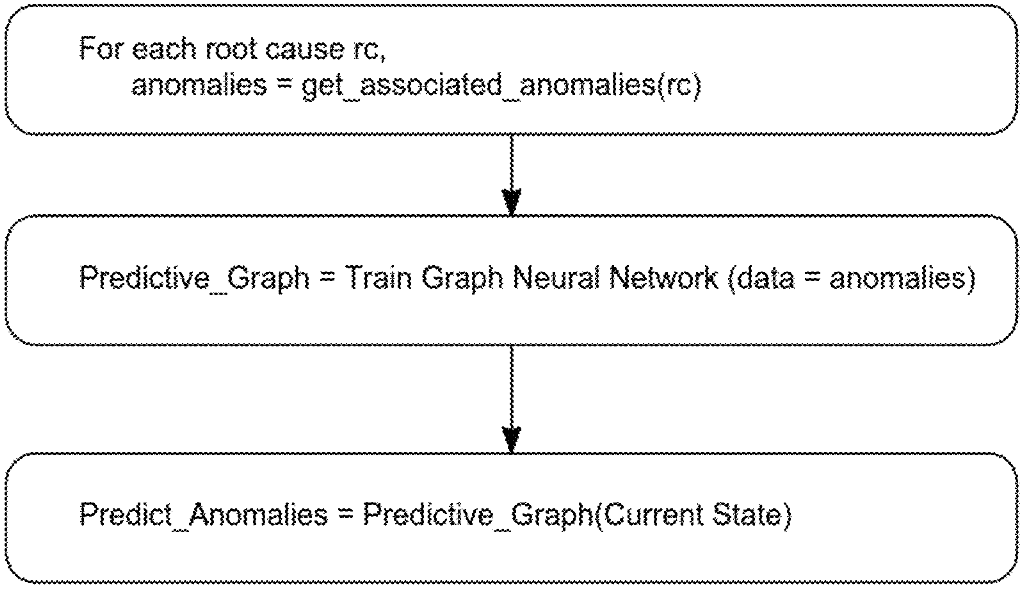
FIG. 2C shows an exemplary flowchart detailing a method for training the GNN to predict anomalies based on associated anomalies of each root cause.

FIG. 2C shows an exemplary method for training a graph neural network to predict anomalies based on associated anomalies of each root cause. The flowchart of FIG. 2C describes the process of predictive anomaly detection. It would start with the construction of the predictive anomaly detection by training on known anomalies that were predictors of the root causes determined in the GNN approach described above. Then this trained ML model based on GNN will be used for inference or predicting if anomalies are valid that may lead to faults as shown in the flow chart. The method for anomaly detection and root cause analysis in complex systems using Graph Neural Networks in Multiple network layers that best represent real network layers and anomalies that are associated with root causes to train a predictive model that will predict anomalies highly probable to follow with a network fault based on past trained data. This method offers superior performance compared to traditional methods, especially in systems with high dimensionality and complexity.

Figure 1C:
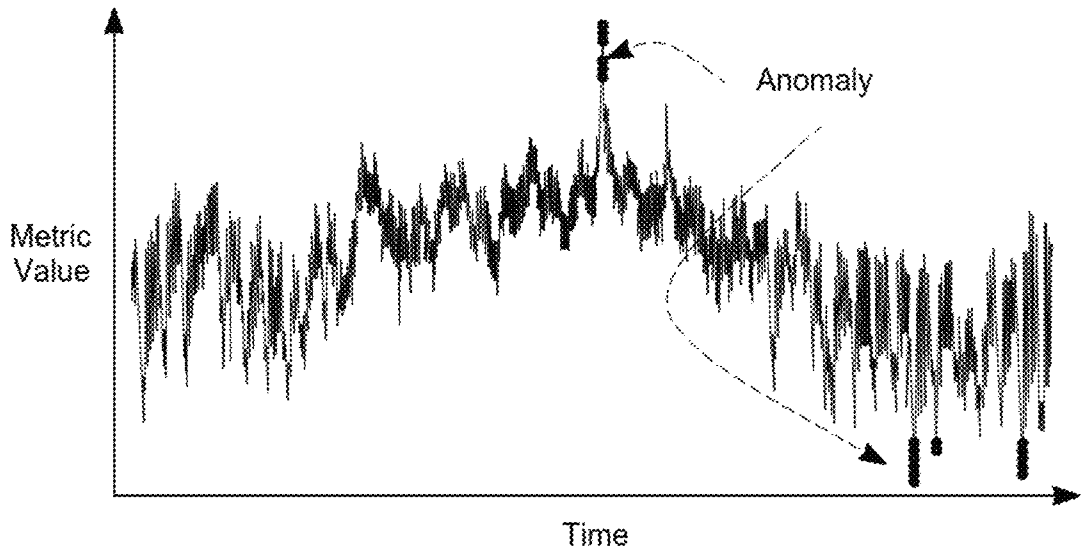
FIG. 1C shows a conventional way to detect a network anomaly.

In an example using a machine learning algorithm, the data shown in FIG. 1C relates to a key performance indicator time series showing the anomalies. The application of machine learning algorithm is better than static threshold based approaches since baselines change over time such as at mothers day, mobile traffic surges and for mothers day, the new normal will be different, and properly trained machine learning algorithms will know that. However even during non peak traffic, if the algorithm is only basing its anomalies on regressive approaches, it misses out on other complex combination scenarios and further what is the action? These anomalies, even if correct, are not actionable, since it doesn't necessarily mean anything in the network is broken that needs fixing or is actionable by the network operations team.

Network data for training and for inference can be obtained from various sources, including but not limited to: network devices (e.g., routers, switches, firewalls), applications, databases, logs, and network management systems. The network data can include a wide range of information, such as network topology, traffic flow, network element configurations, performance metrics, error messages, and alarms. In some embodiments, the network datum acquisition module can use various techniques to collect network data in real-time or near-real-time. For example, the module can use network probes, agents, sensors, or log collectors to monitor network elements and collect data. Alternatively, the module can leverage existing network management systems or data repositories to retrieve network data. In some cases, the network data may be obtained from different vendors and protocols, requiring the module to perform data normalization and correlation to create a unified view of the network. The network data collected by the acquisition module is then stored in a network data store. The data store can be a database, a data warehouse, or other suitable storage means. In some embodiments, the data store can be distributed and scalable to handle large volumes of data. Network datum acquisition and storage modules and are responsible for collecting, processing, and storing network data that is used to reconstruct the sequences of correlated events. Network data can be obtained from various sources, including but not limited to: network devices (e.g., routers, switches, firewalls), applications, databases, logs, and network management systems. The network data can include a wide range of information, such as network topology, traffic flow, network element configurations, performance metrics, error messages, and alarms. In some embodiments, the network datum acquisition module can use various techniques to collect network data in real-time or near-real-time. For example, the module can use network probes, agents, sensors, or log collectors to monitor network elements and collect data. Alternatively, the module can leverage existing network management systems or data repositories to retrieve network data. In some cases, the network data may be obtained from different vendors and protocols, requiring the module to perform data normalization and correlation to create a unified view of the network. The network data collected by the acquisition module is then stored in a network data store. The data store can be a database, a data warehouse, or other suitable storage means. In some embodiments, the data store can be distributed and scalable to handle large volumes of data. Network datum acquisition and storage modules and are responsible for collecting, processing, and storing network data that is used to reconstruct the sequences of correlated events. Network data can be obtained from various sources, including but not limited to: network devices (e.g., routers, switches, firewalls), applications, databases, logs, and network management systems. The network data can include a wide range of information, such as network topology, traffic flow, network element configurations, performance metrics, error messages, and alarms. In some embodiments, the network datum acquisition module can use various techniques to collect network data in real-time or near-real-time. For example, the module can use network probes, agents, sensors, or log collectors to monitor network elements and collect data. Alternatively, the module can leverage existing network management systems or data repositories to retrieve network data. In some cases, the network data may be obtained from different vendors and protocols, requiring the module to perform data normalization and correlation to create a unified view of the network.

Figure 2D:
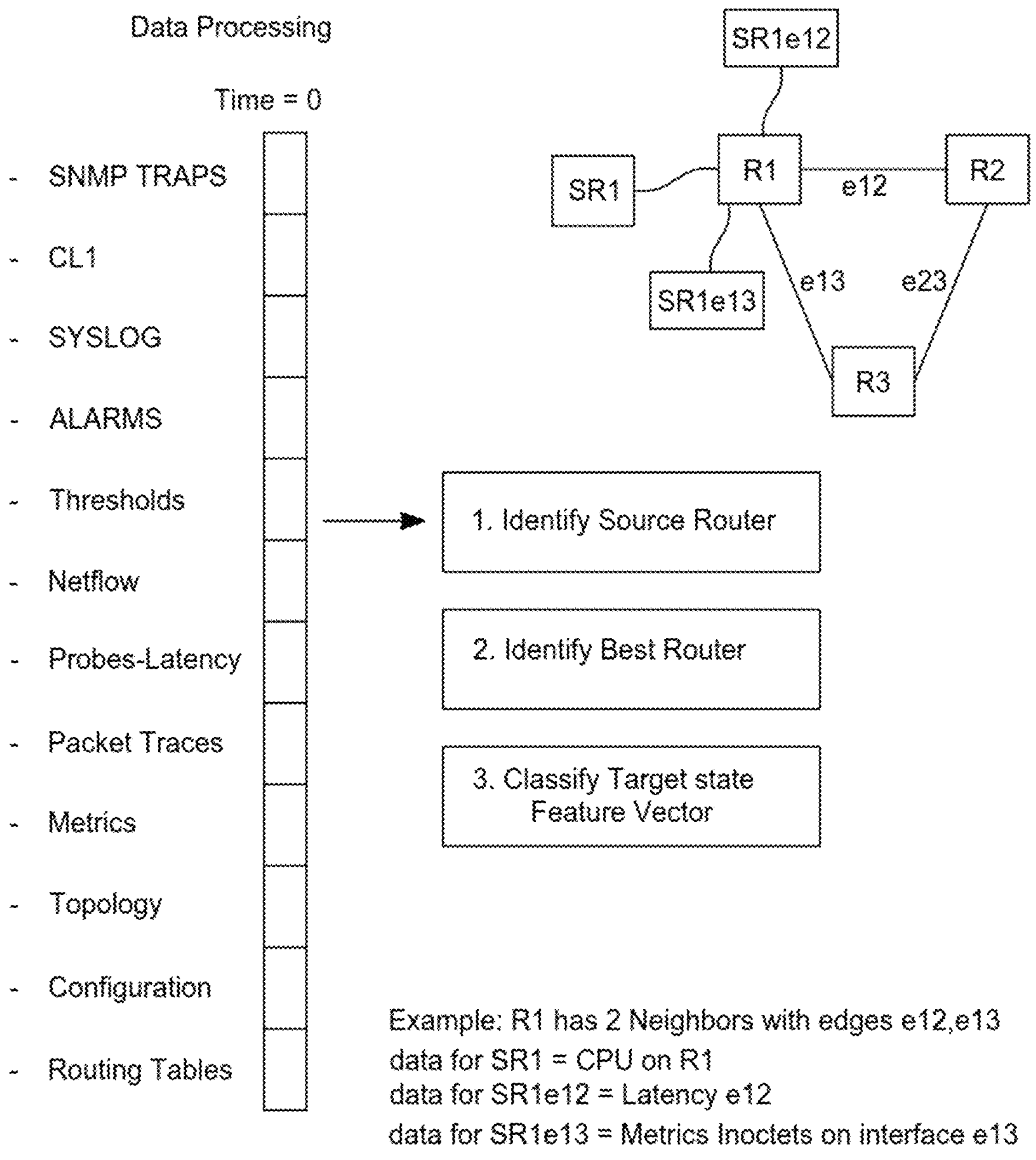
FIGS. 2D-2K show in more details exemplary data input collection and GNN ingestion of the data.

FIGS. 2D-2K show in more details exemplary data input collection and GNN ingestion of the data. FIG. 2D shows how data is processed to determine which host, network layer, and interface the data maps to on the graph representation of the network, and shows how data is processed that allows downstream tasks to create context aware feature vectors mapped on a per network layer, per router or node basis and attached to the internal or neighbor adjacency. FIG. 2D also shows an exemplary data pre-processing pipeline for constructing context-based feature vectors for graph neural network-based anomaly detection, root cause analysis, and alarm correlation.

Data is first collected from the network. Each data point has a hostname, IP address, or other identifier to determine what the data belongs to. After data collection, the context of each data point is determined. There are three types of context on a per network layer basis:

Host Only: Data relevant only to the device or node itself, such as CPU temperature. This type of data does not involve any neighbor interactions.

Neighbor: Data associated with the interface and edge connection to a neighbor. For example, the data relevant to the interface on Router R1 that connects to edge e12 leading to Router R2 is labeled as SR1e12 (State or Feature Vector for R1 and context e12).

Global: Data associated with the entire global network, summarized by node. An example is a node failure causing traffic rerouting.

By processing the data to determine the appropriate context, the method enables downstream tasks to create context-aware feature vectors mapped on a per network layer, per router or node, and per interface basis. This context-based representation is crucial for increasing the accuracy of anomaly detection, root cause determination, and alarm correlation using Graph Neural Networks (GNNs) and other AI techniques.

Figure 2E:
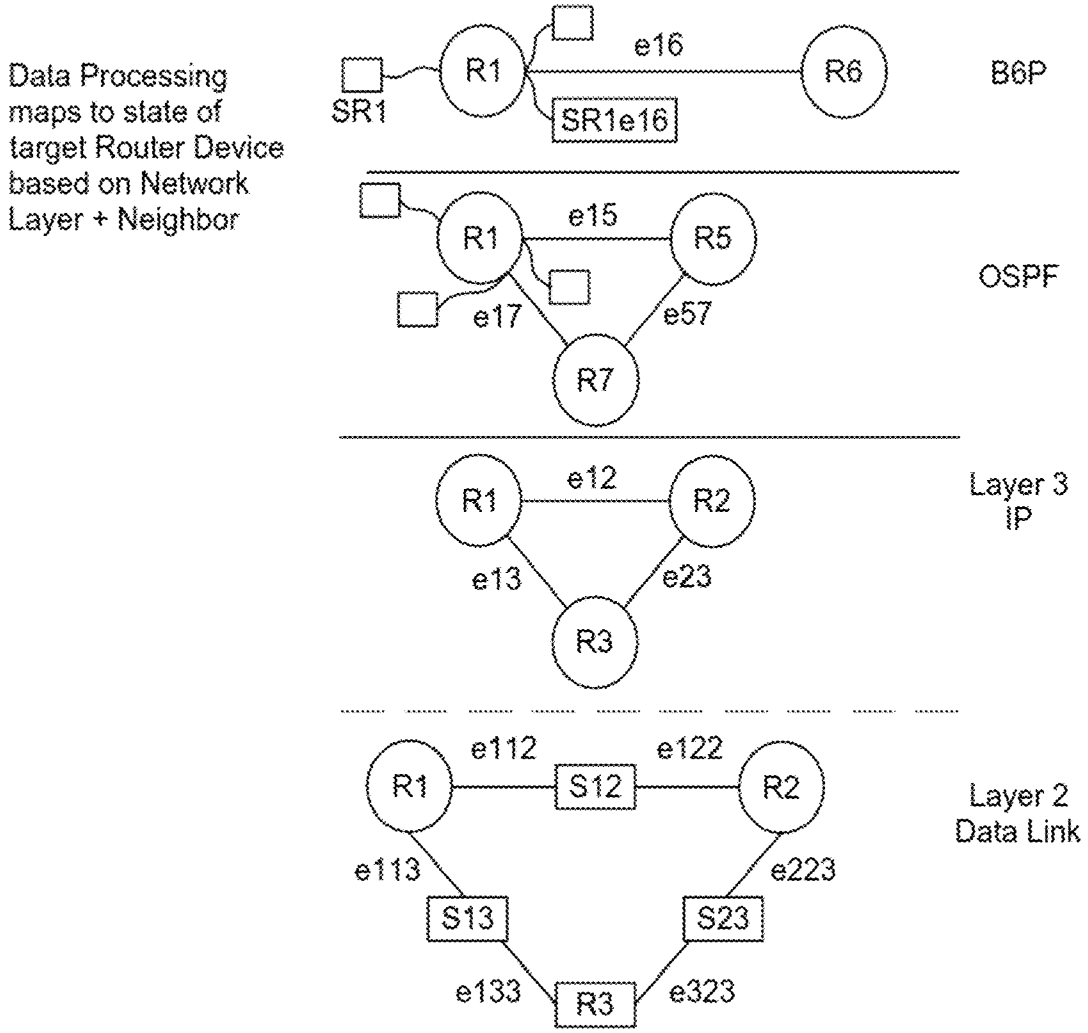

FIG. 2E illustrates the representation of a computer network on a per layer basis, which allows creating contexts that significantly increase the accuracy of models for anomaly detection, alarm correlation, and root cause determination. Data is collected from the network and routed to the appropriate context on a per layer, per node, per interface basis, which constitutes "context". FIG. 2E illustrates the following:

Network Layer Representation: The computer network is represented on a per layer basis, as shown by the different layers.

Context Storage: At each layer, for each node and interface, there are State or Feature vectors that contain data for the relevant context. The contexts store the state and information most relevant to that layer, node, and interface.

Neighbor Context: The boxes labeled SR1e12 represent the data that is relevant to Router R1, but specifically for the interface facing edge e12 which connects R1 to R2. This neighbor context data is associated with the interaction between R1 and R2 via the edge e12.

Node Context: Similarly, at each layer for each node, there are State or Feature vectors that contain data relevant only to that node itself, such as CPU temperature. This node context data does not involve any neighbor interactions.

Global Context: In addition to node and neighbor contexts, there is also global context that considers all nodes and edges summarized at a network-wide level. An example of global context is a node failure causing rerouting of traffic around surviving nodes and paths.

In FIG. 2E the context is based on a particular layer of the network and whether the data is relevant to an edge or interaction to a neighbor or the node itself. An example of node itself context is temperature of the processor, it has nothing to do with neighbors. Another context is relevant to interactions with a neighbor such as latency along an edge to a neighbor. The global context considers all nodes and edges summarized on a global basis, and examples would include a node failure and traffic is rerouted around surviving nodes and paths. The boxes labeled SR1e12 represent the data that is relevant to R1, but for the interface facing edge e12 which connects R1 to R2. Similarly at each layer at each node there are State or Feature vectors that contain data for that context.

By representing the network on a per layer basis and storing relevant contexts at each layer, node, and interface, this method enables the creation of context-aware feature vectors. These feature vectors are then passed to the Graph Neural Network (GNN) for downstream processing of anomaly detection, alarm correlation, and root cause analysis. The context-based representation is crucial for increasing the accuracy of these AI-based network analysis tasks compared to approaches that do not consider the different contexts. Once the data layer, Host, Context is determined then this data is put into feature vectors and passed to the GNN for downstream processing with the following details:

Data Representation: The data processing and node feature vector representation is describe in another Patent that describes how data is mapped on a per network layer, per router or node basis and attached to the internal or neighbor adjacency.

Graph Construction:

Construct a graph representation of the computer network on a per layer basis, for example networks work at multiple layers as modelled by OSI stack or TCP/IP stack, in practice we have physical layer, Layer 0, data link layer Layer 1, IP layer or Network layer or also called Layer 3, Transport Layer 4, we then have sub layers such as OSPF, BGP, MPLS etc. There is a separate graph structure at each layer. For the rest of the patent we will describe one particular layer, IP Layer 3, but the same concepts will apply for each layer. Nodes at each layer can be a physical or logical endpoint node. For example in Layer 3, a node is realized as a Router, at BGP layer, node is represented as a BGP Peer. Nodes can represent devices (e.g., routers, switches, servers) or logical endpoints, and edges represent connections or interactions between these devices (e.g., network links, communication patterns) which can be physical or logical. For example in layer2, devices are usually connected physically using a cable, except in the case of wireless WiFi. In BGP, edges are logical TCP connections, but actually span many layer 3 hops supporting that BGP logical connection.

Node Features: On a per layer basis, we pull the appropriate data on the target device or node facing connection. For example in layer 3, a router will have an interface facing a direct connected neighbor We pull data from the data processing patent and attach to that target device and that target interface representing the node features that specifically capture the features and relationship relevant to the edge connecting both node endpoints. Assign features to each node to capture relevant characteristics of the devices, such as device type, configuration parameters, network traffic statistics, and historical performance metrics.

Edge Features: From the data processing invention we showed how data is mapped or assign features to edges to capture properties of the connections between devices, such as latency, bandwidth, and communication patterns which is stored at each node endpoint's appropriate interface that is connected to each neighbor.

Anomaly Detection:

Node-Level Anomaly Detection: On a per layer and per node basis, we Train a GNN, such as a GAT, to learn node-level representations of the computer network at that layer. The GNN processes the node features and their associated neighborhood information to detect anomalies at the individual device, layer, and edge level as well as on a per node basis, such as cpu temperature where there is no neighbor. So we have multiple separate GNNS on a per node, per interface, per layer basis. Anomalies may manifest as deviations from normal behavior, such as unusual traffic patterns, configuration changes, or performance degradation.

Graph-Level Anomaly Detection: Global View: aggregate node-level representations to compute a graph-level representation on a per layer basis of the entire global network consisting of all nodes and edges at that layer and apply anomaly detection techniques to detect anomalies at the overall network level, such as sudden changes in network topology or connectivity disruptions.

Alarm Correlation:

Alarm Generation: Generate alarms or alerts from various monitoring sources within the computer network, such as syslogs generated by routers that detect a fault, snmp traps, Network monitoring systems that detect faults based on complex software analytics, network traffic analyzers, and system logs. Each alarm corresponds to a specific event or anomaly detected within the network.

Alarm Representation: Represent alarms as nodes in the graph, where each alarm node is associated with metadata describing the type of alarm, severity, timestamp, and relevant contextual information.

Graph Augmentation: Augment the existing network graph with the alarm nodes and edges connecting them to the corresponding devices or entities implicated by the alarms. The data is used to train a GNN, such as a GAT, to learn node-level representations of the computer network at that layer. The GNN processes the node features and their associated neighborhood information to correlate alarms described above at the individual device, layer, and edge level as well as on a per node basis, such as cpu temperature where there is no neighbor. So we have multiple separate GNSS on a per node, per interface, per layer basis. Alarms are correlated based on training data that finds out which alarms are root alarms, symptoms on a per device, per neighbor, per layer basis based on trained labeled data, where the data is a labeled using ML approaches using a Semi Unsupervised, Supervised or Unsupervised manner to generate the labeled training data.

Graph-Level Alarm Correlation Global View: aggregate node-level representations to compute a graph-level representation on a per layer basis of the entire global network consisting of all nodes and edges at that layer and apply alarm correlation detection techniques to detect root alarm and symptoms.

Root Cause Identification:

Graph Propagation: Utilize the trained GNN, such as a GAT, to propagate information throughout the augmented graph, on a per layer basis, taking into account both the network topology and the alarm information. The GNN aggregates information from neighboring nodes and edges to update node representations iteratively.

Attention Mechanism: Leverage the attention mechanism in GATs to dynamically focus on the most relevant nodes and edges during message passing, allowing the model to prioritize important information for root cause analysis.

Root Cause Inference: Analyze the updated node representations to identify potential root causes of alarms or anomalies within the network. Root causes may be inferred based on patterns of anomalous behavior, correlated alarms, or changes in network dynamics detected by the GNN. Train a GNN, such as a GAT, to learn node-level representations of the computer network at that layer. The GNN processes the node features and their associated neighborhood information to determine root causes at the individual device, layer, and edge level as well as on a per node basis, such as cpu temperature where there is no neighbor. So we have multiple separate GNNS on a per node, per interface, per layer basis. Root causes are computed based on training data that considers all data including, topology, configuration, alarms, anomalies and other factors on a per device, per neighbor, per layer basis based on trained labeled data, where the data is a labeled using ML approaches using a Semi Unsupervised, Supervised or Unsupervised manner to generate the labeled training data.

Graph-Level Alarm Correlation Global View: aggregate node-level representations to compute a graph-level representation on a per layer basis of the entire global network consisting of all nodes and edges at that layer and apply root cause determination techniques described above on the entire global network.

Feedback and Refinement:

Feedback Loop: Incorporate feedback mechanisms to validate the identified root causes, refine the anomaly detection model, and improve the overall accuracy of the system over time using reinforcement learning techniques on all the GNNS at each layer, per node and per neighbor basis.

Continuous Learning: Continuously update the GNN model with new data and feedback from network operators to adapt to evolving network conditions, emerging threats, and changes in network topology.

Figure 2F:
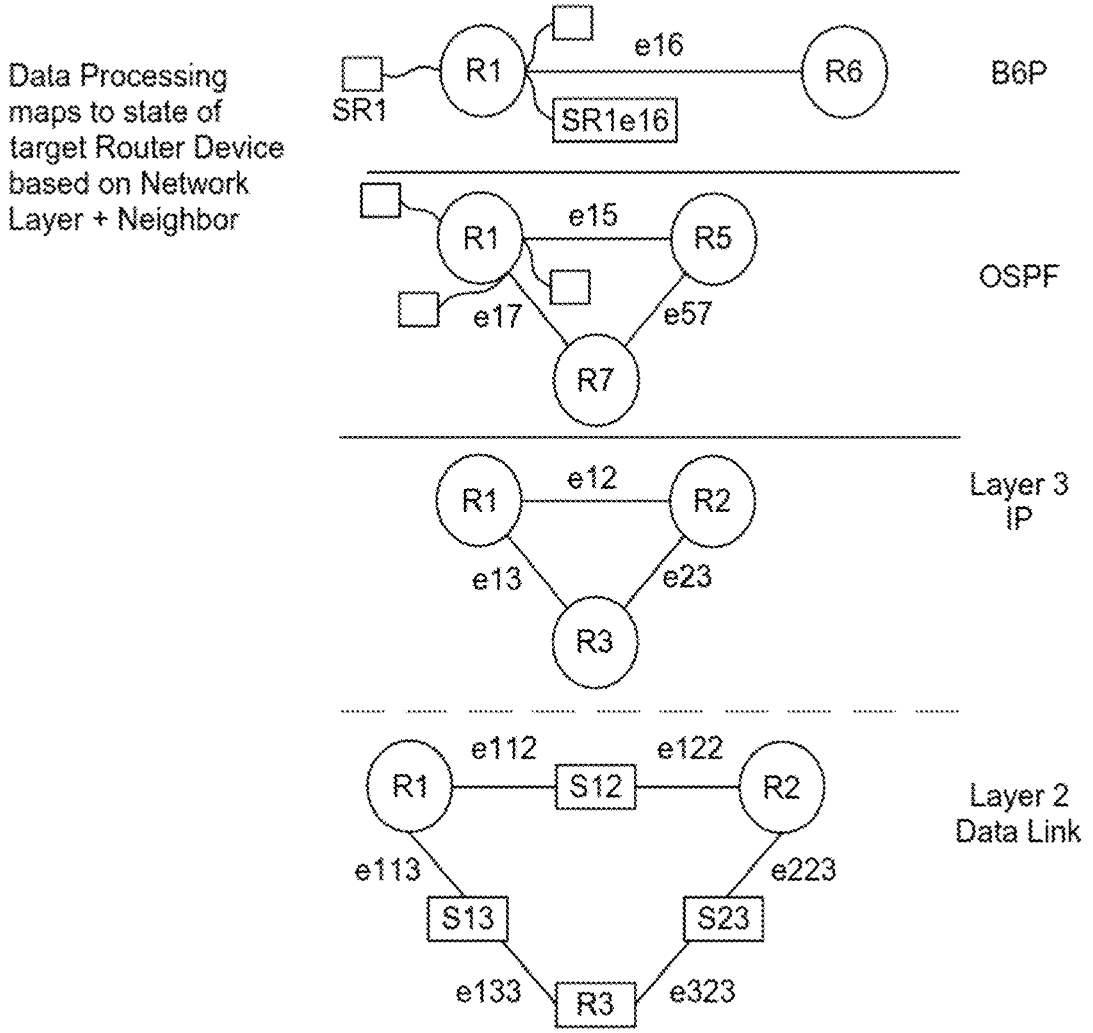

The system obtains and extracts data that is relevant to context. FIG. 2F shows a representation of computer networks on a per layer basis allow to create contexts that significantly increase accuracy of models for anomaly detection, alarm correlation and root cause determination. contexts store state and information most relevant. FIG. 2F thus shows context is based on a particular layer of the network and whether the data is relevant to an edge or interaction to a neighbor or the node itself. An example of node itself context is temperature of CPU, it has nothing to do with neighbors. Another context is relevant to interactions with a neighbor such as latency along an edge to a neighbor. The global context considers all nodes and edges summarized on a global basis, and examples would include a node failure and traffic is rerouted around surviving nodes and paths. Data is collected from the network and routed to the appropriate context on a per layer, per node, per interface basis, which constitutes "context". The boxes labeled SR1e12 represent the data that is relevant to R1, but for the interface facing edge e12 which connects R1 to R2. Similarly at each layer at each node there are State or Feature vectors that contain data for that context.

Figure 2G:
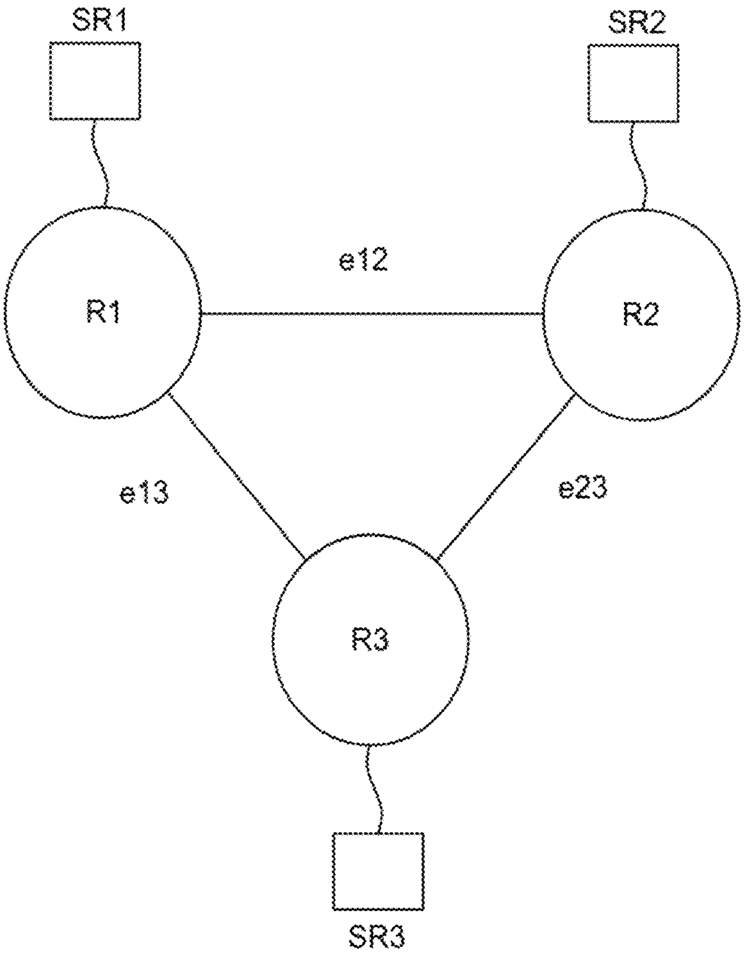
Figure 2H:
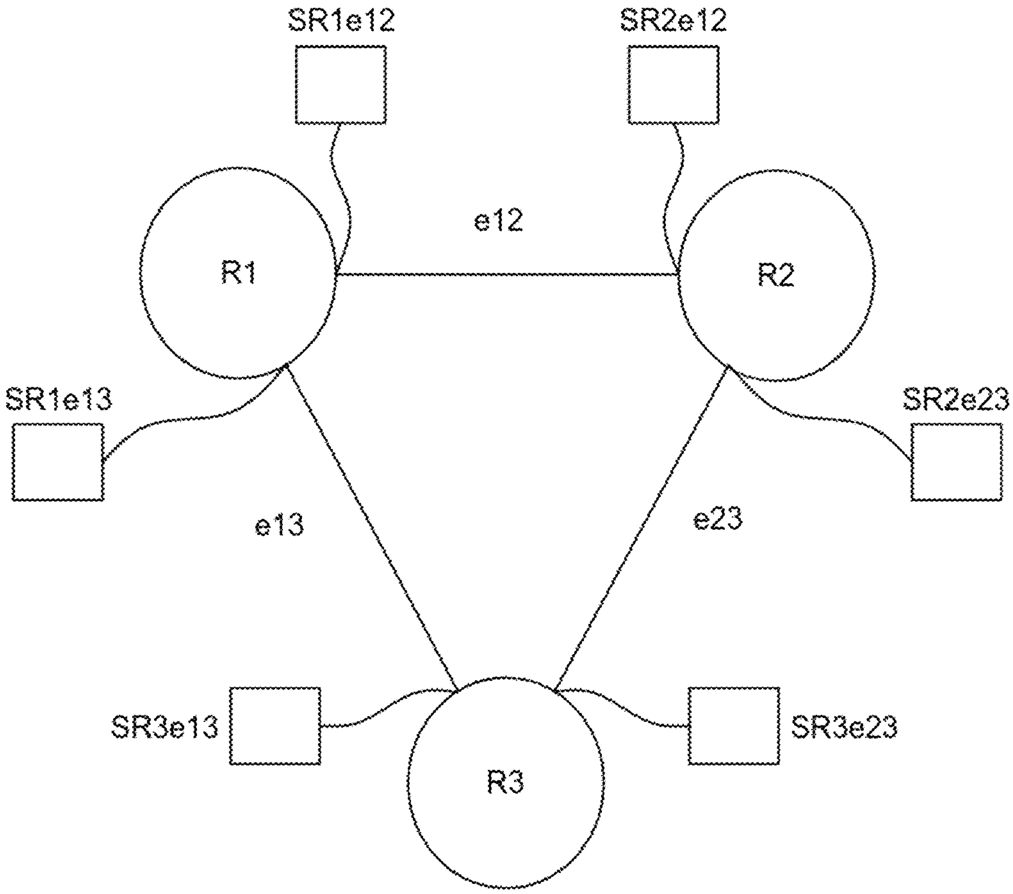

FIG. 2G shows the context for each node only or device. An example would be CPU temperature or Host Memory. FIG. 2H shows context on a per neighbor basis. As can be seen each square box SR1e12, for example represents the feature vector for data relevant to the interaction between R1 and R2, and depending on the layer. For example if we are on the BGP layer, this would represent the BGP Peering session information between R1 and R2 as BGP peers. However, if this was layer 3, Then this context would represent the IP network data relevant to IP traffic between R1 and R3 such as latency between R1 and R2 on edge e12 or packet loss etc.

Together FIG. 2G-2H show the graph neural networks best represent the structural relationships between nodes on a per layer basis. we see that each node has a feature vector contexts, that are used to increase accuracy for anomaly detection, alarm correlation and root cause on per node only basis as shown above. In the next FIG. we extend the notion of context to 2 more types. There are 3 types of contexts: node only as shown above, that represent features about the node or device itself, such as CPU temperature, the second context type is per neighbor, each node has an interface that connects to neighbor via an edge. all state data relevant for the interactions on that edge to the neighbor is stored and processed in that context, the third type of context is global, where all interactions globally between nodes and edges is considered for determining anomalies, alarm correlations and root causes.

Figure 2I:
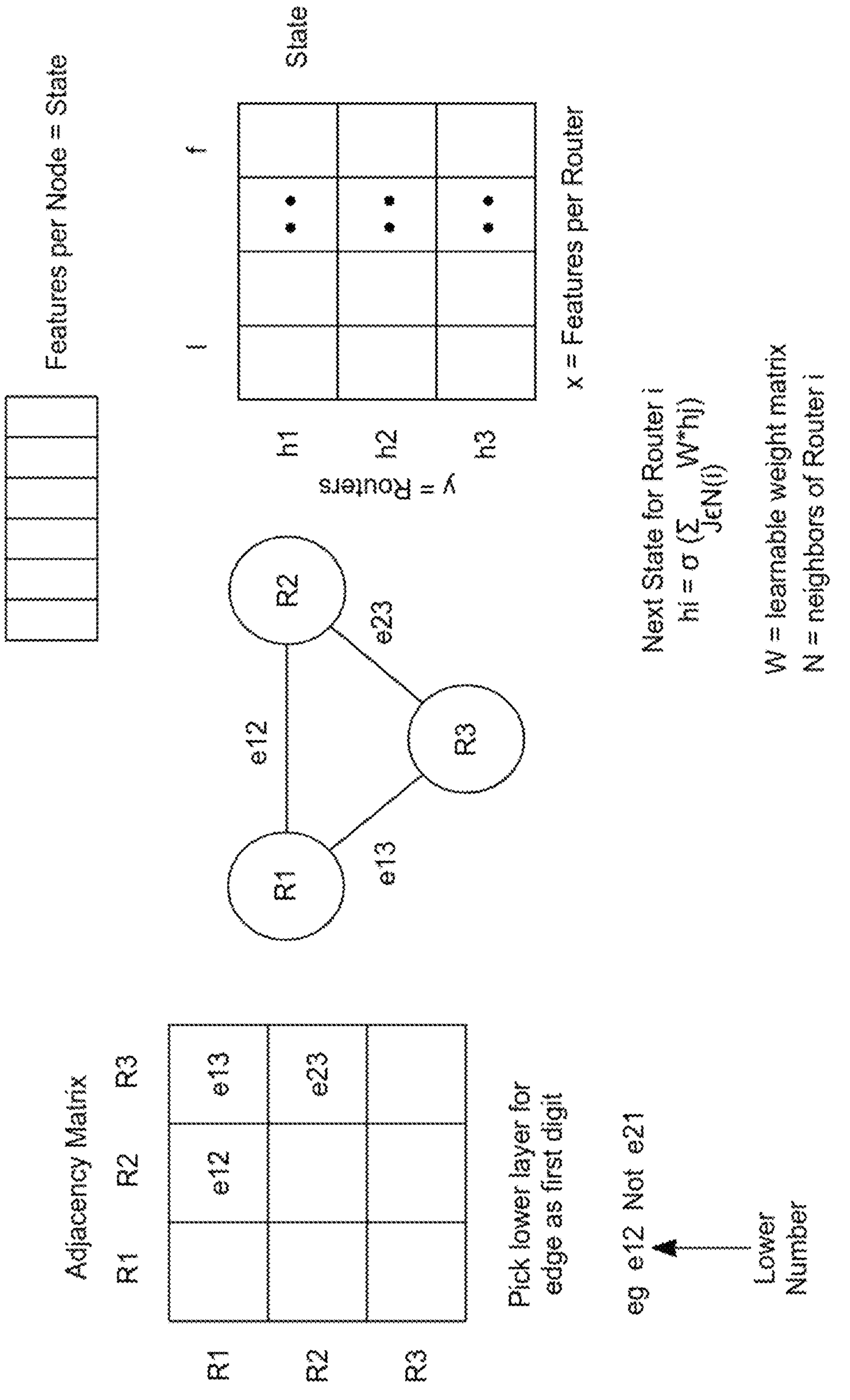

FIG. 2I shows the attention coefficient for determining most important neighbor features or state on per network layer, per node, and per neighbor adjacency basis. attention coefficients are computed based on context, depending on the network layer, node and its neighbors. FIG. 2I further shows how each layer is mapped to a Graph Neural Network. An Adjacency matrix that represents the per layer node to node connectivity which is the edges. For example R1 and R2 is connected by edge e12. Since this is bidirectional the top half of the matrix is used. A unidirectional graph can represent traffic from R2 to R1 as edge e21. In FIG. 2I on top right an example feature vector for a Router assuming Layer 3, since nodes are Layer 3 are essentially Routers. If another layer for example BGP, then this node would be a BGP Peer. In FIG. 2I, the list of neighbor feature vectors that Router 1 has seen via message passing. Router R1 will get the relevant context feature vectors from its direct neighbors R2 and R3 in the first time slot which the system applies the Anomaly Detection, Alarm Correlation and Root Cause functions based on training data. In one embodiment, there are 3 separate Deep Neural Networks for each context that is trained using Supervised, Semi Supervised or Unsupervised techniques detailed in other patents of generating labelled data to train the models. As can be seen this is a common formulation of a Neural Network where hi is the state of Node i or Router i, in our example i is 1 at Router 1, is the sigma function that drives the values in the brackets between 0 and 1, W is the learnable Weights matrix from the Neural network at that node at that layer at that context that is learned from training labelled data. "h" is the feature vector of the neigbhors j, belonging to node i, in this case since at Router 1, its neighbors j will take on values 2 and 3 representing Routers 2 and 3. This DNN will be a neural network that will capture focused data relevant to the context of the neighbor or node at that layer. This structure improves accuracy significantly as quality context focused data provides several benefits such as fast inference and increased accuracy as the noise from other contexts are reduced significantly.

Figure 2J:
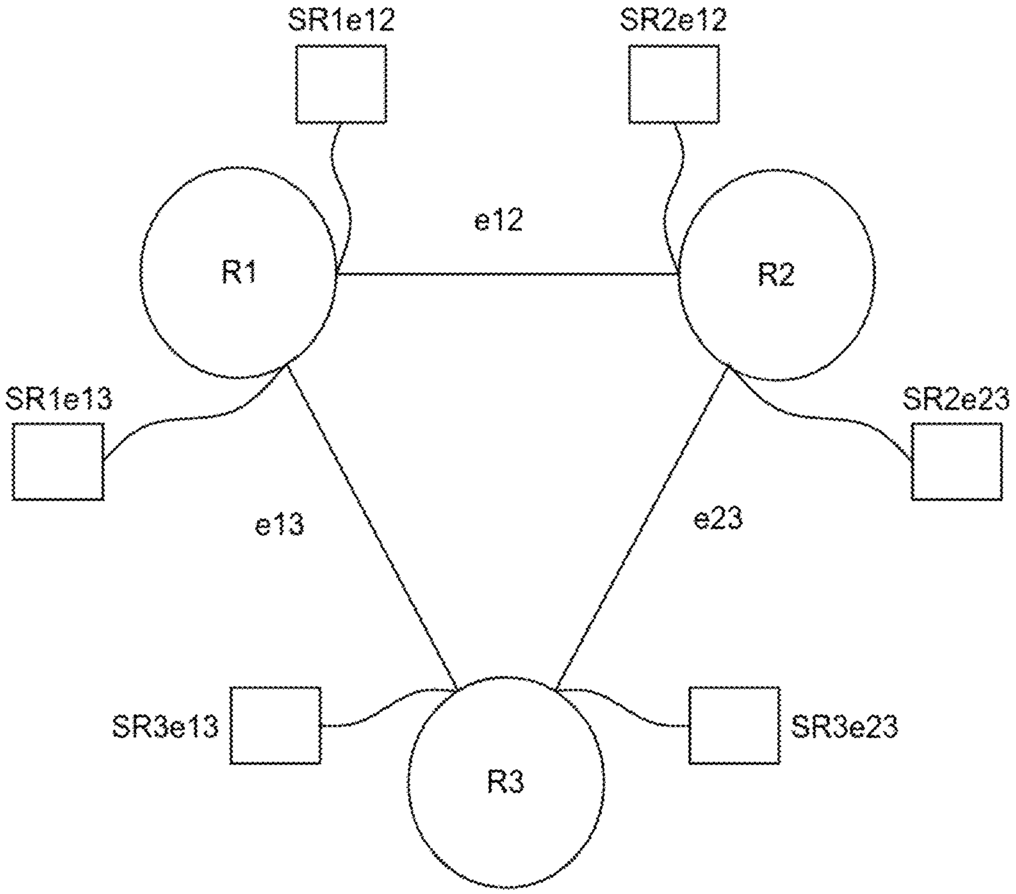

FIG. 2J shows the attention coefficient for determining most important neighbor features or state on per network layer, per node, and per neighbor adjacency basis. attention coefficients are computed based on context, depending on the network layer, node and its neighbors. FIG. 2J describes in detail on how we further increase accuracy using the Attention Mechanism for Graph neural networks also called Graph Attention Networks. Each edge for each layer is specific context has an an attention coefficient that captures the importance of information on a per layer, per node per context or neighbor basis. The edge eij, represents the edge between Router i and Router j assuming we are at layer 3 network layer. The attention coefficient will be multiplied by Weight matrix described in FIG. 3 above that captures information based on context relevant to the layer, node, neighbors, but now we are adding the notion of importance. The example lower left shows that if Router 1 receives and alarm from neighbor Router 3 then since both nodes received alarms, the information will be highest importance. If other neighbor or Router 1 which is Router 2 has no alarm, then the importance of other data will most likely be noise.

Any more data From Router 3 will provide important clues about the common alarm between Router R1 and R3 hence this attention coefficient will increase the accuracy even more.

Figure 2K:
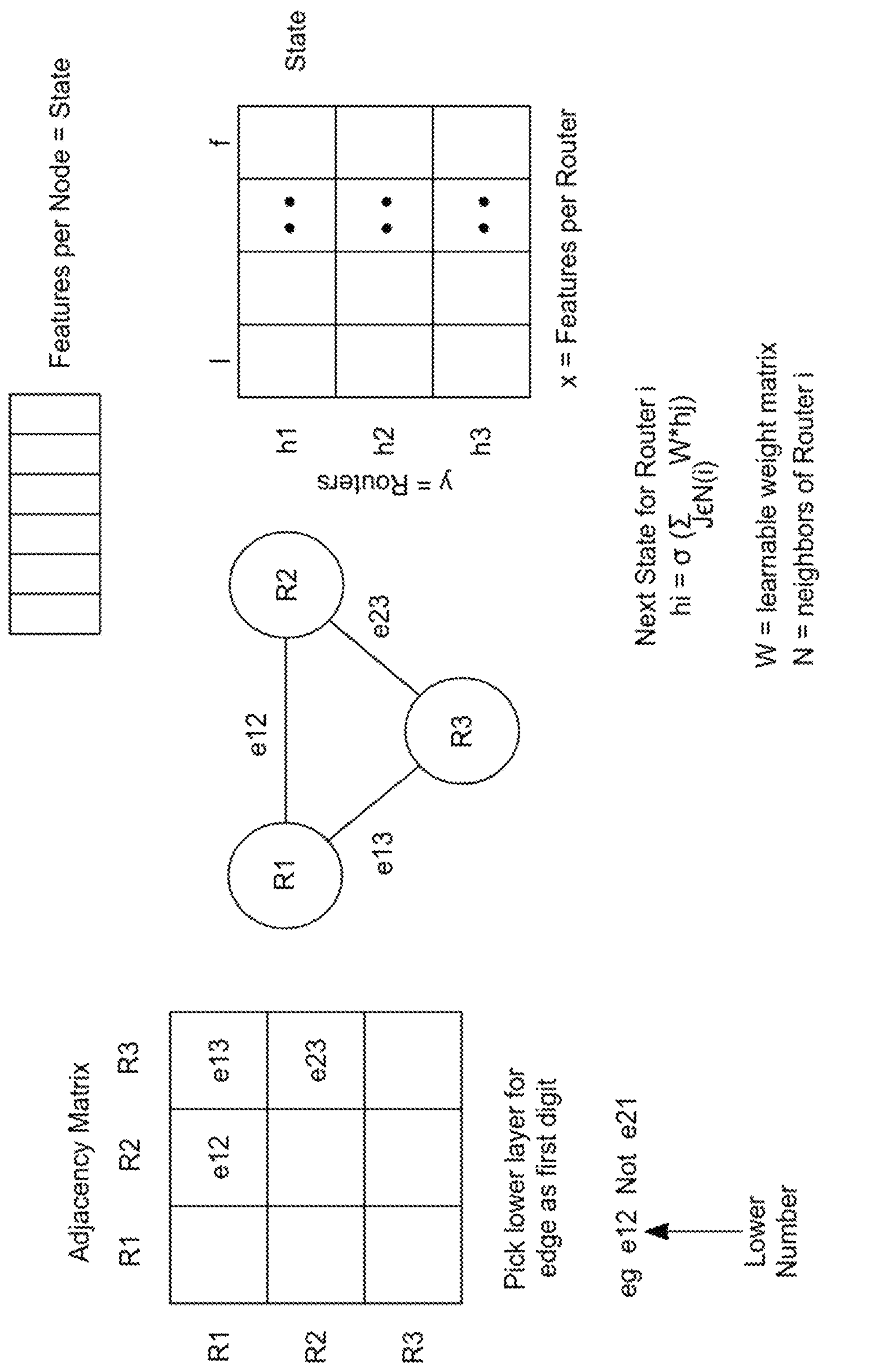

FIG. 2K shows the determination of attention coefficient for finding most important neighbor features or state on per network layer, per node, and per neighbor adjacency basis. The attention coefficient is computed using training data. The neighbor weights for Router R1 and R2 are used to train a model and compute the importance attention using various known existing approaches based on the attention mechanism. Finally the this is then added to the overall model to train and inference for anomaly detection, root cause and correlation based on training each separately based on context described earlier providing the most relevant information for the task at hand, increasing accuracy and speed of inference.

Figure 3A:
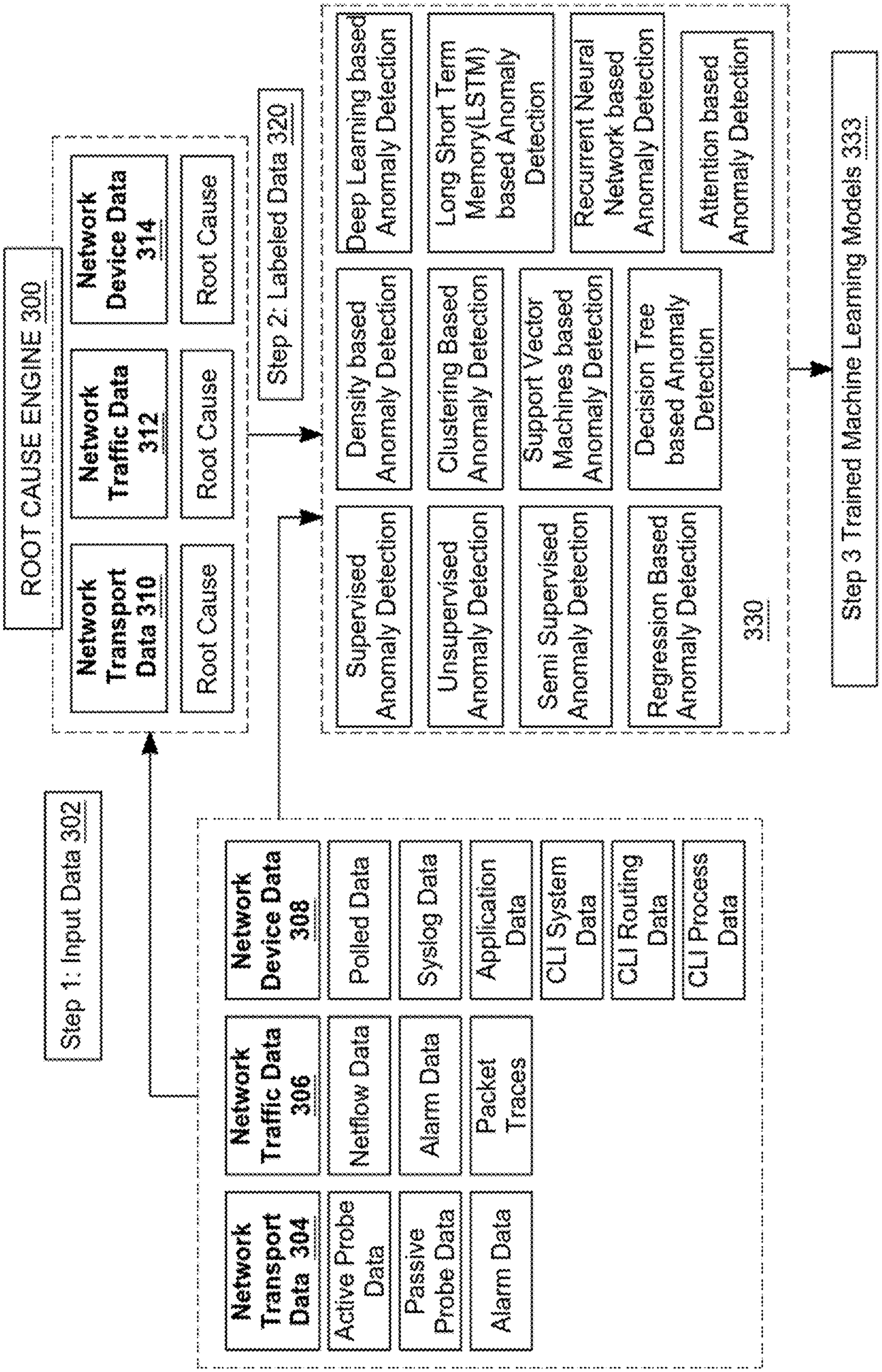
FIG. 3A shows an exemplary diagram depicting a process for training machine learning models for anomaly detection and root cause analysis in network environments, with various data inputs and anomaly detection techniques.
Figure 3B:
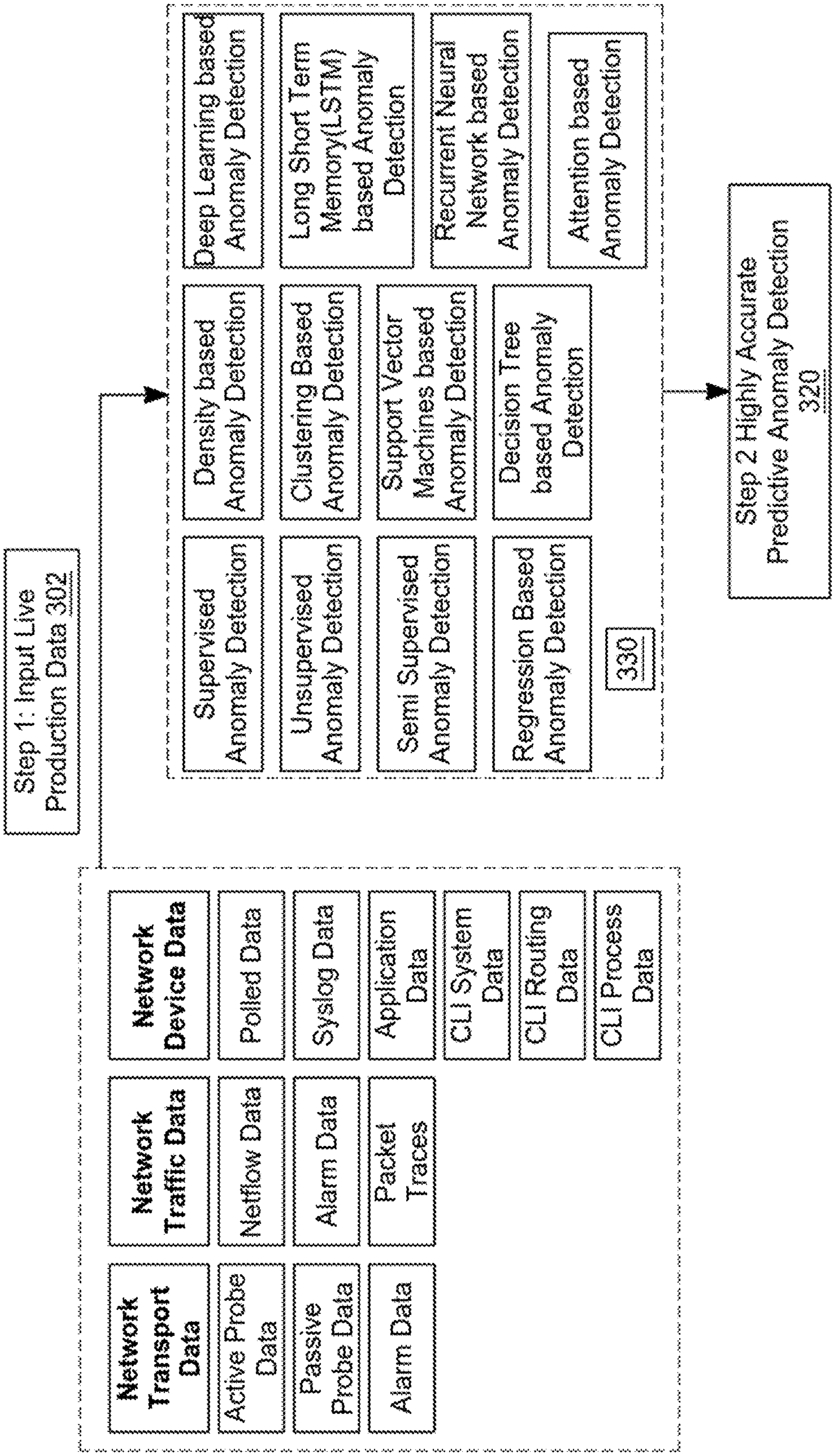
FIG. 3B shows an exemplary diagram detailing a process for anomaly detection in network environments, involving various types of input data and a mixture of trained AI models.

FIG. 3A shows diagram depicting a process for training machine learning models for anomaly detection and root cause analysis in network environments, with various data inputs and anomaly detection techniques, while FIG. 3B shows diagram detailing anomaly detection/inference in network environments, involving various types of input data and a mixture of trained AI models. Together the system of FIGS. 3A-3B uses a mixture of different ML models and enables detecting and predicting anomalies for systems that provide a service based on measurement data of the system and all associated dependent components. Measurement data includes asynchronous events, directly from the component or indirectly computed as well as synchronous events that have been obtained either directly or indirectly computed for any or all dependent components of the system. The novel aspect of this invention is in the method and procedures of the computation of highly accurate anomalies that will materially impact the service that the system is delivering, making it of very high value to the operator to be warned of important anomalies that have been correlated, deduplicated, de noised and are highly accurate. The key to the innovation is that the anomalies are based on context and have been known in past to be early warning indicators of root causes of system services that are customer impacting outages or performance degradations.

The system identifies root causes first with a root cause engine. Then, it works backward to identify the most influential signals for predicting failures or performance degradation associated with those root causes. This approach leads to more accurate, efficient, and actionable anomaly detection results. The Anomaly Detection Systems empower novice engineers to predict network issues with high accuracy. The system is applicable across various domains, including manufacturing, medical, IoT, computer networks (including cloud and 5G), and Internet of Things (IoT) networks. The system thus enhances network reliability and performance by revolutionizing anomaly detection methods within network operations.

The root cause engine as shown in FIG. 3A/3B determines the root causes of network faults or performance degradations using all available types of network data, transport, traffic, device which can be provided by the data sources shown in the left side of FIG. 3A which also shows the categories and examples of how and where this data originates:

a. Network Transport Data can originate from instrumentation that gauges the network links which can be provided by active and passive probes, network interface measurements from network devices, alam data showing links are down or impaired.

b. Network Traffic Data can originate from instrumentation that guages or measures various characteristics related to the network traffic such as paths provided by network which is actually measured and provided by routers, alarm data showing surges in traffic such as exceeding 95% of a link, packet traces that are provided by sniffers of packet filters such as wireshark or tcpdump that are invaluable to identify flaws in protocol interactions.

c. Network Device Data predominately originates from the network devices such as routers and switches that abundant telemetry about the device health, cpu, memory, routing processes, network interfaces KPIs such as inoctets/sec, alarms, logs, traps etc.

FIG. 3A shows in detail Phase 1—Training of a mixture of anomaly detection models. There are 3 steps in Phase1 to train the mixture of Anomaly Detection Models:

1) The root cause engine will be able to determine when there is a fault or bunch or related faults, it will find the root cause of all these faults and to determine the root cause and associated data that are the best early warning indicators of this fault. This information then is fed to the mixture of anomaly detection models to train for Step 2.

2) The Root Cause will provide labeled data to each Anomaly Detection Algorithm to determine the best model based on a combination of factors such as accuracy, time to compute, cost etc. Each model shown for anomaly detection has different levels of accuracy, performance [how long to compute] depending on the data and the best model will be determined based on the criteria set by the operator, such as time and cost to compute a result and accuracy. For example one machine learning model may require 100 Billion parameters and 100×100 GB VRAM GPUS at a cost of $1 million, but another model may require 7 Billion parameters that can run on 12 GB Nvidia GPU at a cost of $5000 but at a slightly lower accuracy but acceptable. As shown in FIG. 3B, the output will be trained models per root cause and a list of the best associated predictor independent variables or input data with the result being shown as Step 3 Trained Machine Learned Anomaly Detection Models.

3) Step 3 will take the best machine learning models set and use that against new incoming data to detect anomalies however what is novel is the fact that these models are specifically trained with a known root cause and if the right input data is detected to match the classifier and determine a actionable anomaly and the operator can know in advance what problem it will cause in the network, and the corrective action. Hence operators can proactive make a corrective action and in effect prevent a network outage.

FIG. 3A shows a three-step process for training machine learning models for anomaly detection and root cause analysis in network environments, with various data inputs and anomaly detection techniques. First the NIE receives input datum, which includes network data collected from various sources. The input datum may be provided in real-time or periodically, and can include any relevant network data, such as device configurations, performance metrics, log files, fault reports, event streams, and other relevant data sources. The NIE may also connect to various network devices and systems to gather network data directly. Once the input datum is received, the NIE extracts network data from the input datum. The extraction process may involve parsing, filtering, aggregating, and/or organizing the network data into a format that is suitable for further analysis. For example, the network data may be organized by network element, time, type of data, or other relevant criteria. The extracted network data is then stored in a data repository for later use in the reconstruction process. Network Transport Data can include various types of network data, such as packet capture data, NetFlow data, sFlow data, Simple Network Management Protocol (SNMP) data, etc. This data can be obtained from various network devices, such as routers, switches, firewalls, servers, etc., in real-time or near real-time. In one embodiment, the Network Transport Data is collected and stored in a Network Data Repository, which can be a database or other storage device. Network traffic data refers to any data related to the communication and transfer of information between network elements. This can include, but is not limited to, packets, messages, frames, payloads, protocols, ports, bandwidth, transmission rates, and any other network traffic characteristics. This data can be collected through various methods such as sniffing, logging, polling, or other techniques. Network Device Data, Network Topology Data, and Network Traffic Data are used to create the NSE. The NSE is responsible for tracking the real-time state of the network, including the status of all network elements, their interconnections, and the overall traffic flow. It receives data from the Network Device Data, Network Topology Data, and Network Traffic Data, and updates its internal state accordingly. A network situation refers to the overall state of the network at a specific point in time. This can include the status of network elements, network traffic patterns, and any other relevant information. The network situation can be analyzed using various techniques, such as statistical analysis, machine learning, or other methods.

Next the NIE analyzes the network data to detect a root cause event. A root cause event is an event that has a significant impact on the network and is the source of subsequent events. This event can be detected through various means, such as monitoring network traffic, system logs, user reports, or other techniques. The root cause event can also be manually identified by a user. The root cause event is the event that triggers the sequence of correlated events in the network environment. It may be identified based on predefined rules, statistical anomalies, or other methods. The Root Cause Detector analyzes the Network Transport Data to identify a root cause event. This event can be any event that has a significant impact on the network and causes a chain reaction of correlated events. For example, a root cause event can be a router failure, a link failure, a configuration change, etc. The Root Cause Detector can use various techniques, such as machine learning algorithms, rule-based engines, etc., to detect the root cause event. In some embodiments, the root cause event can be identified based on a predefined set of rules or thresholds. For example, if the performance metrics exceed a certain threshold, it may trigger an alert or flag as a potential root cause event. In other embodiments, the root cause event can be detected using machine learning or artificial intelligence algorithms that can analyze the network data and identify patterns or anomalies that may indicate a root cause event.

The NIE manages the process of reconstructing the sequence of correlated events caused by the root cause event. It can communicate with the Network Data Repository to retrieve the necessary data, such as network topology, network element configurations, and real-time network states. It can also communicate with the Root Cause Detector to obtain information about the root cause event. When a root cause event is detected, the NIE utilizes artificial intelligence algorithms to analyze the network situation at various timings and infer the root cause, impacted network elements, and the sequence of state changes. The NIE uses data from the NSE, as well as other data sources such as historical network data, to make these inferences. The resulting sequences of events can be presented visually in a user-friendly format, such as a timeline or a network map, and can also be used to suggest appropriate remediation actions. The NIE also maintains a knowledge base that contains information about past network issues and their resolutions. This knowledge base is continuously updated and can be used to improve the accuracy of the inference process. Additionally, the NIE can also incorporate machine learning techniques to further enhance its ability to diagnose and reconstruct network events.

The NIE is responsible for managing the data collection and reconstruction process. It can receive network data from the Network Data Collection Module and process the data to identify relevant events and their correlations. The NIE can utilize various artificial intelligence algorithms, such as machine learning, deep learning, and natural language processing, to analyze the data and infer the root cause event, the impacted network elements, and the sequence of state changes. Additionally, the NIE can maintain a knowledge base containing historical network data and past reconstruction results to improve the accuracy and efficiency of the reconstruction process. Furthermore, the NIE can provide an interface for users to input additional information, such as manual troubleshooting steps, to aid in the reconstruction process.

The trained machine learning model 333 uses the network data, the timing data, and the identified root cause event to reconstruct a sequence of correlated events. This process involves analyzing the state changes of various network elements at different timings to identify correlations and causal relationships between the events. In some embodiments, the machine learning model may use a variety of techniques, such as decision trees, Bayesian networks, or neural networks, to identify the most likely sequence of events leading up to the root cause impact.

In one example, the machine learning model may start by analyzing the state changes of network elements closest to the root cause event and then expanding its analysis to include other impacted network elements. It may also take into account the timing and duration of each event to determine the sequence of events that are most likely to have occurred. The result of this process is a reconstructed sequence of events that led to the root cause impact.

The reconstructed sequence of events is presented to the user in a visual format. This may include a timeline or flowchart showing the sequence of events, their durations, and the affected network elements. In some embodiments, the presentation may also include suggested remediation actions based on the identified root cause and impacted network elements. The user can then use this information to understand the network situation, make informed decisions, and take appropriate actions to resolve the issue. In addition to presenting the results to the user, the method may also update the NSE with the reconstructed sequence of events.

FIG. 3B shows in more details Phase 2's inference using the best anomaly detection models with the associated root cause, explanation and corrective action. Phase 2 is composed of 2 steps: Step 1—the processing of real time production telemetry data on the mixture of anomaly detection models; and step 2—determination of the anomalies that will result in a fault of performance degradation based on the pre trained models from Phase 1. FIG. 3A shows the production in line processing of all telemetry data shown on the left and how that data is processed by the mixture of anomaly detection models to detect different root causes along with the required corrective action. From the previous Phase 1, we make use of the pretrained per root cause best anomaly detection algorithm and now once we detect the right anomalies, we can immediately tell the operator what network issue will be in future and what is the required corrective action.

FIG. 3B shows flowchart detailing a two-step process for anomaly detection in network environments, involving various types of input data and a mixture of trained AI models.

Step 1: extract network data—The NIE receives input datum, which includes network data collected from various sources. The input datum may be provided in real-time or periodically, and can include any relevant network data, such as device configurations, performance metrics, log files, fault reports, event streams, and other relevant data sources. The NIE may also connect to various network devices and systems to gather network data directly. Once the input datum is received, the NIE extracts network data from the input datum. The extraction process may involve parsing, filtering, aggregating, and/or organizing the network data into a format that is suitable for further analysis. For example, the network data may be organized by network element, time, type of data, or other relevant criteria. The extracted network data is then stored in a data repository for later use in the reconstruction process.

Step 2: detect root cause event—The root cause event is detected based on predetermined rules, statistical analysis, or machine learning techniques. The NIE manages the data collection and reconstruction process. It receives network data from various sources, such as network monitoring tools, event logs, and external databases, and integrates them into a central repository for further analysis. The engine also uses artificial intelligence algorithms to analyze the data, identify patterns and correlations, and infer the sequence of events that led to the root cause impact. This can involve analyzing network traffic, device states, event logs, and other relevant data. The NSE maintains a real-time representation of the network state, which is continuously updated as events occur. It tracks the state changes of network elements, such as devices, links, and applications, and captures the dependencies between them. This information is used to identify the impacted network elements and the sequence of state changes that occurred due to the root cause impact. The resulting sequences are presented in a visual format, such as a timeline or network topology, to help network operators understand the impact of the root cause and the resulting state changes. The sequences can also be used to suggest appropriate remediation actions, such as re-routing traffic or restarting affected devices, to mitigate the impact of the root cause.

FIGS. 3A-4B show a parallel computation of the mixture of anomaly detection models per root cause to detect if any anomalies are detected, based on the pretrained model we will also know the root cause of the problem that is about to happen and how to fix it. The method and system of FIGS. 3A-3B differ from current approaches in accurately detecting Anomalies to predict outages and performance degradations as well as the corrective action, giving network operations a better way to manage their networks using AI automation to improve customer experience and increase operational efficiency.

Once the root cause of complex network issues is identified, the system moves to provide necessary remediation actions. In the case of multiple interdependent events or cascading effects, where the impact on the network can be extensive, the system will opt to initiate the appropriate measures to mitigate the negative effects on network performance. A proposed set of remedial actions gets simulated in the digital twin simulation network first, which aids in minimizing the impact on the live production network.

Furthermore, the AI engine does not just focus on the resolution of immediate issues but also contributes to the prevention of future network issues by learning from the past. It continually evolves based on the network events it has experienced and remedied, giving it the ability to predict potential future events and mitigate them before they cause any impact, thus further enhancing network reliability and performance over time. By utilizing artificial intelligence algorithms and employing an iterative process, the system can diagnose and resolve network issues more efficiently, reducing network downtime, and aiding in the maintenance of optimal network performance.

Figure 4A:
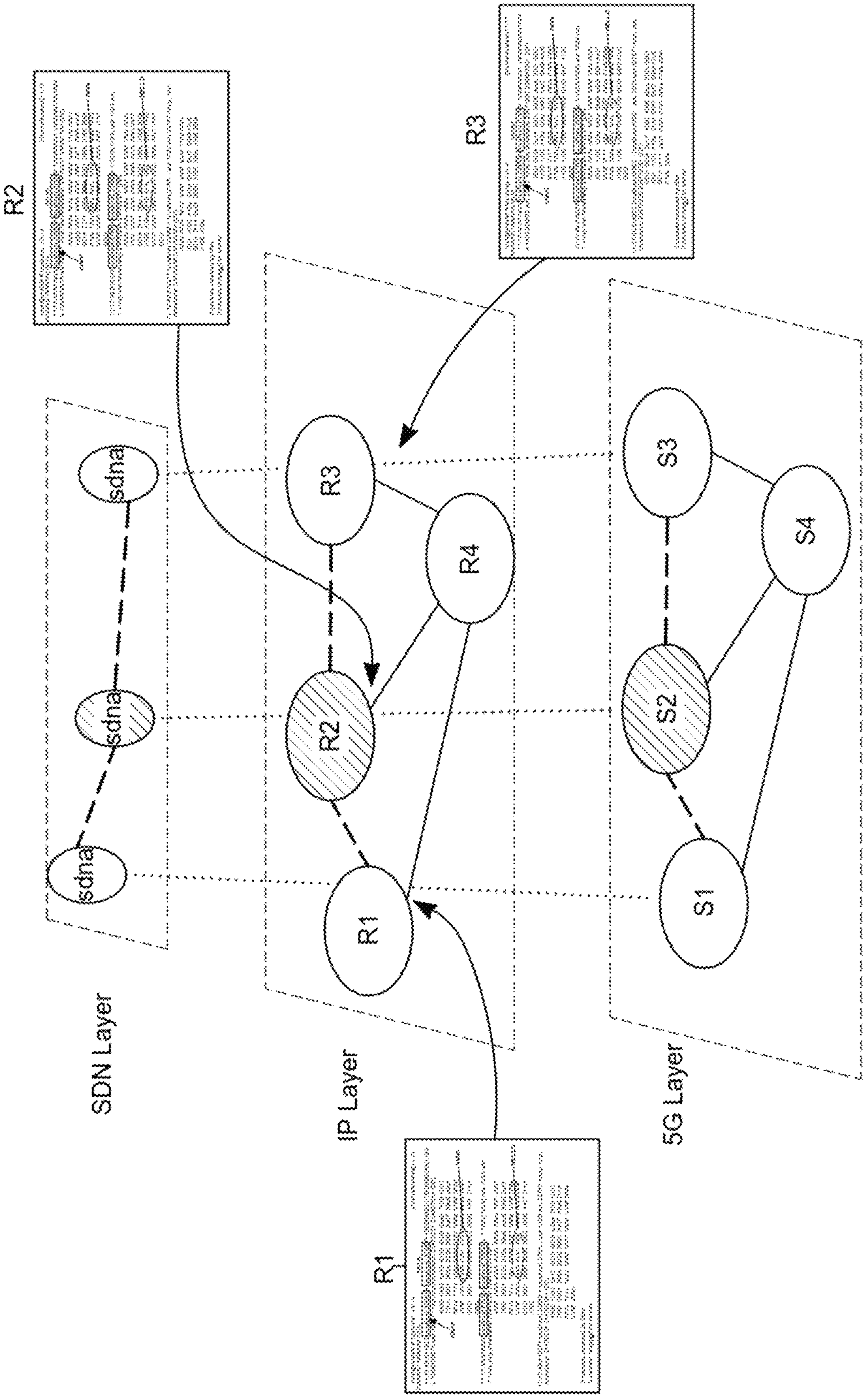
FIG. 4A shows an exemplary schematic diagram showing a multi-layered network with labeled nodes and connections.

FIG. 4A shows schematic diagram showing a multi-layered network with labeled nodes and connections, overlaying a dashed box indicating a manual process for network event analysis. The system takes care of the time consuming process to instrument packet traces and exports to gather data from remote devices, collate, correlate, and search for anomalies and errors and then to diagnose and determine problem resolution and corrective action. The system provides automated instrumentation, collection, organization, processing of packet trace data from multiple different sources in different modes such as batch or real time streaming and using artificial intelligence to analyze, detect anomalies, diagnose issues, determine root cause and automate the gathering more data based on the outcome of the analysis to iterate several times gaining more in depth understanding of the issue, then using artificial intelligence to issue commands to the network to take corrective action. If the action requires making configuration changes to the production network which is often high risk, then this risk is mitigated by use of a replica digital twin of the production network using a simulation environment to test the configuration change to ensure no adverse impact. The digital twin has the exact same topology, configuration, software versions as the production network which is easily achieved using existing COTS and open source software solutions such as GNS3. The system automates the collection and analysis of packet trace data from multiple sources to find anomalies, diagnosis, root causes, gather more information and iterate until an in depth understanding is achieved to resolve the issues and take corrective action on the production and reduce risk by first testing high risk configurations changes on a digital twin to ensure no adverse effects that may potentially impact the production network. The system enables a company to resolve complex network layer problems that require packet trace analysis from multiple sources to gain visibility and insights on what is going on in the network. This has been a manual process, with high level of expertise and time consuming and was often overlooked which made troubleshooting packet layer issues very hard to diagnose due to difficulty in instrumenting and collecting data from different sources, coordinating start stop times of packet capture across multiple devices and the manual inspection of packet traces. This is done by first defining a framework on how to automate several processes to collect, collate, correlate, diagnose network issues, detect anomalies, find root causes, collect more network data based on each iterations of analysis and then finally reconfiguring the network with low risk by testing high risk configuration changes on a digital twin prior to deploying on production network. The system allows network operations team to significantly improve productivity by using artificial intelligence at several steps incrementally learning more about diagnosing issues in the network and gathering more information as required to detect anomalies, root causes and corrective action and using digital twin to validate high risk configuration changes prior to deploying on production network.

Topology data includes information about the physical and logical layout of the network, such as nodes, links, and their relationships. Routing data includes information about the paths and protocols used to route data through the network. Traffic data includes information about the volume, type, and source/destination of network traffic. Performance metrics data includes information about the quality of service, latency, and other performance indicators. All of this data is collected and stored in a central repository, which can be accessed by the NIE for analysis. This allows for a comprehensive view of the network at any given point in time, as well as the ability to analyze changes over time. The time-series storage also enables the method to track and record the sequence of events leading up to a root cause impact, as well as the subsequent state changes in the network. This allows for a more accurate and detailed reconstruction of the event and its impacts on the network.

Figure 4B:
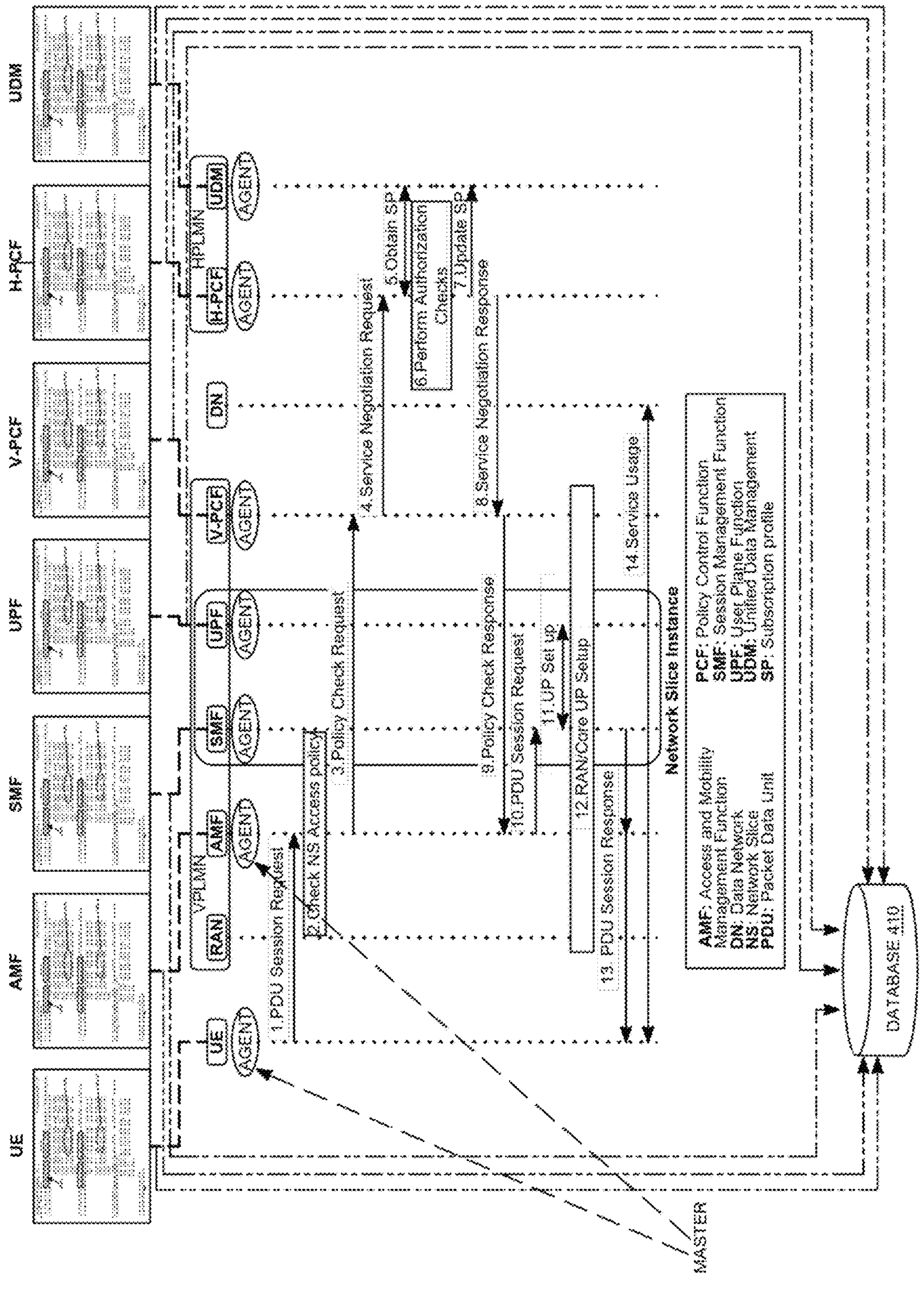
FIG. 4B shows an exemplary flowchart of a network environment showing data flow between user equipment, network functions, and a master database for collecting packet trace data.

Next, the framework to automatically collect data is detailed in FIG. 4B which shows a diagram of a network environment showing data flow between user equipment, network functions, and a master database, annotated with interactions for collecting packet trace data. FIG. 4B shows how the master controls all agents installed on remote nodes that controls packet trace activation for analysis. The master can start, stop, pause, packet trace data of interest with filters and coordinate exact windows to capture packets of interest to reduce over captures and under captures at all locations to provide aligned data. This can be executed in a on demand batch mode, or continuous ongoing streaming mode.

The system of FIG. 4B provides a comprehensive and scalable method for automatically reconstructing sequences of correlated events in a network environment. It utilizes artificial intelligence algorithms to diagnose root causes and impacts, tracks real-time network states, and presents the results in an intuitive format. The database 410 can be used for automatically reconstructing sequences of correlated events (arising from a root cause impact in a network environment, and in one embodiment, the method starts by collecting and storing network data from various sources, such as network devices, logs, and monitoring tools. This data is continuously updated and forms the basis for the reconstruction process. The master can instruct agents to perform detecting a root cause event, which can be done through manual input or automatically using artificial intelligence techniques. The root cause event is the initial event that triggers a chain of correlated events in the network. Once the root cause event is identified, the system analyzes the network situation at various timings. This involves examining the network data collected before and after the root cause event, as well as monitoring the network in real-time. The analysis is performed using artificial intelligence algorithms, such as machine learning and pattern recognition, to identify patterns and correlations among events. The method then uses the results of the analysis to diagnose the root cause and identify impacted network elements. This is done by tracing the sequence of correlated events back to the root cause event and identifying the network elements that were affected by each event.

In addition to diagnosing the root cause and identifying impacted network elements, the method also determines the sequence of state changes that occurred in the network as a result of the correlated events. This involves tracking the changes in network states, such as performance metrics, configuration settings, and traffic flows, and correlating them with the events that triggered those changes.

The process further includes collecting and storing network data, the method involves continuously collecting and storing various types of network data, including topology, routing, traffic, and performance metrics. This data is stored in a time-series manner, meaning that the data is recorded at regular intervals, allowing for analysis of changes over time.

Figure 4C:
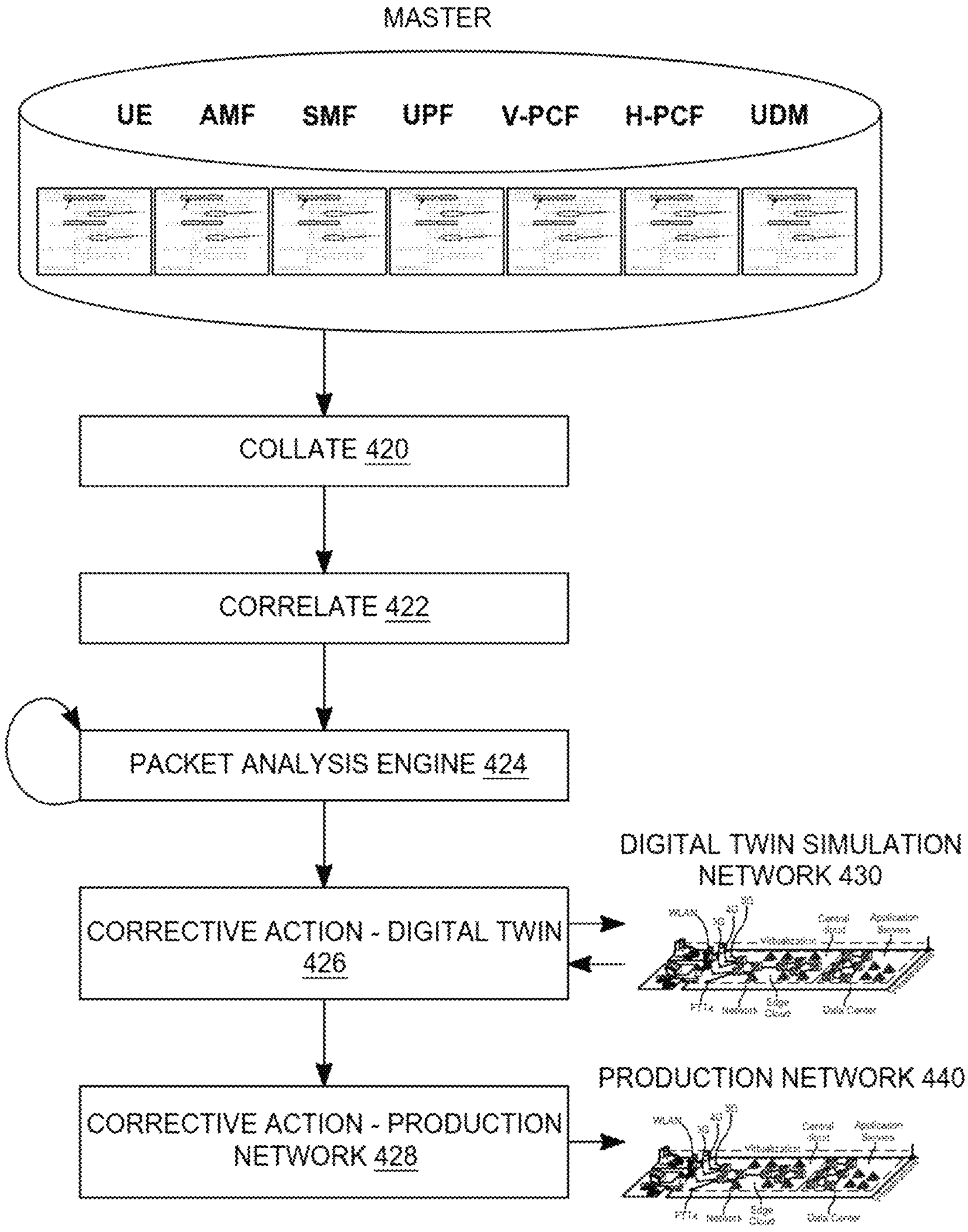
FIG. 4C shows an exemplary diagram illustrating a high-level workflow for packet analysis and corrective actions in network environments.

FIG. 4C shows diagram illustrating a high-level workflow for packet analysis and corrective actions in network environments, involving steps like collation, correlation, and deployment in digital twin and production networks. The Master Server takes in the packet data either in batch or real time streaming using windows of a certain configurable window size, that collates all the packets from the different source devices which can be cloud vms, kubernetes cluster at load balancer, physical device such a phone, router, 4G node eg PGW, 5G node eg UPF etc. These packets are correlated to remove duplicates and then sent to the Packet Analysis Engine which will diagnose, gather more data if needed based on the diagnosis, identify anomaly, root cause iterate more based on the diagnosis, anomalies, root cause of the additional data of the previous iteration, then provide corrective action recommendations with commands to execute. If these commands require configuration, then they are verified first on the digital twin before executing on production network to reduce risk of adverse effects as result of the configurations changes. If these commands are only read only, then they can be applied on the production network.

Corrective action-digital twin also includes a network remediation engine that receives the identified sequence of events and determines the appropriate corrective action to be taken. The corrective action may involve changing network settings, rerouting traffic, or other measures to restore the network to its desired state. The corrective action may be automatically executed by the network remediation engine, or it may be presented to a network operator for manual execution.

Visualization-digital twin also includes a visualization engine that presents the reconstructed sequence of events in an intuitive and interactive manner. The visualization engine may generate graphical representations of the network topology, impacted network elements, and state changes over time. This allows network operators to easily understand the root cause and impact of the network issue and make informed decisions on the appropriate remediation actions. The visualization engine may also provide alerts or notifications to the network operator when new events are detected or when the corrective action has been completed.

The described one embodiment provides a method for automatically reconstructing sequences of correlated events in a network environment. By leveraging artificial intelligence techniques, this method can accurately diagnose the root cause, identify impacted network elements, and determine the sequence of state changes. The resulting information can be presented visually and used to efficiently address network issues and improve overall network operations.

Corrective action-production network is a set of actions taken to remedy the issues identified by the method. Corrective actions can include, for example, restarting network elements, reconfiguring network settings, or deploying new hardware. The corrective actions can be determined based on the identified root cause and impacted network elements. In some embodiments, the corrective actions can be automatically implemented by the method. In other embodiments, the method can suggest corrective actions to a network administrator for manual implementation.

Digital twin simulation network can be any software or hardware-based platform capable of simulating a digital replica of the network environment and its operations. In one embodiment, digital twin simulation network can include one or more virtual machines (VMs), each representing a different aspect of the network, such as a server, switch, router, or other network element. These VMs can communicate with each other and simulate network traffic and events, thus providing a virtual representation of the real network environment. The simulated network can be continuously updated based on the data collected from the real network, providing an accurate and dynamic digital twin.

The method can also include a Knowledge Base that stores historical data and solutions for known network issues. This knowledge base can be used by the NIE to improve its accuracy in diagnosing root causes and predicting network impacts.

Production network is an example of a network environment where the method can be applied. Production network includes various network elements, such as routers, switches, servers, and applications, which are interconnected and work together to provide services to end-users. In this embodiment, network data is collected from these network elements using various data collection methods, such as SNMP, NetFlow, and sFlow, and stored in a database or other suitable storage medium. The network data includes information about the state and performance of the network elements, such as CPU and memory usage, bandwidth utilization, error rates, and service availability.

At some point in time, a root cause event occurs in production network, causing disruptions or degradations in the network. This root cause event can be detected through various means, such as alarms, user reports, or system monitoring tools. Upon detecting the root cause event, the method begins to analyze the network situation at different timings before and after the event. This analysis involves examining the network data and identifying any changes or abnormalities that occurred during the time period. The method then uses artificial intelligence algorithms, such as machine learning and pattern recognition techniques, to diagnose the root cause of the event and identify any impacted network elements.

Figure 4D:
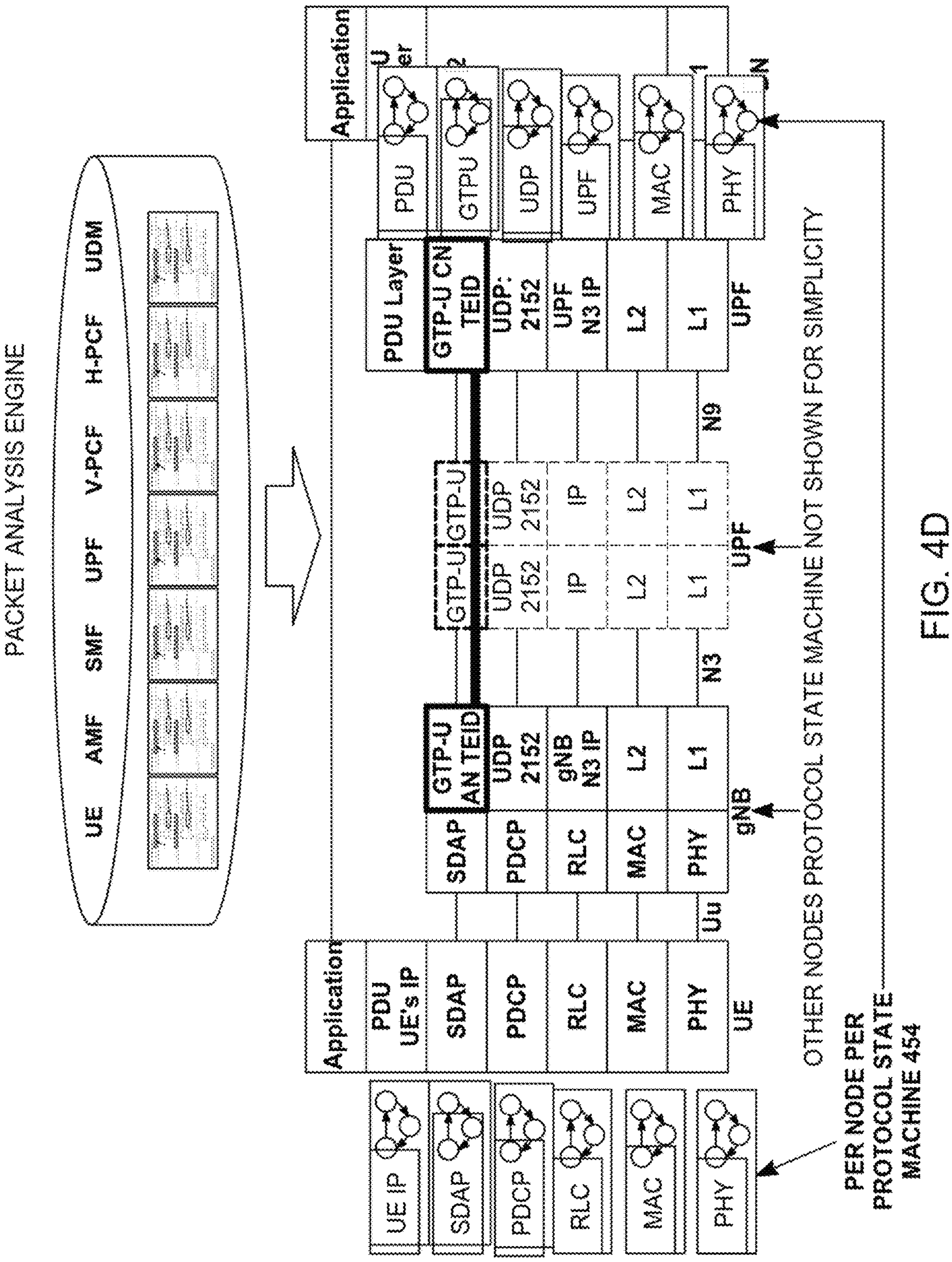
FIG. 4D shows an exemplary schematic diagram illustrating the concept of a per node per protocol state machine for packet analysis in network environments.
Figure 4E:
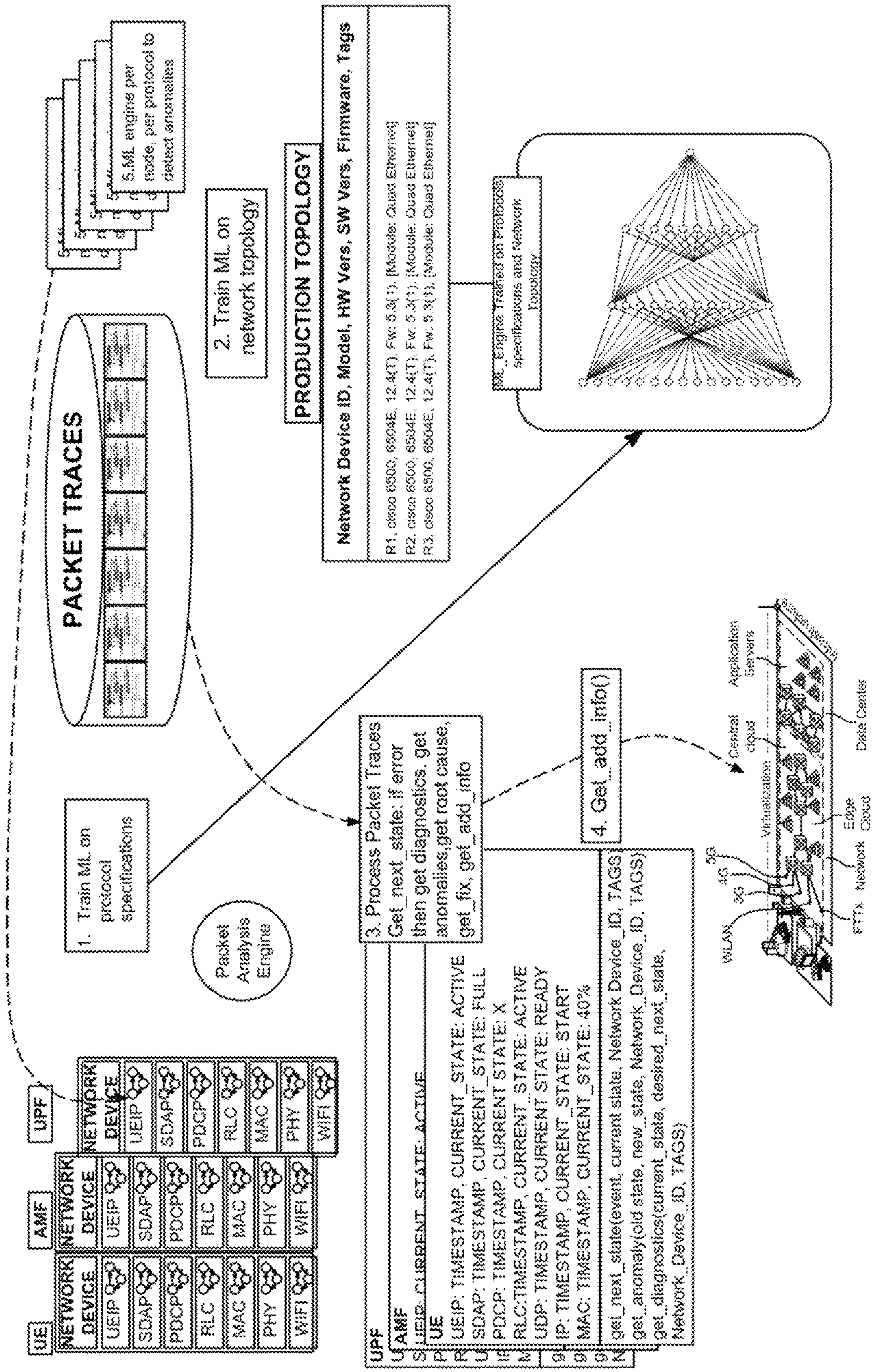
FIG. 4E shows an exemplary flowchart and diagram illustrating a method for automatic reconstruction of correlated event sequences in network environments using artificial intelligence.
Figure 4F:
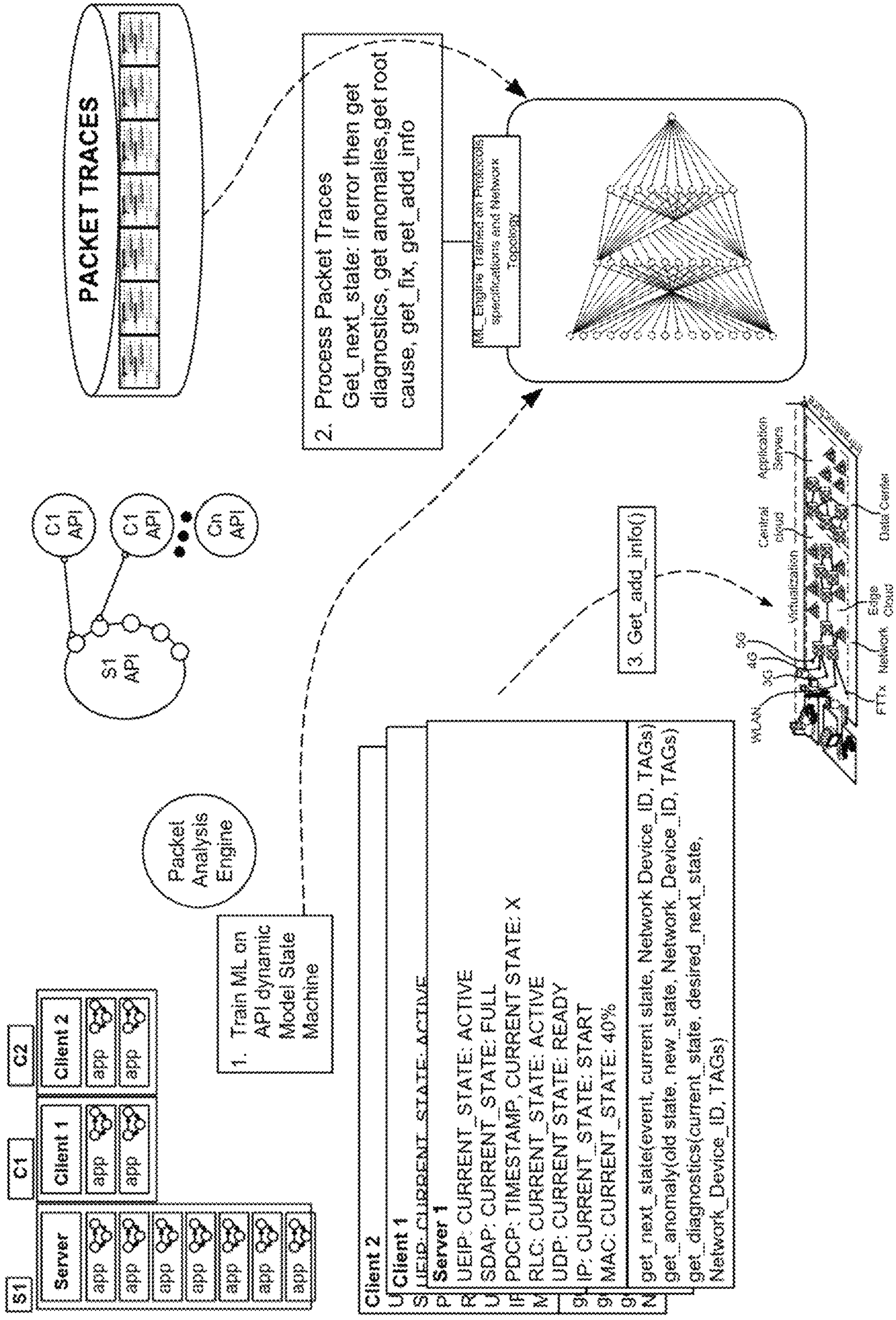
FIG. 4F shows an exemplary flowchart illustrating the steps for automatic reconstruction of correlated event sequences in network environments using a packet analysis engine and machine learning.

FIG. 4D shows a schematic diagram illustrating the concept of a per node per protocol state machine for packet analysis in network environments while FIG. 4E shows a flowchart and diagram illustrating a method for automatic reconstruction of correlated event sequences in network environments using artificial intelligence, including steps for machine learning training on protocol and network topology, processing packet traces, and issue resolution. FIG. 4F shows a flowchart illustrating the steps for automatic reconstruction of correlated event sequences in network environments using a packet analysis engine and machine learning.

FIG. 4D shows a more detail description of how the Packet Analysis Engine (PAE) processes raw packet traces. The first step requires the PAE to have data on each protocol specification and operation, in particular the dynamic model of the protocol. The packet analysis keeps a topology map that represents the structural relationships between the nodes and a Per Node Protocol state machine. This allows the PAE to understand expected transition states from packet to packet on a protocol basis and the correct relationships between two nodes. The system uses the following:

1.Topology graph—this is the graph model representing the structural relationships between nodes in the physical network and is also used by the digital twin and kept in sync. If the production physical network has any changes such as a new router and edges, this will be reflected immediately in the topology graph. This allows the packet analysis engine to understand and reason about which packets should be communicating amongst which nodes. For example the ue should only communicate to the amf at initial start, never directly with another nodes such as a hacker node.

2. Per protocol state diagram—this is the per protocol state machine which is based on the protocol specification as detailed in the 3GPP or RFC standards for example. This allows the Packet Analysis Engine (PAE) to understand the packet transactions between 2 peer nodes on a per protocol basis. By processing the packet traces, the PAE will know immediately if there is an anomaly or error if packet transactions do not comply with the expected state diagram transitions.

The packet traces are all transactions between a client and server endpoints and describe transactions on per protocol basis. Each packet will be containing a transaction at each protocol layer. FIG. 4D shows at the far left shows a UE-User Agent with protocols PHY, MAC, RLC, PDCP, SDAP and UE IP, the next adjacent node is AMF where the transaction occurs but only a subset of the layers PHY, MAC, RLC, PDCP and SDAP, must comply with the protocol specifications which is already understood by the PAE, hence the PAE by inspecting packets between Node UE and AMF will be able to understand if any of the protocol transactions are out of specification and raise and alert. Now the remote end point of the UE for UE IP will be many hops away at the far right UDM, so the PAE will also inspect packets between node UE and UDM and only focus on the protocol state machine compliance at the UE IP layer, FIG. 4E describes in further detail the data structures that the PAE maintains to analyze correct dynamic protocol behaviors as inferred from the packet traces between nodes on a per protocol layer basis. As noted earlier there are cases where protocols layers are spanning many intermediate hops. For example the UE at the UE IP transacts not with its directly physical adjacent neighbor node the AMF but many hops away the UDM as described previously. The following describes the packet processing and analysis:

Step 1. The first step is to train the ML Engine on the protocol specifications dynamic behavior model in general. This is described in further detail in another patent application by Deepak Kakadia. Once trained the ML Engine can infer what is the correct next state given the previous state, which is maintained by the PAE data structures shown in top left on a per Node basis. Once trained the ML Engine is able to understand and reason about he correct state transitions of each protocol.

Step 2. The next step is to train the ML Engine on the latest network topology of the production network. This equips the ML Engine to understand and reason about the structural relationships between nodes and edges in the network. For instance will know exactly the path from UE to AMF which is adjacent, but it will also know the path from UE to UDM. So if the UE does not receive a packet from UDM, the ML Engine will know the nodes in between and be able to know exactly how to get each intermediate node packet traces, filter on source dest pairs UE and UDM and determine where the packets are being dropped.

Step 3. Process each packet trace, where each packet will contain the src/dest node pair and relevant protocols. As can be seen in FIG. 4F, the data structures will be containing per node, per protocol current state, and the new packet trace will contain the per node, per protocol next state. The PAE will look up each src/dest IP pairs data structure and check with the ML Engine if the next states are correct based on the new packet trace. This will allow the PAE to know exactly if it is excessively delayed by comparing time elapsed between last stored TIMESTAMP in the data structure and the new TIMESTAMP on the new packet trace, as well as the ML Engine will know what the timeout specification will be if any. Now depending on the results returned from the ML Engine, and the current state, the PAE will know if more info is needed, where the PAE can get more info automatically using SSH, paramiko and other common libraries to automate the retrieval of other information, such as getting packet traces for all intermediate nodes between UE and UDM to find out where packets are being dropped for UEIP transactions between UE and UDM as mentioned earlier. This power and flexibility is extremely powerful in getting information and acting on it, in an automated fashion is a breakthrough in technology for network operations automation.

Step 4. With the ML_Engine the PAE will be able to detect anomalies such as excessive delays, in particular, dynamically instantiate a machine learning model such as XGBoost, train on the packet trace data, on the protocol transactions then perform inference on suspect packets to identify notion of NORMAL or ANOMALY behaviors.

In short, the system processes packet traces, get the next state based on the packets for the particular node and protocol. The step also checks anomalies, errors, diagnosis, root cause and determines suggested fix. If needed, the system gets more data from the production network and iterate until convergence. Once convergence is reached, the system issues commands to fix the issue.

In another example embodiment, the system can be applied to automate the analysis of API behavior. APIs are now become increasingly deployed in modern cloud networks, and application developers have little or no visibility to the network when their APIs are not working. They may have log messages in their code, but when there is a problem in the network, they have no idea or access to what may be causing delays, to determine the source of congestion so they can notify network engineering rather than take days and repeated requests just to convince network engineering there is a problem in the network with your particular application. Often worse is when packets are dropped by intermediate nodes or a firewall rule and it takes a significant time for application developers to convince netops to look into the matter for their application. Often network engineers only look at the overall big picture and see most links and routers are working fine and not focussed on individual flows. The present invention gives application developers unprecedented visibility and insights on what is going on with their Application transactions or API invocations on the network to quickly diagnose anomalies, errors and other issues.

In one embodiment that uses the PAE to provide application developer insights to observability and corrective action on network related issues, the system can perform the following: 1) training ML on API dynamic model, 2) process packet traces filtered by nodes of interest and API ports of interest, gets next state based on the packets for that node and API, check anomalies, errors and run a diagnostic to determine root cause and suggested fix, and 3) obtain more data from the production network if needed and iterate until convergence and then issue commands to fix the network problem.

The system involves the coordination and synchronization of data collection from distributed devices, orchestrated by a central master controller and executed by distributed agents. This synchronized data collection is vital for monitoring the correct behaviors between 5G functions and ensuring the precise capture of relevant packets from nodes of interest. The automation extends to the intelligent selection and retrieval of only the essential packets needed for a variety of analyses. These analyses encompass anomaly detection, diagnosis, root cause identification, and the retrieval of additional information as required. Notably, the proposed system goes beyond mere analysis by incorporating automated corrective actions. Before deploying any changes to the production network, the proposed invention introduces a crucial verification step. It leverages a digital twin network simulator, allowing for a simulated environment where the proposed changes can be tested comprehensively.

The system addresses the challenge of resolving complex network issues, which often entail a series of iterative steps involving data gathering, analysis, and decision-making. Leveraging recent advancements in Artificial Intelligence, our novel approach aims to mimic the problem-solving process of experienced network engineers, but in an automated and efficient manner as follows:

a. Introduction to the Problem: Complex network issues require a systematic approach to gather and analyze data from various sources. This process often involves multiple iterations to fully understand the events triggered by a root cause.

b. Harnessing Artificial Intelligence: Recent developments in Artificial Intelligence offer a promising solution to automate the intricate tasks involved in diagnosing network issues. By harnessing AI, we can efficiently process diverse sources of information, similar to how a skilled engineer would manually analyze data.

c. Automating the Diagnosis Process: Our invention streamlines the diagnostic process by automatically gathering and processing data from different sources. This approach eliminates the need for manual intervention and significantly reduces the time required to pinpoint the root cause of network issues.

d. Iterative Data Gathering and Analysis: Similar to the iterative process employed by experienced engineers, our solution continually refines its analysis by gathering additional data as needed. This iterative approach ensures a comprehensive understanding of the events leading up to the root cause.

e. Presentation of Findings: The insights gleaned from our automated analysis are presented in a clear and understandable manner to network engineers. This ensures that complex technical information is conveyed effectively, enabling engineers to make informed decisions in resolving network issues.

Figure 5A:
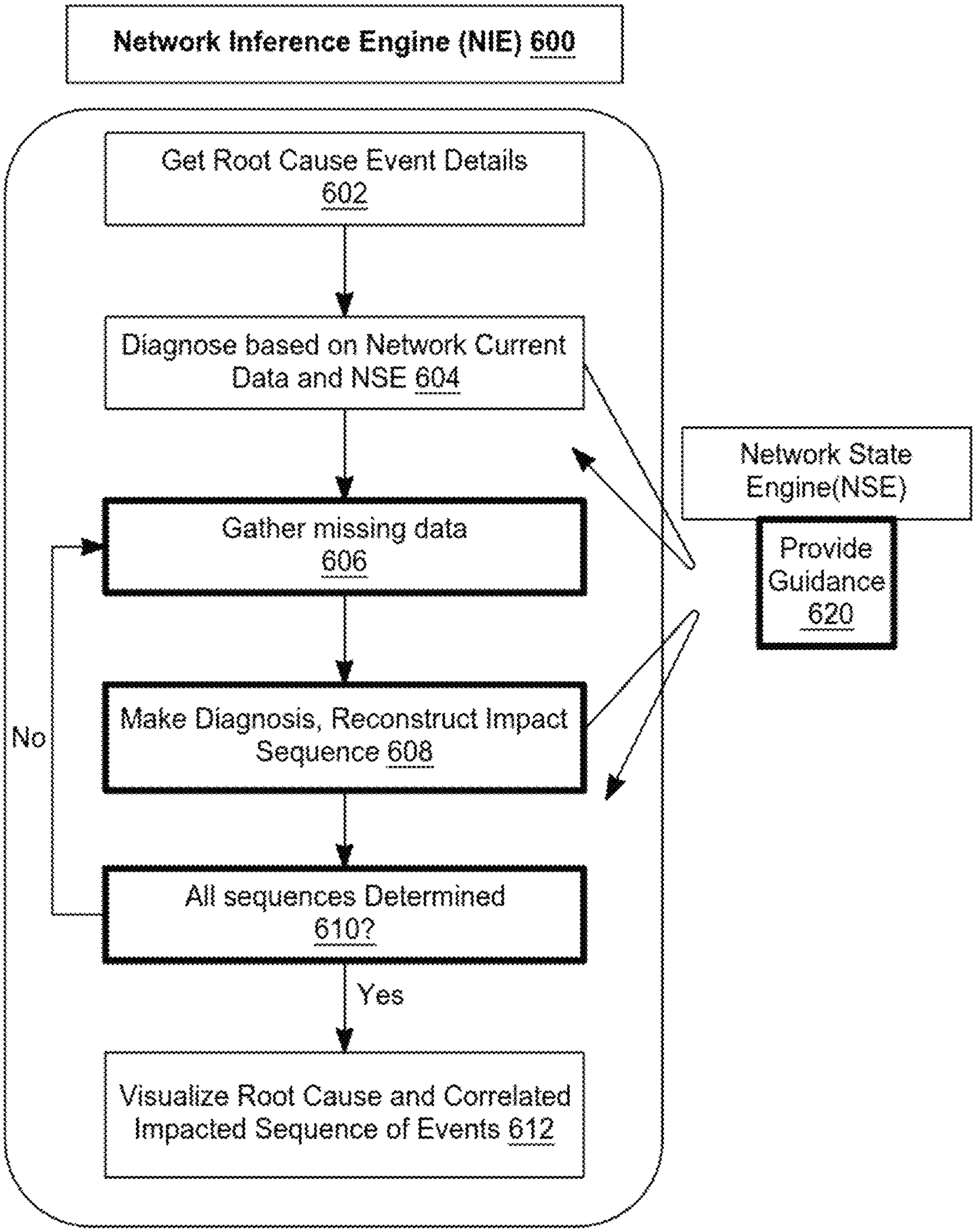
FIG. 5A shows an exemplary flowchart depicting the process of a NIE (NIE) analyzing and diagnosing network events with assistance from a NSE (NSE).

FIG. 5A shows flowchart depicting the process of a NIE analyzing and diagnosing network events with assistance from an NSE. The NIE interacts with other system components in order to reconstruct the sequence of events before and after a network outage or service disruption event. The system starts with the Root Cause and interacts with both the Network to get current actual data from the network as well as the NSE that keeps track of the latest state of each network element modeled as a state machine. The NIE first does a preliminary diagnosis based on the first data set it pulls and then decides on next steps what and where to get more information or data in order to reconstruct the sequence of events that are correlated to the root cause event. Finally the completed sequence is presented to the network engineer to explain clearly what happened before and after the root cause event, showing all impact to the network and how events changed based on recovery actions or further degradation depending on the data. By automating these labor-intensive tasks involved in diagnosing network issues, our invention empowers network engineers to focus on higher-value activities. This results in improved efficiency, reduced downtime, and enhanced network reliability, ultimately benefiting both operators and end-users.

The NIE reconstructs correlated sequence of events impacted by a root cause event for explaining what happened before and after a network outage or service disruption. The NIE automates the reconstruction of correlated events sequences impacted by root cause using a novel approach by working backwards in time and preparing data in such a way that reconstruction is possible and key data points are saved for later retrieval. The NIE enables a network engineer to fully understand what happened to the impacted network elements before and after a network outage or service degradation event including incremental state changes. This allows the network engineer to fully understand the scope of the event and side effects as well as temporal aspects of impact. The NIE leverages the previously described framework on how to automate several processes to collect, collate, correlate, diagnose network issues associated with root causes, collect more network data based on each iterations of analysis and then finally reconstruct the sequence of events that occurred before and after a root cause event showing visually exactly what happened and what was impacted and when. The NIE allows network operations team to significantly improve productivity by using artificial intelligence to better understand what was impacted by a network outage event or service degradation, what happened before and after. This then gives the network engineer full information to determine if the root cause network issue still has lingering side effects or if it is fully resolved. This also helps in full understanding and scope of impact of a network outage event.

The NSE commences by creating individual state machines for each of the network elements (16). These can include, but are not limited to, routers, switches, servers, and any other devices that form part of the network. Each individual state machine reflects the current state of the respective network element, which can be categorized into various operational or non-operational states based on factors such as availability, functionality, traffic or load, latency, or any other related parameter.

The NSE is constantly engaged in real-time monitoring and capturing the state changes for each network element. This could include changes in status, load changes, changes in connectivity with other elements, and other changes that may influence the functionality and performance of the network. The state change information is continually logged and stored in a time-series manner (41) for future progression, retracement, and analysis.

The tracked time-series data is crucial for the NIE to diagnose network issues, determine the root cause of a problem, and more significantly to reconstruct the sequence of events leading up to the problem. By maintaining an up-to-date state of each device in the network, the NSE allows for the fast and accurate identification and resolution of network problems.

In case of any deviations or anomalies, the NSE communicates with other components in the network, such as routers or servers, through Application Programming Interface (API) calls (64) to gather more granular, device-level information (33). With this capability, it can fetch the real-time network topology, configuration, status, and performance data.

Moreover, the NSE functions in an ongoing loop, continually updating and maintaining the latest state details of each network element. This cycling process allows for adjustments or improvements to be made on the fly, enhancing the overall efficiency and performance of the network infrastructure while minimizing downtime.

One embodiment involves the usage of several distinct types of data, including topology information (35), routing tables (64), traffic flows (28), performance metrics (42), and network element states (62). All these data types are crucial components that contribute to the functioning of the NIE in the system. The stored network data can include various types of data, such as network topology, configuration, performance metrics, alarms, logs, and events. The data can be collected from different sources, such as network devices, probes, sensors, or other monitoring tools, and stored in a centralized database for easy access and analysis. The process further includes the method described herein iteratively gathers additional network data as needed to comprehensively reconstruct the sequence of correlated events. This iterative process involves continuously collecting and storing network data from various sources, such as network devices, servers, logs, and other monitoring tools. The collected data is then processed and analyzed to detect a root cause event that triggers the sequence of correlated events. The system constantly collects, stores and organizes this data in a manner that allows it to be quickly retrieved for analysis in case of a root cause event. This layer includes data points such as the layout of the network elements (16) in the large-scale network environment (22), their interconnections, the state of each element, and how this state changes over time (7). The data lends insight into how data packets circulate within the network and guide the data flow between different network elements. The system retains a time-series record of these routing tables to assess changes in the network's data routing pathways based on shifting network conditions and external factors. The data relating monitoring traffic flow allows the system to identify areas of congestion, underused resources, and potential bottlenecks. These traffic flows combined with historical network data (12), provide crucial contextual understanding during the decision-making process post a root cause event.

Offer quantitative data about the functioning of the network, including speed, latency, error rates, and uptime. Performance metrics feed into the state engine (19) and influence the continuous improvement of the machine learning model (1) providing an objective basis upon which the success of any remedial actions can be measured.

Represent the health and status of the individual components of the network and how they change over time (41). By gathering data on each network element state, the system can understand how a root cause event can impact individual components and propagate through the network environment (15), causing secondary disruptions or failures.

Taken together, these types of data provide a comprehensive image of the network's behavior and performance over time, offering crucial insight to diagnose complex network issues (37). This knowledge serves as an advantage, enabling network engineers to judge the impact of a network outage or service degradation event.

A high-level workflow for packet analysis and corrective actions in network environments, can involve collation, correlation, and deployment in digital twin and production networks as follows:

Collate: The NIE then collates the collected network data to identify patterns and relationships between events. This process may involve grouping related events, filtering out irrelevant events, and combining data from different sources to gain a comprehensive understanding of the network situation. The collation process can also involve extracting relevant metadata, such as timestamps, event types, and impacted network elements, to facilitate further analysis.

Analyze: Next, the NIE analyzes the collated data using artificial intelligence algorithms to diagnose the root cause event and its impacts on the network. This analysis may involve identifying causal relationships between events, predicting the sequence of state changes, and determining the affected network elements. The NIE may also consider historical network data and predefined rules to refine its analysis and improve its accuracy.

Reconstruct: Based on the analysis results, the NIE reconstructs the sequence of correlated events that have occurred as a result of the root cause impact. This reconstruction process involves organizing the events in a chronological order and identifying the affected network elements and their state changes. The resulting sequence can be presented visually in a timeline format, with each event represented by a corresponding symbol or icon.

In one embodiment, the reconstructed sequence may include not only the direct impacts of the root cause event but also the cascading effects on other network elements. This allows for a more comprehensive understanding of the network situation and enables the identification of secondary or tertiary impacts that may have been overlooked.

Correlate correlates event records from Event Logs, Real-Time Stream Data, and Stored Stream Data to identify potential root cause events. This correlation process can involve comparing the time, location, type, and other attributes of events to find correlations that may suggest a common root cause. The correlated events can be assigned a correlation score based on their strength of correlation. For example, events that occurred at the same time and location would have a higher correlation score compared to events that occurred at different times and locations. Furthermore, the correlation process can take into account the topology of the network and the dependencies between network elements.

Based on the correlation scores, a Root Cause Detection module identifies the most likely root cause event. This module can use various algorithms and rules to analyze the correlated events and determine which one is the most likely root cause. The algorithm can also take into account the severity and impact of the events to prioritize the root cause event.

Once the root cause event is identified, the method uses an Impact Analysis module to determine the impacted network elements and the sequence of state changes that occurred as a result of the root cause. This module can use artificial intelligence techniques such as machine learning and pattern recognition to analyze the network data and infer the impacts. The resulting sequence of state changes can provide insights into how the network was affected and how the issue spread through the network. This information can be presented visually to facilitate understanding and decision-making.

The PAE performs deep packet inspection of the packets collected by packet capture module, extracts the network event information, and passes it to inference engine. In one embodiment, packet analysis engine may use various techniques, such as pattern matching, statistical analysis, machine learning, etc., to identify network events from the raw packet data. In some embodiments, packet analysis engine may also perform packet filtering to reduce the amount of data that needs to be processed by inference engine. For example, packet analysis engine may filter out irrelevant packets based on predetermined criteria, such as packet size, protocol type, source/destination address, etc.

Inference engine uses artificial intelligence algorithms, such as machine learning, to analyze the network event data and reconstruct the sequences of correlated events. In one embodiment, inference engine may use a combination of supervised and unsupervised learning techniques to diagnose the root cause, identify impacted network elements, and determine the sequence of state changes. For example, inference engine may use supervised learning to classify network events into different categories (e.g., normal, abnormal, critical), and use unsupervised learning to discover patterns and relationships among the events.

An automatic reconstruction method can be used for network events using an artificial intelligence engine, with various components such as state elements, telemetry, APIs, and the physical network.

State element/impacted group is a data structure used to track the state of a network element and its associated impacted elements at various points in time. In one embodiment, the state element/impacted group may include the following information:

Network element ID-identifies the network element that is being tracked.

Timestamp-indicates the point in time when the state of the network element is being recorded.

Current state-represents the current state of the network element.

Previous state-represents the state of the network element at the previous point in time.

Impacted elements-identifies the network elements that are impacted by the state change of the tracked network element.

The state element/impacted group can be continuously updated as the network situation changes. The NSE maintains a record of all state element/impacted group data, allowing for the reconstruction of sequences of state changes.

After determining the root cause, the NIE identifies the impacted network elements by analyzing the network topology and performance data. This helps to pinpoint the exact network elements that have been affected by the root cause event. When network elements are initially in a normal state, there may be a series of correlated events leading to an abnormal state, as depicted in Event. In this example, the root cause event is the failure of a router, which leads to the loss of connectivity between two nodes. As a result, several other events are triggered, such as alarms for unreachable nodes and failed link connections. These events can trigger additional events, creating a chain reaction that can quickly escalate into a complex network issue. In order to accurately diagnose the root cause and the sequence of events, it is crucial to capture and analyze the network data at various timings, as well as to consider the relationships between the events.

The method aims to collect and analyze network data at different timings to understand the relationships between events and accurately diagnose the root cause and sequence of events. The process for automatic reconstruction of correlated event sequences in network environments using a packet analysis engine and machine learning can be as follows. First, the system trains the ML by collecting and storing network data from various sources, such as network devices, logs, and performance metrics. This data can include network topology information, device configurations, event logs, performance metrics, and other relevant data. The data is continuously collected and stored in a database or data repository.

Figure 5B:
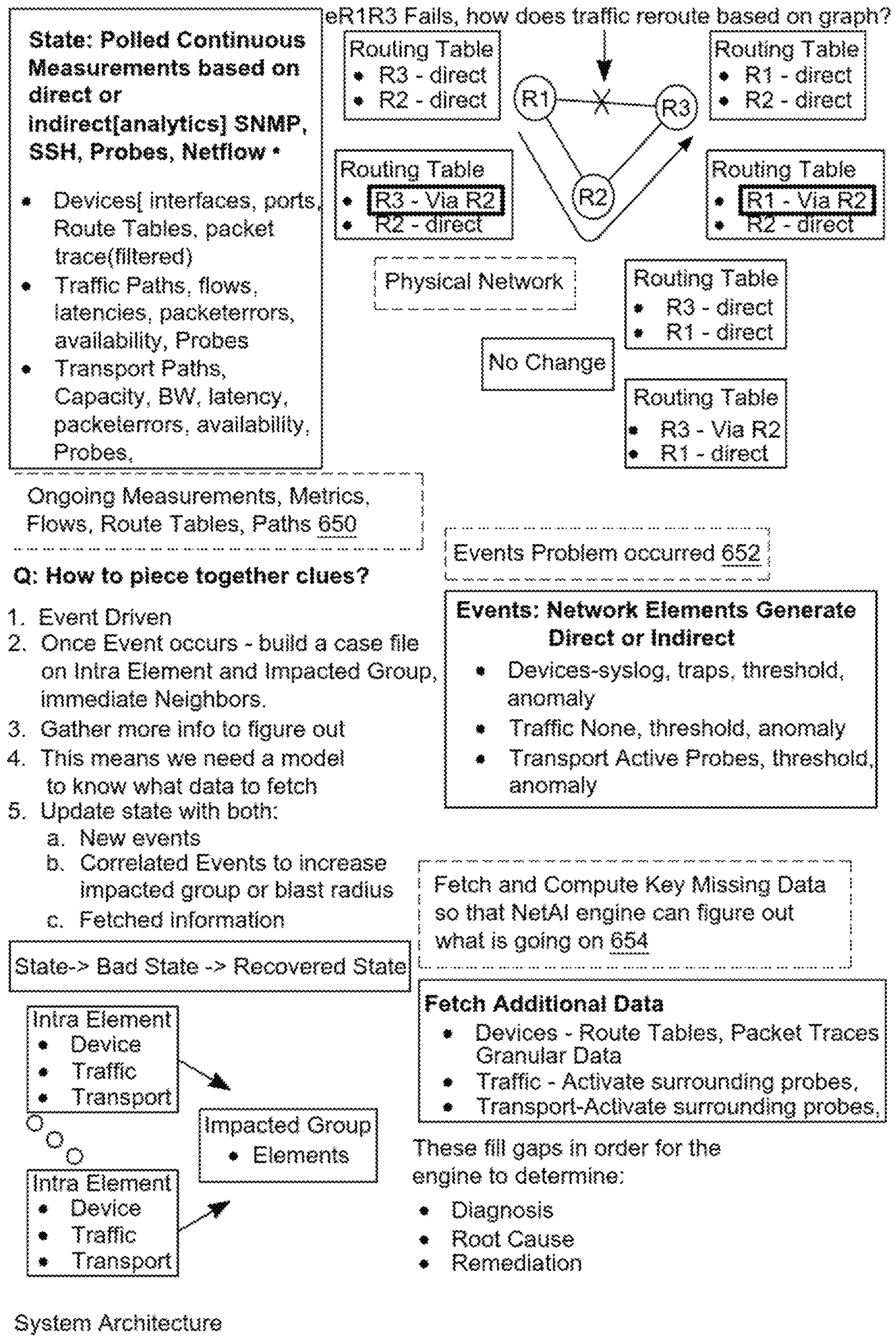
FIG. 5B shows an exemplary diagram explaining a method for automatic reconstruction of correlated event sequences in network environments, including state-event relationships and additional data fetching processes.

FIG. 5B shows a diagram explaining a method for automatic reconstruction of correlated event sequences in network environments, including state-event relationships and additional data fetching processes. The process starts at Step 1. with the continuous collection of data in such a manner that can be later retrieved to reconstruct the sequence of events correlated to a root cause event. This include time series based collection and storage of all data such as topologies, route tables, netflow measurements, traceroute measurements and recordings, capacity b/w, latency etc as shown at the top of FIG. 5B, polled continuous measures of all network elements, recording time based state measurements of all network elements. This is saved in NSE described earlier. At Step 2 an event occurs, a root cause event such as a fiber cut, and the link between R1 and R3 fails and subsequently traffic is routed through R2 and that causes congestion on link R2-R3 since that link was not designed for the additional traffic due to the failure of the R1R3 link. Step 3 shows the iterative process of collecting missing information and making sub diagnosis until a satisfactory complete set of reconstruction sequence events are computed. Step 4 not shown, would be to visualize the findings.

Figure 5C:
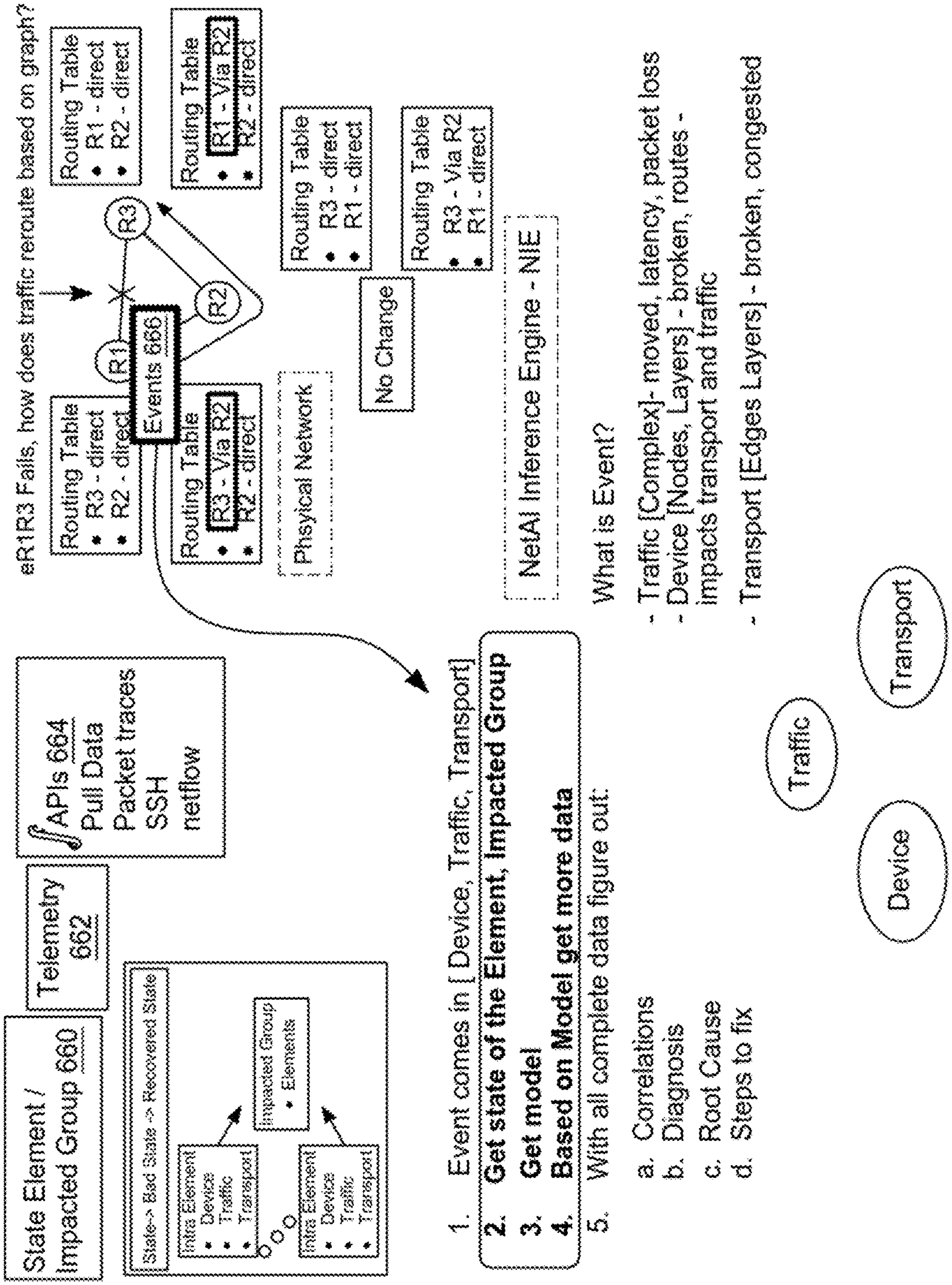
FIG. 5C shows an exemplary flowchart describing the steps of an automatic reconstruction method for network events using an artificial intelligence engine, with various components such as state elements, telemetry, APIs, and the physical network.

FIG. 5C shows in more detail the functional components of the NIE which is invoked with a root cause event, and then the NIE essentially interacts with external systems to get further information based on the current state of the network (NSE is consulted) and collects required data from the Network Elements themselves via APIs as shown, as needed by the diagnosis, which is captured in or more AI sub engines, and repeats iteratively until satisfactory sequence of events leading up to the root cause event are all collected. The NIE interacts with external systems to get further information based on the given root cause and repeats iteratively until satisfactory sequence of events leading up to the root cause event are all collected.

The NIE can diagnose network events with assistance from the NSE. The NIE can manage the data collection and reconstruction process of system. NIE may comprise one or more processors, memory, and other components to execute software instructions and store and manipulate data. In some embodiments, NIE may include a Network Data Collector, a Root Cause Analyzer, an Impact Analyzer, and a Sequence Generator. Network Data Collector may be configured to collect and store network data from various sources, such as network devices, servers, applications, logs, and other network management tools. This data may include events, alarms, performance metrics, configurations, topology information, and other relevant network information. Network Data Collector may also maintain a NSE (NSE), which tracks real-time network states and changes over time. NSE may use the collected network data to maintain a comprehensive and up-to-date view of the network environment.

Root Cause Analyzer may be configured to analyze the collected network data and identify a root cause event. The root cause event may be a trigger event that initiates a sequence of correlated events. Root Cause Analyzer may use artificial intelligence algorithms, such as machine learning, data mining, and pattern recognition techniques, to detect patterns and anomalies in the network data. For example, Root Cause Analyzer may analyze event logs and performance metrics to identify unusual patterns or deviations from normal behavior. Data for the root cause event can be retrieved from the NSE. This can include the time of occurrence, affected network elements, and other relevant details. The method then proceeds to step, where the NIE starts the reconstruction process. This involves collecting network data from various sources and analyzing them to determine the sequence of events that led to the root cause impact.

Artificial intelligence algorithm training on network topology may involve training a deep learning neural network model using the network topology and data from multiple real-world network environments. The trained neural network model can then be used by the NIE to analyze the collected network data and infer the root cause, impacted network elements, and sequence of state changes. Alternatively, other artificial intelligence techniques such as machine learning, natural language processing, and expert systems may also be utilized in the NIE.

In one example embodiment, the NIE may utilize a combination of techniques to reconstruct the sequences of correlated events. For example, the NIE may use a deep learning neural network model to identify the root cause event, and then use a machine learning algorithm to determine the sequence of state changes. This approach allows for a more accurate and comprehensive analysis of the network situation.

The NSE may also continuously update the network state information in real-time, based on the incoming network data. This allows the NIE to have access to the most up-to-date network states and events, improving the accuracy of the reconstruction process.

Once the NIE has determined the sequence of correlated events, the results can be presented visually to aid in understanding the network impact. For example, a timeline visualization may be used to show the chronological order of the events and their corresponding impacts on the network elements. This allows network operators to quickly identify the root cause and understand the cascading effects on the network.

The root cause event can be detected using various techniques such as threshold-based detection, anomaly detection, or pattern recognition. The root cause event can be an abnormal condition or failure that has a significant impact on the network. The method analyzes the network situation at various timings. This involves examining the network data collected before and after the root cause event to determine the state changes of the network elements. The analysis can also include identifying any correlations or dependencies between events and their impacts on the network. The method uses artificial intelligence algorithms to diagnose the root cause, identify impacted network elements, and determine the sequence of state changes. This can involve applying machine learning techniques to analyze the data and identify patterns and relationships between events and their effects. The method can also use causal reasoning to infer the most likely root cause and the corresponding sequence of events leading up to it. The automatic reconstruction of correlated event sequences in network environments, can include state-event relationships and additional data fetching processes. Ongoing Measurements, Metrics, Flows, Route Tables, Paths and alarms are all stored in the NSE, which is a database that maintains a current view of the network environment. The NSE is continuously updated with real-time data from various network elements, such as routers, switches, servers, and applications. This data can include metrics, such as packet loss, latency, and bandwidth utilization, as well as information about the network topology, traffic flows, route tables, and alarms. The NSE also maintains a history of these data points, allowing for trend analysis and pattern recognition.

The NIE collects data from the NSE, which maintains real-time information about the network states. This includes data on network elements, their configurations, and their current states. The NIE also collects data from network devices and monitoring tools, such as logs, alerts, and performance metrics. The NIE uses artificial intelligence algorithms to analyze the collected data and identify the sequence of state changes that occurred in the network leading up to the root cause impact. This involves identifying correlations between different events, identifying potential root causes, and determining the order of events based on timestamps and dependencies. The NIE presents the reconstructed sequence of events in an intuitive format, such as a visual timeline or a flowchart. This allows network operators to understand the impact of the root cause event on the network and the sequence of events that led to it.

The NIE can utilize a knowledge base of known network issues, network topology, and network configurations to make inferences about the root cause and impacted network elements. This knowledge base can be continually updated to incorporate new network issues and changes in the network environment. In one embodiment, the NIE uses machine learning techniques to analyze the data and identify patterns that may indicate the root cause. These techniques can include neural networks, decision trees, and other methods for classification and regression analysis. The NIE may also use natural language processing algorithms to analyze any textual data associated with the network events.

Once the root cause has been identified, the NIE determines the sequence of state changes that led to the impact. This involves tracing back through the network data and identifying the order in which the network elements changed states. The NIE may also use probabilistic reasoning to determine the likelihood of certain events leading to the impact. The results of the diagnosis are then passed on to the Presentation Engine, which can present the information to the user in an intuitive format.

The NIE can use various techniques to gather missing data for missing timestamps in the collected network data. For example, the NIE can access historical data or backups to retrieve the missing data. Alternatively, the NIE can extrapolate the missing data based on the available data points and the known behavior of the network elements. In another embodiment, the NIE can request additional data from network devices or other data sources to fill in the gaps. The NIE can also perform data validation and error correction to ensure the accuracy and consistency of the collected network data. This may involve cross-referencing data from different sources, detecting and correcting any anomalies or discrepancies, and filtering out irrelevant or redundant data.

In some embodiments, the NIE may also use predictive modeling techniques to forecast the behavior of the network elements based on historical data and other relevant factors. This can help anticipate potential issues and proactively take corrective actions to prevent or mitigate their impacts. The reconstructed network data can then be fed into the NSE for further analysis and processing. The reconstructed network data may also be stored in the data repository for future reference and analysis.

A reconstruct impact sequence module can analyze the impact and propagation of a root cause event to identify the sequence of correlated events and their effects on the network. This analysis can be based on various factors, such as the timing of the events, the affected network elements, and the state changes of the network. In one embodiment, reconstruct impact sequence can utilize artificial intelligence techniques to automatically identify patterns and relationships between events and determine the most likely sequence of events. In one embodiment, reconstruct impact sequence can access network data collected by data collector and network state information maintained by network state engine. The network data can include information about network events, such as alarms, errors, and performance metrics, as well as information about network elements and their configurations. Network state engine can maintain a real-time representation of the network and its elements, including their current states and configurations.

Based on the collected data and network state information, the reconstruct impact sequence module can identify the root cause event and its impact on the network. This can involve analyzing the network situation at different timings to determine which events are correlated with the root cause and how they contribute to the overall impact. Reconstruct impact sequence can also consider the states of the network elements and how they change over time, as well as any dependencies or interdependencies between elements. Once the sequence of correlated events is identified, the system can show or reconstruct impact sequence and present the results in a visual format, such as a timeline or a network topology diagram. The sequences determined can be presented visually to facilitate understanding of the root cause and impacted network elements. In one embodiment, a visual representation may include a timeline showing the sequence of state changes and associated network events. This timeline can also show the duration and severity of each event, as well as any remediation actions taken. Additionally, network topology diagrams or maps can be used to illustrate the affected network elements and their relationships. This visualization can help network operators to quickly identify the root cause, understand its impacts, and take appropriate actions to resolve the issue.

Furthermore, the system can also suggest potential remediation actions based on the identified root cause and its impact on the network. These suggestions can be based on historical data and network policies, and can be continuously updated as new data is collected. This can help network operators to make informed decisions and implement effective solutions to mitigate the issue. Additionally, the method can also track the effectiveness of these remediation actions and adjust them if necessary.

As detailed above, the system of FIGS. 5A-5C uses a robust framework consisting of the NSE and NIE. The NSE diligently tracks the real-time status of each network element, while the NIE employs AI to diagnose issues and identify missing data necessary for reconstruction. Through iterative iterations, this method culminates in the generation of comprehensive event sequences for visualization and analysis.

After a sequence is constructed, the fix process takes in the sequence of impacted network elements and performs a series of actions to mitigate the impact. These actions can be determined based on predetermined rules or through machine learning algorithms that analyze past remediation actions and their effectiveness. For example, if a sequence shows that a particular network element failure leads to increased traffic congestion, the fix process can automatically reroute traffic or add additional capacity to alleviate the congestion. Additionally, the fix process can also generate recommendations for human intervention, such as replacing a faulty network element or adjusting network configurations. These recommendations can be presented to network operators for approval before being implemented. The fix process can also update the NSE to reflect the remediation actions taken.

Furthermore, the fix process can also take into account the potential impacts of the proposed remediation actions on other network elements and predict their effects. This can help prevent unintended consequences and allow for more effective and efficient remediation strategies. The fix process can also continuously monitor the network state after remediation actions are taken to ensure that the issue has been resolved and no new problems have arisen.

The fix may be a recommendation to address the root cause impact and return the network to its desired state. The fix may be presented to a network operator, who can review and implement the suggested remediation actions. In some embodiments, the fix may be automatically executed by the system. For example, if the root cause event was a faulty network device, the fix may involve replacing the device or reconfiguring its settings.

The remediation suggestions provided by the method may be based on historical data and trends, as well as current network conditions. This allows for proactive identification of potential issues and preventive actions to be taken. Additionally, the method may also incorporate machine learning techniques to continuously improve the accuracy and effectiveness of the remediation suggestions over time.

Appropriate remediation action can be automatically suggested by the NIE based on the identified root cause and the impacted network elements. This can include performing a specific network reconfiguration, restarting a network element, or notifying the appropriate personnel for manual intervention. Additionally, the reconstructed sequences of events can be used to train the artificial intelligence algorithms for future network issues, thus improving the accuracy and efficiency of the method over time.

The present one embodiment provides a solution for automatically reconstructing sequences of correlated events that arise from a root cause impact in a network environment. It leverages the power of artificial intelligence techniques to analyze network data and infer the underlying cause and effects of network issues. By continuously monitoring and tracking network states, this method can accurately identify and diagnose complex network issues and provide valuable insights for remediation. With its scalability and ability to handle complex network environments, this method has the potential to greatly improve network management and operations.

By automating these labor-intensive tasks, the system significantly enhances the productivity of network engineers, empowering them to tackle issues that were previously time-consuming or even insurmountable given the available expertise and data. Leveraging AI models, dynamic data collection from network elements, and purpose-designed data stores, the invention ensures efficient decision-making and action-taking, all while remaining economically feasible. This accessibility extends its applicability across a wide range of network environments, from large enterprises to smaller organizations. The system enables automating network issue resolution by reconstructing correlated event sequences impacted by network disruptions. By leveraging artificial intelligence and economically feasible infrastructure, the system quickly addresses network problems, ultimately leading to enhanced reliability and performance across network infrastructures.

Figure 6A:
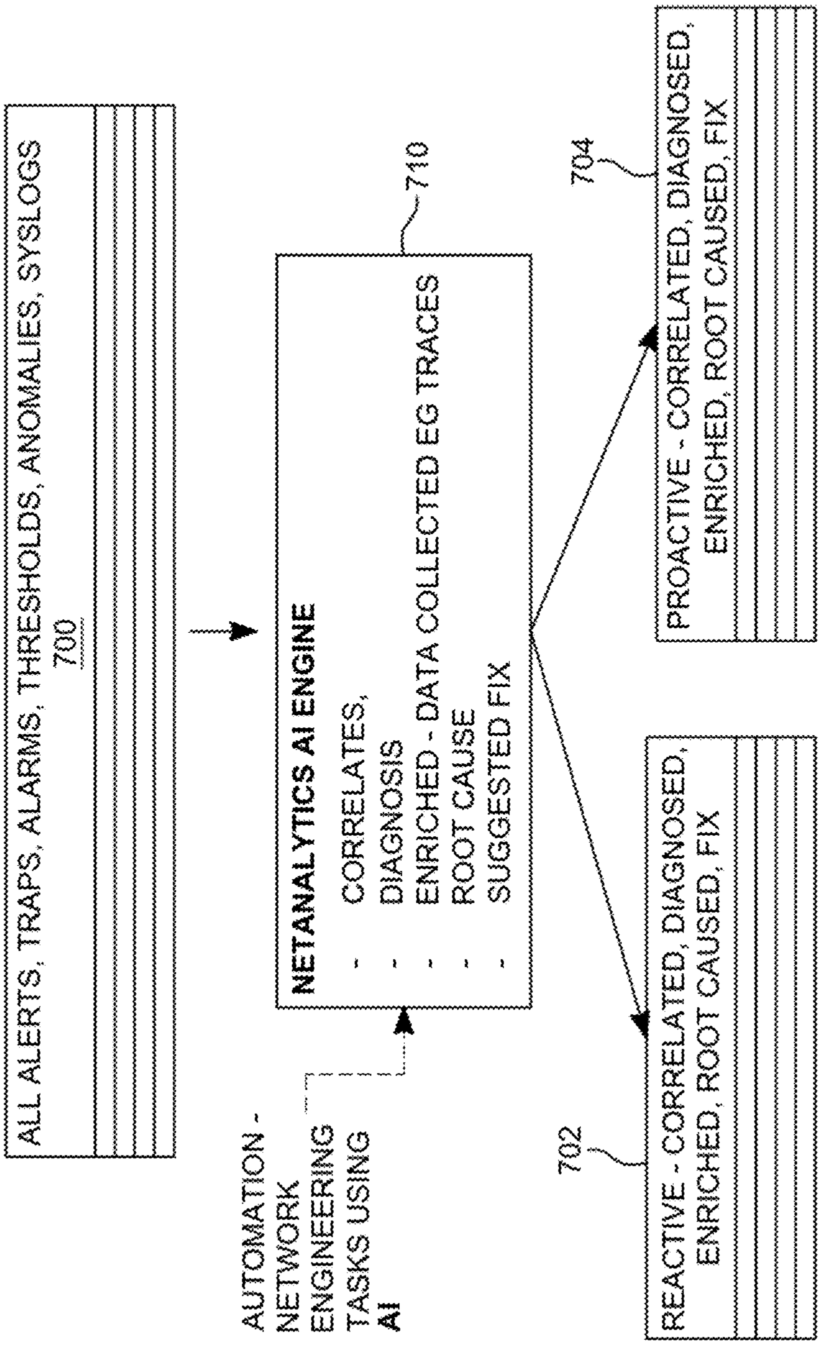
FIG. 6A shows an exemplary diagram illustrating the process of an AI-driven system for automatic network issue resolution with reactive and proactive components.

FIG. 6A shows an exemplary diagram describing the operation of an automatic reconstruction method for network events using an artificial intelligence engine, with various components such as state elements, telemetry, APIs, and the physical network. An AI-driven system is used for automatic network issue resolution with reactive and proactive components. In this system, all alerts uncorrelated sorted by time are streaming into the table showing all alerts, this table is continuously streaming incoming issues of all types, alarms, alerts, anomalies, threshold crossings, syslogs, netflow issues, security issues, etc. These issues are then simplified from the user interface as they are processed by the NetAnalytics AI engine that correlates, diagnoses, enriches by collecting more information to diagnose such as login to devices and fetch debug information such as packet traces, or state information from a network device. Then this information is processed using AI to determine root cause and provide suggested fixes. This is then routed to either the Reactive User Interface component or the Proactive User interface component shown below at bottom. The user interface visualization components are driven by the AI engine that automates tasks normally done by network engineers. Graphs and tables are automatically updated as issues arrive from the network asynchronously and processed by the NetAl engine. The issues are then resolved by the network engineer with minimal effort.

In one embodiment, the visualization User interface for the reactive component contains a top section which captures the multiple network protocol and services layers to identify at which layer or layers the issues are found. Each issue then is mapped to the lower section with details each issue in a tabular format which can be selected via mouse click for further information and action.

Figure 6B:
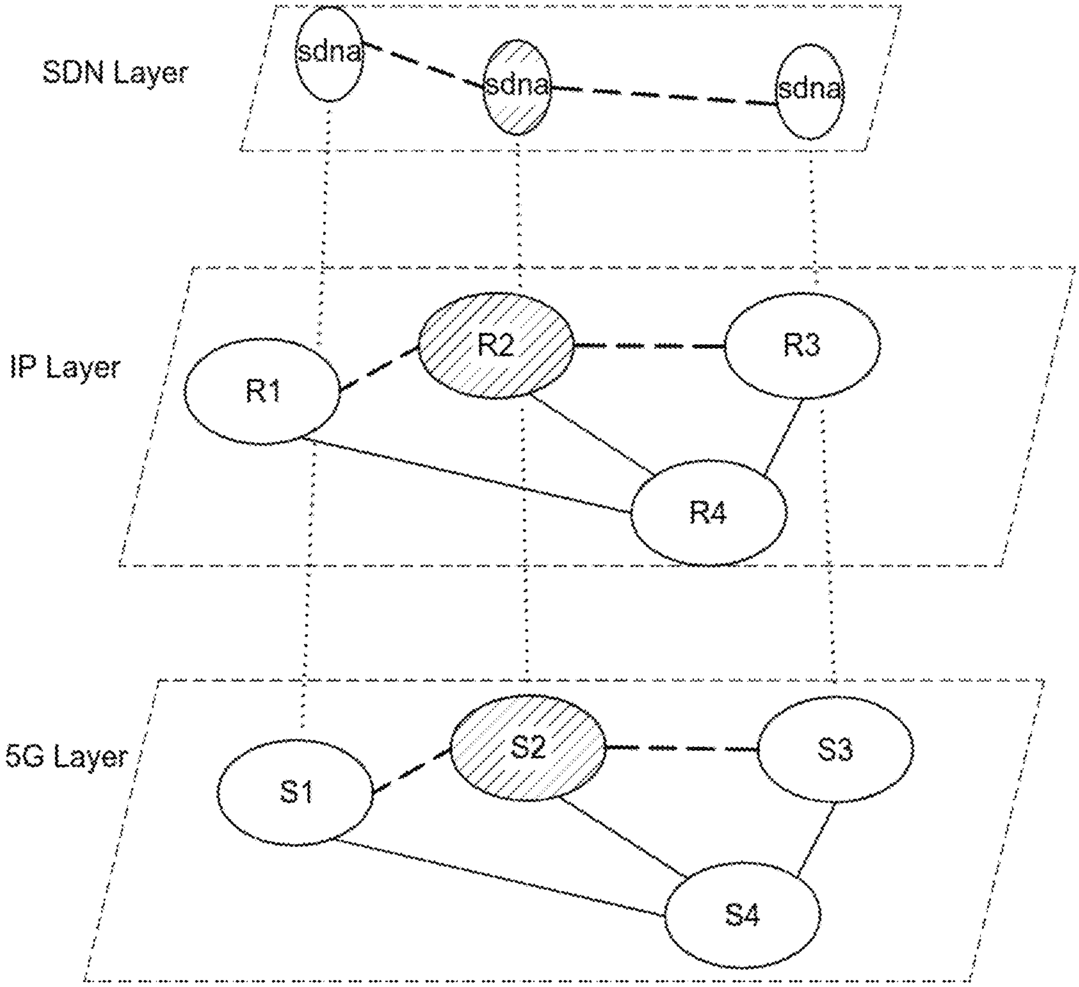
FIG. 6B shows an exemplary diagram depicting three network layers (SDN, IP, 5G) with interconnected nodes and dashed lines indicating relationships between layers.

FIG. 6B shows an exemplary diagram depicting multilayer network layers (SDN, IP, 5G) with interconnected nodes and dashed lines indicating relationships between layers. A real network can be accurately represented by a graph with nodes representing network devices and edges representing communication links. Each network layer (SDN, SD Wan, MPLS, etc.) would have its own graph. Each resource that has an issue is corresponding detailed in the tabular view below with more details on the issue, diagnosis, correlations de duplication by clicking on the count to show the correlated issues.

FIG. 6C shows an exemplary table detailing urgent reactive issues, with columns for severity, time, host, count, details, description, and ID, accompanied by a description of a reactive component for network event sequence reconstruction. The table of reactive Issues corresponds to Graph above with the details of each corresponding issue in the graph of FIG. 6B. The results of the work completed by the Netanalytics Engine are summarized including fetching other relevant information to increase accuracy of diagnosis and root cause such as packet traces or missing logs, the Root cause determination and the steps to resolve the issue to give to the network engineer as well as explanations. The table shows each issue with the description nd when drilled down, the details of the issues are shown.

Reactive process label is an identification for the reactive process associated with root cause event. The reactive process can refer to a sequence of steps or actions taken to address or remediate the root cause event, which may include restarting a network element, modifying a configuration, or any other appropriate action. In some implementations, reactive process label can be a link or reference to further information about the reactive process, such as documentation or instructions.

Network state label is an identification for the network state at the time of the root cause event. This can include information such as the state of various network elements, their configurations, and any relevant performance metrics. Network state label can be linked to a more detailed view of the network state at that specific time, providing a comprehensive understanding of the network environment at the time of the root cause event.

Impacted elements label is an identification for the network elements that are impacted by the root cause event. This can include both directly impacted elements and those that are affected indirectly through cascading effects. Impacted elements label can also provide information about the specific impacts on each element, such as changes in configuration, performance degradation, or outage.

Sequence label is an identification for the sequence of state changes that occurred as a result of the root cause event. This can include the sequence of events that led to the root cause, as well as the subsequent changes in the network state and impacted elements.

The user interface for automated network operations using artificial intelligence (AI) comprises three main components: a reactive component, a proactive component, and a user interaction component. The reactive component collects, correlates, analyzes and collects more information if required to diagnose and root cause urgent issues in the network that require immediate action, such as fiber cuts or outages due to misconfiguration. This saves countless hours per root cause, but when you continuously add up the efficiency saving will be enormous for a network operations team due to the amount of work, accuracy and speed of this approach. First, all uncorrelated alerts sorted by time are streaming into a table showing all alerts. This table continuously streams incoming issues of all types, including alarms, alerts, anomalies, threshold crossings, syslogs, netflow issues, security issues, etc.

These issues are then processed by the NetAnalytics AI engine that correlates, diagnoses, and enriches the data by collecting more information to diagnose, such as logging into devices and fetching debug information like packet traces or state information. This information is then processed using AI to determine root cause and provide suggested fixes. The resolved issues are then routed to either the Reactive User Interface component or the Proactive User Interface component. The reactive component provides:

A visualization of the current state of the end-to-end network, on net and off net, as experienced by the network operators' subscribers. The visualization includes the real-time discovery and state of the multi-layer network, including the topology, nodes, edges, protocols, service, end users, clients, and customers to the various network segments, such as local ISP, peer ISP, cloud, on prem, public, private, and end service.

A visualization and explanation of the critical issues of the network that are impacting customer experience. The visualization and explanation include the prioritization of the most severe and customer experience impact events, as well as the quantitative metrics on the extent of the impact, the engineers working on the issue, the duration of the issue, the target fix time, the risk, the problem description, the involved resources, the plan and exact steps to resolve, the progress and status of the resolution, and the remaining tasks to be completed.

The proactive component collects, correlates, analyzes and collects more information if required to diagnose and root cause proactive problems in the network that require eventual planned action, such as detected anomalies that will lead to issues. This saves countless hours per root cause, but when you continuously add up the efficiency saving will be enormous for a network operations team due to the amount of work, accuracy and speed of this approach. The proactive component provides:

a. a visualization and explanation of the proactive problems in the network, based on the anomalies detected by the machine learning algorithms trained on the network data from the engine. The visualization and explanation include the identification and classification of the anomalies, the potential impact and severity of the problems, the affected devices and services, and the suggested actions and preventive measures.

b. a visualization and explanation of the causes and sources of the anomalies, and the supporting data collected and analyzed by the AI agents.

c. a visualization and explanation of the mitigation and steps to prevent the problems, with timelines and expected outcomes.

The user interaction component enables the user to interact with the user interface and the network operations system, and to request and perform various network operations, such as data collection, analysis, correlation, visualization, and troubleshooting. The user interaction component provides:

A graphical user interface (GUI) that displays a dashboard of the network status, a list of network issues, and a menu of network operations. The GUI allows the user to select, view, and modify the network issues and operations, and to provide feedback and input to the user interface and the network operations system.

A natural language interface (NLI) that allows the user to communicate with the user interface and the network operations system using natural language, such as speech or text. The NLI enables the user to ask questions, give commands, and receive answers and responses from the user interface and the network operations system, using natural language processing and understanding techniques.

A software agent interface (SAI) that allows the user to invoke and control the software agents that execute the network operations using AI techniques, such as computer vision, deep learning, or reinforcement learning. The SAI enables the user to monitor and adjust the software agents' behavior, performance, and results, and to receive notifications and alerts from the software agents.

The user interface enables novice engineers to perform network operations that are faster, more accurate, and more efficient than manual network operations. The user interface also reduces the workload and the errors of experienced network engineers, and improves the quality and the reliability of the network services. The invention is applicable to various types of networks, such as cloud, 5G, or Internet of Things (IoT) networks.

Figure 6D:
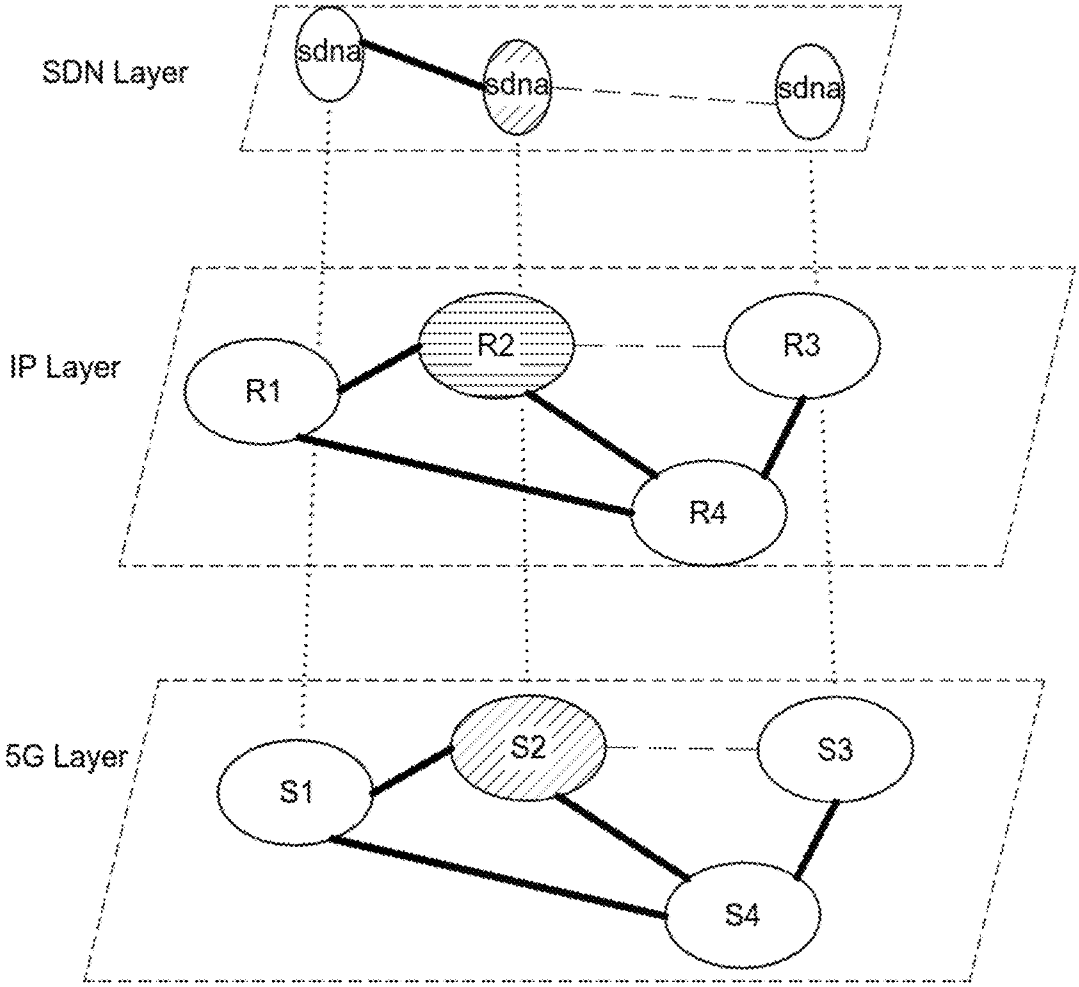
FIG. 6D shows an exemplary schematic representation of a multi-layer network environment with labeled nodes and connections indicating the SDN, IP, and 5G layers.

FIG. 6D shows a schematic representation of a multi-layer network environment with labeled nodes and connections indicating the SDN, IP, and 5G layers and FIG. 6E shows an exemplary diagram for recording network anomalies and their proactive measures. The network is accurately represented by a graph with nodes representing network devices and edges representing communication links. Each network layer (SDN, SD Wan, MPLS, etc.) would have its own graph. Each resource that has an issue is corresponding detailed in the tabular view below with more details on the issue, diagnosis, correlations de duplication by clicking on the count to show the correlated issues.

The proactive component collects, correlates, analyzes and collects more data if required to diagnose and root cause the issue and provide suggested fix. This saves countless hours per root cause, but when you continuously add up the efficiency saving will be enormous for a network operations team due to the amount of work, accuracy and speed of this approach. In one embodiment, the visualization User interface for the proactive component contains a top section which captures the multiple network protocol and services layers to identify at which layer or layers the anomaly or threshold issues are found. Each issue then is mapped to the lower section with details of each issue in a tabular format which can be selected via mouse click for further information and action. The results of the work completed by the Netanalytics Engine are summarized including fetching other relevant information to increase accuracy of diagnosis and root cause such as packet traces or missing logs, the Root cause determination and the steps to resolve the issue to give to the network engineer as well as explanations.

One embodiment provides a comprehensive and automated approach for reconstructing sequences of correlated events in a network environment. By leveraging artificial intelligence techniques, the method can effectively diagnose root causes, identify impacted network elements, and determine the sequence of state changes. This can greatly improve the efficiency and accuracy of network troubleshooting and remediation, making it an invaluable tool for managing complex network environments. The root cause analysis engine can identify a root cause event and determine its impact on other network elements. The identified events and impacted network elements can be presented visually to provide a comprehensive view of the root cause and the sequence of correlated events. This visual representation can aid in understanding the network situation and identifying appropriate remediation actions. In one embodiment, the visualization can be in the form of a timeline, where each event is represented as a point in time and the connections between events are shown as arrows. The timeline can also include information about the event type, the network element involved, and the state change that occurred. The visualization can be interactive, allowing users to zoom in and out, filter events by type or network element, and click on individual events for more detailed information. For example, if a network outage is detected, the timeline may show the root cause event as a server failure, followed by a series of events such as network congestion, routing changes, and hardware failures. By clicking on each event, the user can see which network elements were impacted, the state changes that occurred, and the potential cause of the event. This information can help network operators to quickly understand the root cause and take appropriate remediation actions. Additionally, the visualization can also show the current state of the network elements, such as their availability, performance metrics, and connectivity status. The resulting sequences of correlated events can be presented visually in a user interface, along with the identified root cause, impacted network elements, and state changes. This can provide valuable insights to network operators and help them understand the overall impact and identify appropriate remediation actions. For example, if the root cause is determined to be a network element failure, the operator may take steps to repair or replace the faulty element. If the root cause is a misconfiguration, the operator may make the necessary changes to correct the issue. The operator may also use the sequence information to determine the best order for remediation actions to minimize downtime and disruption to the network.

Additionally, the method can suggest potential remediation actions based on the identified root cause and impacted network elements. These suggestions can be based on historical data, best practices, or machine learning algorithms trained on similar network issues. This can provide an automated and proactive approach to network troubleshooting and remediation.

Furthermore, the method can be applied to a wide range of network environments, including but not limited to telecommunications networks, data networks, and cloud computing networks. It can handle complex network issues involving multiple interdependent events and their cascading effects, making it suitable for large and highly dynamic networks.

One embodiment uses an expert system to enhance reliability and accuracy of the Machine Learning Models, an Expert System with expert knowledge is integrated with the AI. The expert knowledge is obtained from network engineers who have a deep understanding of network operations and performance issues and their potential causes. This knowledge can include patterns that indicate network issues, effective remediation actions, and nuances of the network operations and structure that may influence network performance. Are trained and validated, they are deployed to continuous operation in real-time. Through AI-driven analysis of real-time and historical data, the Models can identify patterns and anomalies indicating potential issues within the network. Upon identification of an issue, the Models draw upon their training to associate the problem to a potential Root Cause. Simultaneously, they attempt to correlate the Root Cause with the Historical Network Data and the Expert Knowledge to provide a more comprehensive and accurate representation of the issue. This comprehensive understanding of the Root Cause enables them to suggest appropriate remediation actions, minimizing the impact on the network performance and the risk of future occurrences.

Figure 7:
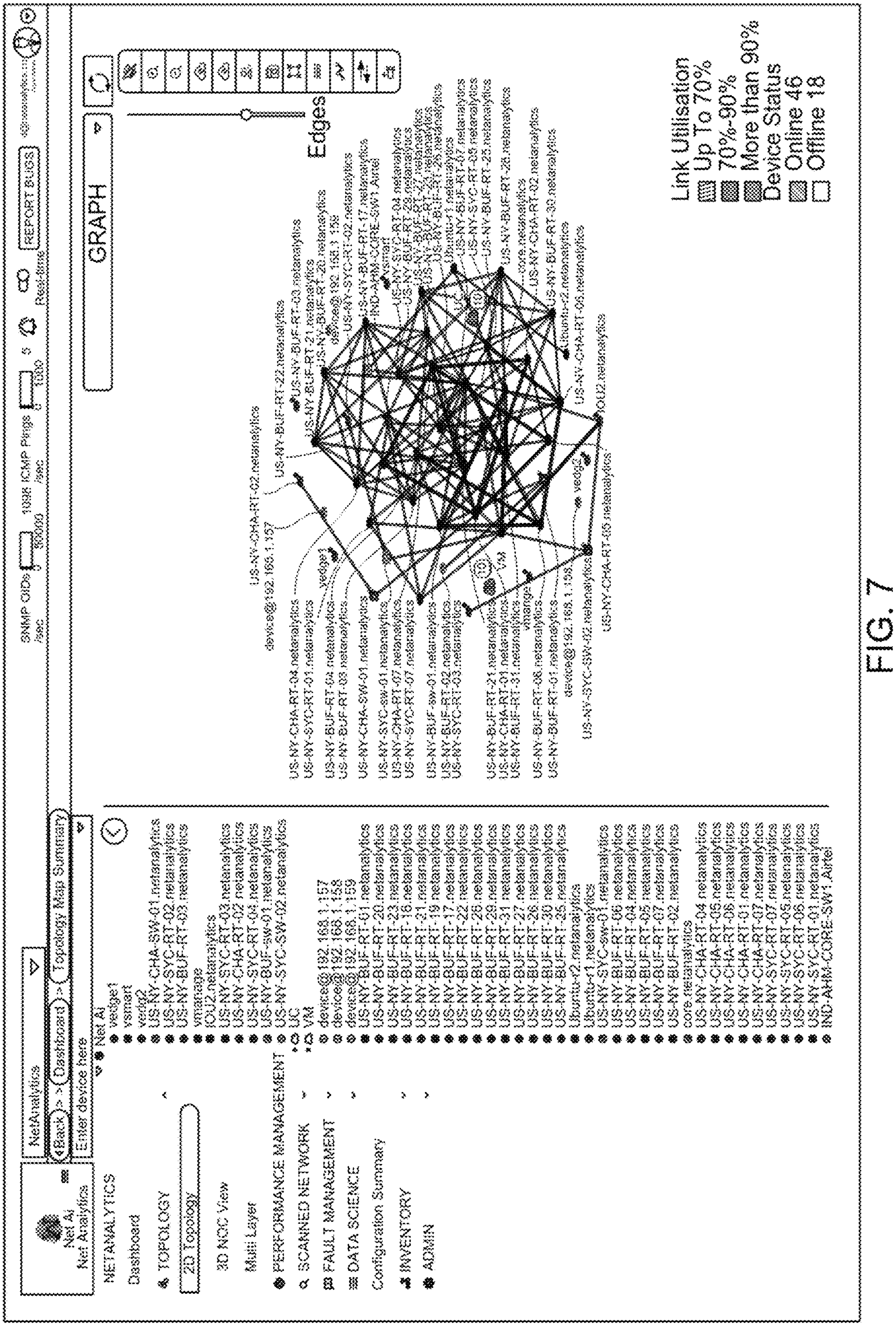
FIG. 7 shows an exemplary screenshot of a network analytics software interface showing a navigation menu on the left and a complex network topology graph on the right.

FIG. 7 shows a sample screenshot of a network analytics software interface showing a navigation menu on the left and a network topology graph on the right. The classical network operations can be viewed by network engineers who want to do further adhoc exploratory investigations. In one embodiment, the user interface suggests appropriate actions to resolve the root cause and mitigate the impact on the network. This engine can use the information gathered from the NSE and the NIE to determine the best course of action. For example, if the root cause is identified as a hardware failure on a particular server, the Remediation Engine may suggest replacing the faulty hardware or rerouting network traffic to avoid further disruptions. The suggestions can be presented to the network operators through a user interface or implemented automatically based on predefined rules.

The system provides dynamic visualization, allowing network engineers to replay events in real-time or at different speeds, or interactive visualization, in which network engineers could zoom in on certain sections of the network, filter events by type or severity, or trace the cascading effects of a particular event through the network diagram.

The graph section can also display additional information, such as timestamps, severity levels, and affected services, to provide a comprehensive view of the network situation. The user can interact with the graph, such as zooming in/out, dragging, and selecting specific nodes/edges, to explore the event sequence and understand the root cause and impacts better. The NSE can also provide real-time updates to the graph as new data is collected, allowing the user to monitor the network situation continuously. This feature enables the user to identify any ongoing issues and take immediate remedial actions. Additionally, the user can compare the current state of the network with the reconstructed event sequence to assess the effectiveness of the remedial actions.

Menu icons on the right side of the graph 112 include the "Event Detail" icon, which provides more detailed information about a specific event. For example, clicking on the icon can display information such as the timestamp, type, and source of the event, as well as any relevant metadata. The "Network Impact" icon can display a visual representation of the impacted network elements and their state changes. The "Root Cause" icon can display the root cause event and its diagnosis. The "Remedy Actions" icon can provide suggestions for resolving the issue based on the identified root cause and impacted network elements. Finally, the "Notes" icon can allow users to add any relevant notes or comments about the event.

A "Log" button enables the user to view and export event logs associated with the reconstructed sequences. In some embodiments, the logs can include a summary of the root cause, impacted network elements, sequence of events, and recommended actions. The logs can be exported in various formats such as CSV, JSON, or PDF.

Furthermore, the interface includes an Event Filter that allows the user to filter and narrow down the displayed events based on various criteria such as time, severity, event type, and impacted network elements. This can help the user focus on specific events of interest and better understand their impact on the network.

Additionally, the interface involves a Remediation Engine that suggests appropriate remediation actions based on the reconstructed sequences and the current state of the network. The suggested actions can range from simple configuration changes to more complex network adjustments. The user can review and approve these actions before they are implemented in the network.

Moreover, the interface includes a Feedback Mechanism that enables the user to provide feedback on the accuracy and effectiveness of the reconstructed sequences and the suggested remediation actions. This feedback can be used to continuously improve the performance of the method and make it more accurate and reliable.

In one embodiment, the system can also generate alerts or notifications to inform network administrators or operators about the root cause and impacted network elements. These alerts can be sent via email, text message, or any other suitable means of communication.

Furthermore, the system can also have a feedback mechanism that allows users to validate or adjust the suggested root cause and impacted network elements. This feedback can be used to continuously improve the accuracy and effectiveness of the reconstruction process. In addition, the system can also have a reporting function that summarizes the identified root cause, impacted network elements, and sequence of state changes. These reports can be useful for network management and decision-making purposes.

Overall, the method described in this embodiment provides an efficient and scalable solution for automatically reconstructing sequences of correlated events arising from a root cause impact in a network environment.

Color legend indicating online and offline status 114 In one embodiment, the reconstructed sequence of events can be presented visually to facilitate understanding and analysis. FIG. shows an example of a graphical representation of a reconstructed sequence of correlated events. The horizontal axis represents time, while the vertical axis represents network elements. The colored boxes indicate the status of the network elements at a particular time, with green indicating online and red indicating offline. A color legend is also provided to assist in interpreting the colors.

The reconstruction can be displayed in real-time, with the ability to zoom in and out to focus on specific time periods. The user can also select specific network elements to view their individual status changes over time. In addition, the user can select a specific event or state change to see its impact on other network elements and the subsequent state changes that occurred as a result. This visual representation can help the user quickly identify the root cause and understand the ripple effects on the network.

The graphical representation can also be used to suggest remediation actions. For example, the user can select a particular network element that experienced an offline state and view the sequence of events that led to this state. The system can then recommend actions to address the issue, such as resetting the network element or restarting a specific process. The user can also simulate the impact of these actions before implementing them to ensure they will resolve the issue without causing further disruptions.

One embodiment provides for the reconstruction of a sequence of network events in a visual format. This visual reconstruction is emitted after a series of iterative data collection, analysis, and decision-making stages led by the root cause event analysis in the NIE. The visual representation that the system produces could take the form of a timeline, a network diagram, or a combination thereof, appropriately structured and annotated to illustrate the sequence of events before, during, and after an identified network outage or disruption. The outcome is a comprehensive visualization that readily communicates what transpired over a particular timeframe.

With the timeline view, network engineers can see a chronologically ordered sequence of events. Horizontal axis represents time, and each event is plotted on this axis according to the time it occurred. Vertical lines or markers could be utilized to represent key individual events, while periods of network disruption or congestion could be highlighted as more expansive segments or bands. The timeline may include labels or detailed annotations describing the character and impact of each event, and markers of varying colors, sizes, or shapes could be utilized to highlight the severity or type of each event.

In the case of a network diagram, the visual format involves a schematic depiction of the different components of the network, their interconnections, and states. Network elements might be represented by nodes, their interdependencies by edges, and the status of each element (e.g., operating normally, overloaded, offline) by different colors or symbols. Here again, each event in the sequence may be annotated with a textual explanation detailing what transpired and the potential effects on the network.

Overall, this approach combines the intuitive appeal of visual data representation with the informational richness of text-based descriptions, facilitating rapid understanding and effective action by network engineers. By automating the labor-intensive tasks of data collection, analysis, and visualization, the system frees network operators to focus on resolving issues and optimizing network performance.

In one implementation, the system performs the four main steps: data collection, root cause detection, network situation analysis, and reconstruction using artificial intelligence algorithms. Each step will now be further elaborated upon.

Data Collection: In order to accurately reconstruct sequences of correlated events, it is essential to have a comprehensive and continuous collection of network data. This can include various types of data, such as network traffic data, device logs, system performance metrics, and network configuration information. The data can be collected from different sources, such as network devices, monitoring tools, and databases. The collected data should be stored in a centralized location for further analysis.

Root Cause Detection: The next step is to detect the root cause event that triggered the sequence of correlated events. This can be done using various techniques, such as anomaly detection, correlation analysis, and statistical methods. The aim is to identify the initial event that led to the subsequent events and impacted the network.

Network Situation Analysis: Once the root cause event has been identified, the next step is to analyze the network situation at various timings. This involves tracking the state changes of network elements, such as devices, links, and services, and understanding how they are interrelated. This step can be achieved using a NSE, which continuously monitors and updates the real-time network states based on the collected data.

Reconstruction Using Artificial Intelligence Algorithms: Use artificial intelligence algorithms to reconstruct the sequence of correlated events. The process further includes the reconstructed sequence of events is presented in a visual format (29), the reconstructed sequence of events is presented in a visual format, such as a timeline or a network diagram, along with textual explanations. This presentation allows network operators to quickly understand the sequence of events and their impacts, as well as identify any patterns or correlations that may have contributed to the root cause event.

In one embodiment, the timeline presents a chronological view of the events and their corresponding network states over time. Each event is represented by a data point on the timeline, with the corresponding network state shown as a colored bar above or below the timeline. The color of the bar indicates the severity of the network state, allowing network operators to easily identify critical states. By zooming in or out on the timeline, operators can view the events and states at different levels of detail, from an overview of the entire sequence to a detailed view of specific events and states.

In another embodiment, the network diagram provides a graphical representation of the network topology and the impacted network elements in relation to the root cause event. The network elements are color-coded to indicate their current state, with a legend provided for reference.

The process further uses the reconstructed sequence of events to identify the root cause (6), the reconstructed sequence of events can be used in various ways to improve network operations and troubleshooting. One of the main applications is to identify the root cause of a network issue. By analyzing the sequence, the method can pinpoint the event or events that initiated the chain reaction of state changes in the network. This information is crucial for understanding the underlying problem and developing an effective solution.

Additionally, the reconstructed sequence can provide insights into the impact of the root cause event on the network. By identifying the network elements that were affected by the root cause, the method can assess the extent of the impact and determine the severity of the issue. This can help network operators prioritize their actions and focus on the most critical areas.

Furthermore, the method can also suggest appropriate remediation actions based on the reconstructed sequence. By analyzing the state changes of the network elements and their dependencies, the method can determine the best course of action to address the root cause and mitigate the impact on the network. This can save time and effort for network operators and lead to faster resolution of network issues.

The system significantly increases the accuracy of anomaly detection, root cause and alarm correlation by providing context. Graph neural networks now build models with more relevant information between specific neighbors hence reducing noise and also on a per layer basis. This allows us to have higher precision and faster inference because the trained models are based on context which is captured in the graph. In contrast, conventional LLMs only capture the relationships between words, while the instant system represents better Computer networking using Graphs, and network layer context to further increase accuracy. Next, exemplary pseudo code for the system is detailed as follows:

```
Pseudocode for the anomaly detection and root cause
    determination method using multi-layer, multi-model
    graph neural networks:
#Represent network system as multi-layer graph
for each network_layer in [SDN, SD_WAN, MPLS, BGP,
    OSPF, ISIS, TCP, IP, UDP]:
    layer_graph=construct_graph (network_layer)
    layer_graph.nodes=network_devices (network_layer)
    layer_graph.edges=network_links (network_layer)
#Train GNN models on normal behavior
for layer_graph in multi_layer_graph:
    gnn_model=GNN ( ) #or GAT ( ) etc.
    gnn_model.train (layer_graph)
    normal_behavior [layer]=gnn_model
#Anomaly detection
while True:
for layer, gnn_model in normal_behavior.items ( )
    current_state=construct_subset_graph (layer, net-
        work_events)
    anomaly_scores=gnn_model.compute_anomaly_scores
        (current_state)
    if max (anomaly_scores)>threshold:
        anomalies=identify_anomalous_nodes (anomaly_
            scores)
        root_causes=determine_root_causes (anomalies,
            gnn_model)
        print (f"Anomalies detected: {anomalies}")
        print (f"Root causes: {root_causes}")
#Determine root causes
def determine_root_causes (anomalies, gnn_model):
    root_causes= [ ]
    for anomaly in anomalies:
        node_weights=gnn_model.get_node_weights
            (anomaly)
        edge_weights=gnn_model.get_edge_weights
            (anomaly)
        root_cause=identify_responsible_component (node_
            weights, edge_weights)
        root_causes.append (root_cause)
    return root_causes
#Train predictive anomaly model
anomaly_predictors= [ ]
for root_cause, anomalies in historical_data:
    anomaly_predictors.extend (anomalies)
anomaly_predictor_model=ML_Model ( )
anomaly_predictor_model.train (anomaly_predictors,
    root_causes)
#Predict anomalies
while True:
    current_anomalies=network_monitoring.get_anomalies
        ( )
```

```
predicted_faults=anomaly_predictor_model.predict (current_anomalies)
if predicted_faults:
    print (f"Predicted network faults: {predicted_faults}")
```

This pseudocode covers the key steps:

Representing the network system as a multi-layer graph

Training GNN models (like GNN or GAT) on each layer to learn normal behavior

Detecting anomalies by comparing current state to normal behavior

Determining root causes by analyzing node/edge weights in the GNN

Training a predictive model on historical anomaly data to predict future faults

The core logic uses the multi-layer GNN approach to detect anomalies and find root causes, while a separate ML model predicts potential network faults from the anomaly data. The pseudocode demonstrates the multi-layer, multi-model architecture of the invention.

====pseudocode for the proactive component of the user interface for automated network operations:

```
//Proactive Component
//Visualize network topology as graph
displayNetworkGraph ( )
//Detect anomalies and threshold issues using machine learning
anomalies=detectAnomalies (networkData)
thresholdIssues=detectThresholdIssues (networkData)
//Combine anomalies and threshold issues into proactivelssues list
proactivelssues=combineIssues (anomalies, thresholdIssues)
//For each proactive issue:
for issue in proactivelssues:
    //Collect additional diagnostic data
    diagnosticData=collectDiagnosticData (issue)
    //Analyze data to determine root cause
    rootCause=analyzeRootCause (issue, diagnosticData)
    //Determine potential impact and severity
    impact=determineImpact (rootCause)
    severity=determineSeverity (impact)
    //Identify affected devices and services
    affectedResources=identifyAffectedResources (rootCause)
///Suggest actions and preventive measures
suggestedActions=recommendActions (rootCause)
//Visualize issue details in table
displayIssueDetails (issue, rootCause, impact, severity, affectedResources, suggestedActions)
//Allow user to select issue for more details
selectedIssue=getUserSelection ( )
displayIssueBreakdown (selectedIssue)
//Visualize mitigation steps
displayMitigationPlan (selectedIssue)
```

The key steps are:

Visualize the network topology as a graph.

Use machine learning to detect anomalies and threshold issues from network data.

Combine detected anomalies and issues into a proactive issues list.

For each issue:

Collect additional diagnostic data

Analyze data to determine root cause

Determine potential impact and severity

Identify affected devices and services

Suggest actions and preventive measures

Display issue details in a table

Allow user to select an issue for more details

Display breakdown of selected issue

Visualize mitigation plan and steps

The pseudocode outlines the logic for the proactive component to detect, diagnose, and visualize potential network issues before they occur, enabling preventive actions to be taken. It leverages AI/ML for anomaly detection, root cause analysis, and recommending mitigations.

=====anomaly detection method using a mixture of machine learning models:

```
#Phase 1: Training
#Step 1: Determine root causes and associated predictor variables
root_causes, predictor_vars=root_cause_engine (network_transport_data, network_traffic_data, network_device_data)
#Step 2: Train anomaly detection models for each root cause
for root_cause in root_causes:
    labeled_data=get_labeled_data (root_cause, predictor_vars)
    trained_models= [ ]
    for model in anomaly_detection_models:
        trained_model=model.train (labeled_data)
        trained_models.append (trained_model)
    #Select best model based on criteria
    best_model=select_best_model (trained_models, criteria= ['accuracy', 'compute_time', 'cost'])
    root_cause_models [root_cause]=best_model
#Phase 2: Inference
#Step 1: Process real-time data through trained models
for data in real_time_network_data:
for root_cause, model in root_cause_models.items ( )
    anomaly, root_cause_details=model.detect_anomaly (data)
    if anomaly:
        print (f"Anomaly detected: {root_cause_details}")
#Step 2: Determine anomalies and required corrective actions
def detect_anomaly (data):
    for root_cause, model in root_cause_models.items ( )
        anomaly, root_cause_details=model.detect_anomaly (data)
        if anomaly:
            corrective_action=get_corrective_action (root_cause_details)
            print (f"Anomaly detected: {root_cause_details}")
            print (f"Corrective action: {corrective_action}")
```

This pseudocode follows the key steps outlined in the patent specification:

In Phase 1, the root cause engine determines the root causes and associated predictor variables using network transport, traffic, and device data.

For each root cause, labeled data is generated using the predictor variables.

Multiple anomaly detection models are trained on this labeled data.

The best performing model is selected based on criteria like accuracy, computation time, and cost.

In Phase 2, real-time network data is processed through the mixture of trained anomaly detection models.

When an anomaly is detected, the associated root cause details and required corrective action are provided.

The pseudocode demonstrates the novel approach of training anomaly detection models specific to identified root causes, enabling accurate anomaly detection and actionable insights for network operations.

=====Graph Neural Network-based intelligent network fault management system:

```
Phase 1: Train Anomaly Detection Models
Step 1: Input Data to Root Cause Engine
root_causes=[ ]
for each network_fault:
root_cause, predictor_variables=RootCauseEngine (network_fault, network_data)
root_causes.append ((root_cause, predictor_variables))
Step 2: Train Anomaly Detection Models
trained_models= [ ]
for root_cause, predictor_variables in root_causes:
best_model=None
best_accuracy=0
for model in [GCN, GAT, TemporalGCN, . . . ]:
model.train (predictor_variables, root_cause)
accuracy=model.evaluate ( )
if accuracy >best_accuracy:
best_model=model
best_accuracy=accuracy
trained_models.append ((root_cause, best_model, predictor_variables))
Phase 2: Inference for Anomaly Detection
Step 1: Input Live Data to Trained Models
for root_cause, model, predictor_variables in trained_models:
anomaly_detected=model.predict (get_live_data (predictor_variables))
if anomaly_detected:
alert_operator (root_cause, model.explanation, model.corrective_action)
Helper Functions
def RootCauseEngine (network_fault, network_data):
#Analyze network data to determine root cause
#Return root cause and predictor variables
. . .
def get_live_data (predictor_variables):
#Fetch live data for the given predictor variables
. . .
Data Structures
class AnomalyDetectionModel:
def train (self, data, labels):
#Train model on data and labels
. . .
def predict (self, data):
#Use trained model to predict anomalies
def evaluate (self):
#Evaluate model accuracy
. . .
explanation= " . . . "
corrective_action= " . . . "
```

The pseudocode follows the two main phases outlined in the patent specification:

Phase 1: Train Anomaly Detection Models

Step 1: Input network fault data to the Root Cause Engine to determine the root causes and associated predictor variables.

Step 2: For each root cause, train various anomaly detection models (e.g., GCN, GAT, TemporalGCN) on the predictor variables and select the best-performing model based on accuracy.

Phase 2: Inference for Anomaly Detection

Step 1: Input live data to the trained anomaly detection models, and if an anomaly is detected, alert the operator with the root cause, explanation, and corrective action.

The pseudocode includes helper functions like RootCauseEngine and get_live_data, as well as a class AnomalyDetectionModel to represent the different machine learning models used for anomaly detection.

```
#Master Controller
agents= [ ] #List of agents running on remote nodes
#Register agents and instruct them to collect packet traces
for node in network_nodes:
agent=register_agent (node)
agents.append (agent)
instruct_agent_to_collect_packets (agent, filters)
#Continuously collect packet data from agents
while True:
for agent in agents:
packet_data=get_packet_data (agent)
collated_packets.add (packet_data)
correlated_packets=correlate_and_remove_duplicates (collated_packets)
diagnosis, anomalies, root_causes=packet_analysis_engine.analyze (correlated_packets)
if more_data_needed (diagnosis, anomalies):
    additional_filters=determine_additional_filters (diagnosis, anomalies)
    for agent in agents:
        instruct_agent_to_collect_packets (agent, additional_filters)
else:
    corrective_actions=determine_corrective_actions (root_causes)
    #Test high-risk changes on digital twin first
    for action in corrective_actions:
        if action.is_high_risk_change ( )
            test_on_digital_twin (action)
        else:
            execute_on_production (action)
#Packet Analysis Engine
class PacketAnalysisEngine:
def_init_(self, topology_graph, protocol_state_machines):
    self.topology_graph=topology_graph
    self.protocol_state_machines=protocol_state_machines
    self.ml_models={ }
def analyze (self, packets):
    diagnosis= [ ]
    anomalies= [ ]
    root_causes= [ ]
    for packet in packets:
        src, dst=packet.src_ip, packet.dst_ip
        protocol=packet.protocol
        if not self.ml_models.get ((src, dst, protocol)):
            self.ml_models [(src, dst, protocol)]= train_ml_model (protocol)
        ml_model=self.ml_models [(src, dst, protocol)]
        current_state=self.get_current_state (src, dst, protocol)
        next_state=ml_model.predict_next_state (current_state, packet)
        if next_state==ANOMALY:
            anomalies.append (packet)
        elif next_state==ERROR:
            diagnosis.append (packet)
            root_cause=self.determine_root_cause (packet)
            root_causes.append (root_cause)
        self.update_state (src, dst, protocol, next_state)
    return diagnosis, anomalies, root_causes
```

```
def determine_root_cause (self, packet):
  #Analyze packet, protocol state, topology, etc. to determine root cause
def get_current_state (self, src, dst, protocol):
  . . .
def update_state (self, src, dst, protocol, next_state):
  . . .
#Digital Twin
class DigitalTwin:
  def__init (self, production_network_config):
    self.network_config=production_network_config
    self.initialize_simulation ( )
  def initialize_simulation (self):
    #Set up simulation environment with same config as production
    def test_change (self, change):
      #Apply change to simulation
      self.execute_change (change)
      #Run tests, analyze results
      test_results=self.run_tests ( )
      return test_results
    def execute_change (self, change):
      . . .
    def run_tests (self):
```

This provides a high-level overview of how the different components—the master controller, packet analysis engine using AI/ML models, and digital twin simulator-could be structured and interact. The core logic is:

Master instructs agents to collect filtered packet data

Master collates and correlates packets from agents

Packet Analysis Engine processes packets using ML models to detect anomalies, diagnose issues, determine root causes If more data is needed, master instructs agents to collect additional data Once root causes are identified, determine corrective actions Test high-risk configuration changes on the digital twin simulator first Apply safe read-only changes directly to production, after digital twin validation for high-risk changes The pseudocode covers the key algorithms and data structures required, like the agent management, packet correlation, ML model training/usage, state tracking, digital twin testing, etc. In an actual implementation, additional details like data formats, communication protocols, existing libraries/tools to leverage, and other optimizations would need to be incorporated.

1. Initialize Network Packet Trace Analyzer

Set up packet trace-capable agents on network devices

Configure central master controller to communicate with agents

2. Collect Packet Traces

Agents filter and collect relevant packet traces based on predefined criteria

Send collected packet traces to the master controller

3. Analyze Packet Traces at Master Controller

Collate packet traces from different agents

Correlate packet traces to identify related packets across different traces

Use machine learning algorithms to analyze collated and correlated packet traces Detect anomalies Diagnose network issues Determine root causes 4. Iterative Enhancement of Data Collection Based on initial analysis, identify gaps in data or additional required information Instruct agents to collect further data as specified by the master controller Repeat analysis with enhanced data set 5. Determine Corrective Actions Use AI to suggest corrective actions based on analysis If corrective action involves high-risk configuration changes:

Deploy changes on a digital twin of the production network

Test changes in the simulated environment to ensure no adverse effects

6. Apply Corrective Actions to Production Network

If changes are verified safe in the digital twin, apply to the production network Monitor the network for stability and effectiveness of the corrective actions 7. Report and Visualization Generate reports detailing the analysis, findings, and actions taken Provide visualizations of the network state and changes for easier understanding 8. Continuous Monitoring and Learning Continuously monitor network conditions Adapt machine learning models based on new data and feedback Update filtering and collection criteria based on evolving network conditions and requirements This pseudocode outlines the steps involved in the automated analysis of network packet traces using AI, as described in the patent document. The process includes initial data collection, analysis using AI, iterative data enhancement, and the application of corrective actions, with a focus on safety and verification using a digital twin environment.

In summary, the described one embodiment provides a comprehensive method for automatically reconstructing sequences of correlated events that arise from a root cause impact in a network environment.

The scalable method can handle large-scale complex network environments, ensuring minimal impact on network performance. It improves management efficiency with an automatic process to diagnose, counteract network issues. The process of reconstructing sequences of correlated events forming around the root cause event provides an improved understanding of network health and yields an effective remediation process. The system's scalability is underlined by a well-structured data architecture and visualized presentation of findings which facilitates information comprehension and decision making.

The system can be integrated with existing network management and monitoring tools to provide a comprehensive solution for network operations. The method integrates with existing network management and monitoring tools to provide a comprehensive solution for network operations. This integration allows the method to gather network data from multiple sources, such as network devices, logs, alarms, and performance metrics, in a continuous and comprehensive manner. The collected data is stored in a centralized repository for easy access and analysis.

The system is applicable to a wide range of network environments, including local area networks (LANs), wide area networks (WANs), cloud networks, software-defined networks (SDNs), and wireless networks. The method is also applicable to different types of networks, such as telecommunications networks, data networks, and internet of things (IOT) networks. This wide applicability makes the method versatile and suitable for use in various industries and sectors, including telecommunications, banking, healthcare, transportation, and manufacturing. The method can be implemented in any network environment that generates network data, regardless of the size or complexity of the network. This includes small-scale networks with a few network elements and large-scale networks with thousands of network elements. The method is designed to be scalable and can handle complex network issues involving multiple events and their cascading effects. In addition, the method can be used for both reactive and proactive network management. In reactive management, the method can be used to identify the root cause of a network issue that has already occurred and provide insights for remediation. In proactive management, the method can be used to monitor the network continuously and detect potential issues before they become critical, thus allowing for timely preventive actions. Furthermore, the method can be customized and tailored to specific network environments. For example, the artificial intelligence algorithms used in the method can be trained and optimized for a particular network environment, resulting in more accurate and efficient diagnoses.

The inventive method employs advanced artificial intelligence algorithms that are specifically tailored to diagnose root causes, identify impacted network elements, and determine sequences of state changes. These AI algorithms leverage machine learning techniques to analyze the network data and infer patterns that would not be apparent through conventional methods. By implementing such sophisticated algorithms, the system can quickly adapt to new types of network behavior, continuously improving its diagnostic accuracy over time. This capability to self-learn and evolve with the network it monitors represents a significant performance improvement over static, rule-based systems, as it can effectively handle the dynamic and complex nature of modern network environments.

Various modifications and alterations of the invention will become apparent to those skilled in the art without departing from the spirit and scope of the invention, which is defined by the accompanying claims. It should be noted that steps recited in any method claims below do not necessarily need to be performed in the order that they are recited. Those of ordinary skill in the art will recognize variations in performing the steps from the order in which they are recited. In addition, the lack of mention or discussion of a feature, step, or component provides the basis for claims where the absent feature or component is excluded by way of a proviso or similar claim language.

While various embodiments of the present invention have been described above, it should be understood that they have been presented by way of example only, and not of limitation. The various diagrams may depict an example architectural or other configuration for the invention, which is done to aid in understanding the features and functionality that may be included in the invention. The invention is not restricted to the illustrated example architectures or configurations, but the desired features may be implemented using a variety of alternative architectures and configurations. Indeed, it will be apparent to one of skill in the art how alternative functional, logical or physical partitioning and configurations may be implemented to implement the desired features of the present invention. Also, a multitude of different constituent module names other than those depicted herein may be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

The invention claimed is:

1. A method, comprising:

maintaining a network dependency graph that includes a plurality of nodes and edges, wherein each node represents a respective network element of a plurality of network elements of a network environment and wherein each edge represents a dependency between different network elements;

receiving time-stamped network data associated with the plurality of network elements;

identifying, based on the time-stamped network data, an anomaly event, occurring at a first time, associated with a first node of the network dependency graph;

identifying, based on the time-stamped network data, a candidate root cause event for the anomaly event, wherein the candidate root cause event occurs at a second time that is prior to the first time and is associated with a second node of the network dependency graph;

traversing, based on the candidate root cause event, the network dependency graph to identify a particular set of nodes that are on one or more dependency paths from the second node;

identifying, based on the time-stamped network data, a set of events associated with the particular set of nodes, wherein identifying the set of events includes selecting particular events that are associated with the particular set of nodes and that occur within a particular time window that includes the second time;

applying a graph neural network (GNN) to nodes and edges of the network dependency graph to determine candidate causal paths associated with the particular set of nodes and select, from the set of events, a consistent sequence of events;

identifying one or more impacted network elements based on the consistent sequence of events; and outputting the consistent sequence of events with device-specific remediation instructions for the one or more impacted network elements.

2. The method of claim 1, further comprising maintaining a Network State Engine (NSE) that tracks a real-time state of each network element as a finite state machine.

3. The method of claim 2, further comprising using the NSE to determine a current state of the network, wherein identifying the one or more impacted network elements is based on the current state of the network.

4. The method of claim 1, wherein the time-stamped network data includes at least one of:

topology information, routing tables, traffic flows, or network element states.

5. The method of claim 1, wherein the GNN is trained on historical time-stamped network data and labeled causation paths.

6. The method of claim 1, further comprising automatically reconfiguring the one or more impacted network elements by applying the device-specific remediation instructions to the one or more impacted network elements.

7. The method of claim 1, wherein applying the GNN further includes:

determining a sequence of state changes; and reconstructing a sequence of state changes arising from the candidate root cause event.

8. The method of claim 1, wherein the time-stamped network data includes at least one of:

traffic metrics, performance metrics, logs, or alarms.

9. The method of claim 8, wherein the time window further includes the first time.

10. The method of claim 9, wherein the time window ends at the first time.

11. The method of claim 9, wherein a beginning of the time window is offset from the second time by a particular duration.

12. The method of claim 8, wherein selecting the consistent sequence of events includes selecting, from the set of events, events that satisfy a temporal ordering and a dependency relationship represented in the network dependency graph.

13. A non-transitory computer-readable medium storing a plurality of processor-executable instructions, wherein executing the plurality of processor-executable instructions causes one or more processors to:

maintain a network dependency graph that includes a plurality of nodes and edges, wherein each node represents a respective network element of a plurality of network elements of a network environment and wherein each edge represents a dependency between different network elements;

receive time-stamped network data associated with the plurality of network elements;

identify, based on the time-stamped network data, an anomaly event, occurring at a first time, associated with a first node of the network dependency graph;

identify, based on the time-stamped network data, a candidate root cause event for the anomaly event, wherein the candidate root cause event occurs at a second time that is prior to the first time and is associated with a second node of the network dependency graph;

traverse, based on the candidate root cause event, the network dependency graph to identify a particular set of nodes that are on one or more dependency paths from the second node;

identify, based on the time-stamped network data, a set of events associated with the particular set of nodes, wherein identifying the set of events includes selecting particular events that are associated with the particular set of nodes and that occur within a particular time window that includes the second time;

apply a graph neural network (GNN) to nodes and edges of the network dependency graph to determine candidate causal paths associated with the particular set of nodes and select, from the set of events, a consistent sequence of events;

identify one or more impacted network elements based on the consistent sequence of events; and output the consistent sequence of events with device-specific remediation instructions for the one or more impacted network elements.

14. The non-transitory computer-readable medium of claim 13, wherein selecting the consistent sequence of events includes selecting, from the set of events, events that satisfy a temporal ordering and a dependency relationship represented in the network dependency graph.

15. The non-transitory computer-readable medium of claim 13, wherein the time window further includes the first time.

16. The non-transitory computer-readable medium of claim 15, wherein the time window ends at the first time, and wherein a beginning of the time window is offset from the second time by a particular duration.

17. A device, comprising:

one or more memory devices storing a plurality of processor-executable instructions; and one or more processors configured to execute the plurality of processor-executable instructions, wherein executing the plurality of processor-executable instructions causes the one or more processors to:

maintain a network dependency graph that includes a plurality of nodes and edges, wherein each node represents a respective network element of a plurality of network elements of a network environment and wherein each edge represents a dependency between different network elements;

receive time-stamped network data associated with the plurality of network elements;

identify, based on the time-stamped network data, an anomaly event, occurring at a first time, associated with a first node of the network dependency graph;

identify, based on the time-stamped network data, a candidate root cause event for the anomaly event, wherein the candidate root cause event occurs at a second time that is prior to the first time and is associated with a second node of the network dependency graph;

traverse, based on the candidate root cause event, the network dependency graph to identify a particular set of nodes that are on one or more dependency paths from the second node;

identify, based on the time-stamped network data, a set of events associated with the particular set of nodes, wherein identifying the set of events includes selecting particular events that are associated with the particular set of nodes and that occur within a particular time window that includes the second time;

apply a graph neural network (GNN) to nodes and edges of the network dependency graph to determine candidate causal paths associated with the particular set of nodes and select, from the set of events, a consistent sequence of events;

identify one or more impacted network elements based on the consistent sequence of events; and output the consistent sequence of events with device-specific remediation instructions for the one or more impacted network elements.

18. The device of claim 17, wherein selecting the consistent sequence of events includes selecting, from the set of events, events that satisfy a temporal ordering and a dependency relationship represented in the network dependency graph.

19. The device of claim 17, wherein the time window further includes the first time.

20. The device of claim 19, wherein the time window ends at the first time, and wherein a beginning of the time window is offset from the second time by a particular duration.

* * * * *